United States Patent
Cirik et al.

(10) Patent No.: US 12,261,803 B2
(45) Date of Patent: *Mar. 25, 2025

(54) WIRELESS RESOURCE DETERMINATION AND USE

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Yunjung Yi, Vienna, VA (US); Hua Zhou, Vienna, VA (US); Alireza Babaei, Fairfax, VA (US); Youngwoo Kwak, Woodbury, NY (US); Kyungmin Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,686

(22) Filed: Jul. 20, 2023

(65) Prior Publication Data
US 2024/0089064 A1    Mar. 14, 2024

Related U.S. Application Data

(63) Continuation of application No. 16/919,287, filed on Jul. 2, 2020, now Pat. No. 11,818,072.
(Continued)

(51) Int. Cl.
*H04L 5/00* (2006.01)
*H04W 28/04* (2009.01)
(Continued)

(52) U.S. Cl.
CPC ............ *H04L 5/0055* (2013.01); *H04L 5/001* (2013.01); *H04L 5/0094* (2013.01); *H04W 28/04* (2013.01);
(Continued)

(58) Field of Classification Search
CPC ..... H04L 5/0055; H04L 5/001; H04L 5/0094; H04W 28/04; H04W 72/1268; H04W 72/23

See application file for complete search history.

(56) References Cited

U.S. PATENT DOCUMENTS

| 9,615,267 B2 | 4/2017 | Fu et al. |
| 10,568,081 B2 | 2/2020 | Papasakellariou |

(Continued)

OTHER PUBLICATIONS

NTT Docomo et al: "Remaining issues CA and type1 HARQ-ACK codebook", 3GPP Draft; R1-1807071, 3rd Eneration Partnership Project (3GPP), Mobile Competence Centre ; 650, Route Des Ucioles; F-06921 Sophia-Antipolis Cedex; France vol. RAN WG1, No. Busan, Korea; May 21, 2018-May 25, 2018 May 20, 2018 (May 20, 2018), (Year: 2018).*

(Continued)

*Primary Examiner* — Hardikkumar D Patel
(74) *Attorney, Agent, or Firm* — Banner & Witcoff, Ltd.

(57) ABSTRACT

Wireless resource determination and use are described. A wireless device may determine to use a resource (e.g., PUCCH resource), indicated by control information (e.g., DCI), for sending an acknowledgement (e.g., HARQ-ACK feedback) of a reception of data (e.g., at least one transport block). The control information may be received in a message of a plurality of messages. The wireless device may select the control information (e.g., for determining the resource) from among other control information in the plurality of messages, based on one or more factors.

24 Claims, 31 Drawing Sheets

Related U.S. Application Data

(60) Provisional application No. 62/869,642, filed on Jul. 2, 2019.

(51) Int. Cl.
  *H04W 72/1268* (2023.01)
  *H04W 72/23* (2023.01)

(52) U.S. Cl.
  CPC ....... *H04W 72/1268* (2013.01); *H04W 72/23* (2023.01)

(56) References Cited

U.S. PATENT DOCUMENTS

| | | | |
|---|---|---|---|
| 10,601,567 | B2 | 3/2020 | Marinier et al. |
| 2015/0223240 | A1* | 8/2015 | Choi ................. H04W 72/0446 370/329 |
| 2019/0342035 | A1* | 11/2019 | Zhang ....................... H04L 1/08 |
| 2019/0349973 | A1* | 11/2019 | Yang ................... H04W 72/535 |
| 2020/0022144 | A1* | 1/2020 | Papasakellariou .... H04W 72/23 |
| 2020/0288482 | A1* | 9/2020 | Yi .......................... H04W 72/20 |
| 2020/0389871 | A1* | 12/2020 | Wang .................... H04L 5/0091 |
| 2021/0068142 | A1* | 3/2021 | Park .................. H04W 72/0453 |
| 2021/0160880 | A1* | 5/2021 | Zhang .................. H04L 5/0064 |
| 2022/0029750 | A1* | 1/2022 | Matsumura ....... H04W 72/0453 |

OTHER PUBLICATIONS

3GPP TS 38.212 V15.5.0 (Mar. 2019), Technical Specification, 3rd Generation Partnership Project; Technical Specification Group Radio Access Network; NR; Multiplexing and channel coding (Release 15).

3GPP TS 38.213 V15.5.0 (Mar. 2019), Technical Specification, 3rd Generation Partnership Project; Technical Specification Group Radio Access Network; NR; Physical layer procedures for control (Release 15).

3GPP TS 38.214 V15.5.0 (Mar. 2019), Technical Specification, 3rd Generation Partnership Project; Technical Specification Group Radio Access Network; NR; Physical layer procedures for data (Release 15).

3GPP TS 38.300 V15.5.0 (Mar. 2019), Technical Specification, 3rd Generation Partnership Project; Technical Specification Group Radio Access Network; NR; NR and NG-RAN Overall Description; Stage 2 (Release 15).

3GPP TS 38.321 V15.5.0 (Mar. 2019), Technical Specification, 3rd Generation Partnership Project; Technical Specification Group Radio Access Network; NR; Medium Access Control (MAC) protocol specification (Release 15).

3GPP TS 38.331 V15.5.1 (Apr. 2019), Technical Specification, 3rd Generation Partnership Project; Technical Specification Group Radio Access Network; NR; Radio Resource Control (RRC) protocol specification (Release 15).

R1-19xxxxx 3GPP TSG RAN WG2 Meeting #96bis, Xi'an, China, Apr. 8-12, 2019, Source: Nokia, Nokia Shanghai Bell, Title: Feature lead summary #2 on Cross-carrier Scheduling with Different Numerologies.

R1-1904112 3GPP TSG RAN WG2 Meeting #96bis, Xi'an, China, Apr. 8-12, 2019, Source: vivo, Title: Cross-carrier scheduling with different numerologies.

R1-1904154 3GPP TSG RAN WG2 Meeting #96bis, Xi'an, China, Apr. 8-12, 2019, Source: ZTE Corporation, Title: Discussion on cross-carrier scheduling with different numerologies.

R1-1905032 3GPP TSG RAN WG2 Meeting #96bis, Xi'an, China, Apr. 8-12, 2019, Source: Qualcomm Incorporated, Title: Cross-slot scheduling power saving techniques.

R1-1905154 3GPP TSG RAN WG2 Meeting #96bis, Xi'an, China, Apr. 8-12, 2019, Source: ASUSTek, Title: Cross-carrier scheduling with different numerologies.

R1-1905279 3GPP TSG RAN WG2 Meeting #96bis, Xi'an, China, Apr. 8-12, 2019, Source: Qualcomm Incorporated, Title: Cross-carrier scheduling with different numerologies.

R1-1905756 3GPP TSG RAN WG2 Meeting #96bis, Xi'an, China, Apr. 8-12, 2019, Source: Nokia, Nokia Shanghai Bell, Title: Feature lead summary #2 on Cross-carrier Scheduling with Different Numerologies.

R1-1906017 3GPP TSG RAN WG1 Meeting #97, Reno, USA, May 13-17, 2019, Source: Huawei, HiSilicon, Title: Remaining details for cross-carrier scheduling with different numerologies.

R1-1906183 3GPP TSG RAN WG1 Meeting #97, Reno, USA, May 13-17, 2019, Source: vivo, Title: Remaining details for cross-carrier scheduling with different numerologies.

R1-1906291 3GPP TSG RAN WG1 Meeting #97, Reno, USA, May 13-17, 2019, Source: Oppo, Title: On Cross-carrier Scheduling with Different Numerologies.

R1-1906311 3GPP TSG RAN WG1 Meeting #97, Reno, USA, May 13-17, 2019, Source: CATT, Title: Discussion on cross-carrier scheduling with different numerologies.

R1-1906359 3GPP TSG RAN WG1 Meeting #97, Reno, USA, May 13-17, 2019, Source: Spreadtrum Communications, Title: Discussion on cross-carrier scheduling with different numerologies.

R1-1906420 3GPP TSG RAN WG1 Meeting #97, Reno, USA, May 13-17, 2019, Source: ZTE Corporation, Title: Discussion on cross-carrier scheduling with different numerologies.

R1-1906527 3GPP TSG RAN WG1 Meeting #97, Reno, USA, May 13-17, 2019, Source: CMCC, Title: Discussion on cross-carrier scheduling with different numerologies.

R1-1906827 3GPP TSG RAN WG1 Meeting #97, Reno, USA, May 13-17, 2019, Source: Intel Corporation, Title: Discussion on cross-carrier scheduling with different numerologies.

R1-1906913 3GPP TSG RAN WG1 Meeting #97, Reno, USA, May 13-17, 2019, Source: Samsung, Title: Cross-carrier scheduling with different numerologies.

R1-1907065 3GPP TSG RAN WG1 Meeting #97, Reno, USA, May 13-17, 2019, Source: Nokia, Title: [96b-NR-09] Email discussion summary on cross-carrier scheduling with different numerologies.

R1-1907066 3GPP TSG RAN WG1 Meeting #97, Reno, USA, May 13-17, 2019, Source: Nokia, Nokia Shanghai Bell, Title: Feature lead summary on Cross-carrier Scheduling with Different Numerologies.

R1-1907068 3GPP TSG RAN WG1 Meeting #97, Reno, USA, May 13-17, 2019, Source: Nokia, Nokia Shanghai Bell, Title: Remaining details of cross-carrier scheduling with mixed numerologies.

R1-1907304 3GPP TSG RAN WG1 Meeting #97, Reno, USA, May 13-17, 2019, Source: Qualcomm Incorporated, Title: Cross-Carrier Scheduling with Different Numerologies.

R1-1907331 3GPP TSG RAN WG1 Meeting #97, Reno, USA, May 13-17, 2019, Source: Ericsson, Title: Cross-carrier scheduling with different numerologies.

R1-1907557 3GPP TSG RAN WG1 Meeting #97, Reno, USA, May 13-17, 2019, Source: KT Corp., Title: On Cross-carrier Scheduling with Different Numerologies.

R1-1907759 3GPP TSG RAN WG1 Meeting #97, Reno, USA, May 13-17, 2019, Source: Nokia, Nokia Shanghai Bell, Title: Feature lead summary #2 on Cross-carrier Scheduling with Different Numerologies.

R1-1907855 3GPP TSG RAN WG1 Meeting #97, Reno, USA, May 13-17, 2019, Source: Nokia, Nokia Shanghai Bell, Title: Feature lead summary #3 on Cross-carrier Scheduling with Different Numerologies.

R1-1905142 3GPP TSG RAN WG2 Meeting #96bis, Xi'an, China, Apr. 8-12, 2019, Source: Ericsson, Title: Cross-carrier scheduling with different numerologies.

Dec. 1, 2020—European Search Report—20183737.4.

R1-1807071, 3GPP TSG RAN WG1 Meeting #93, Busan, Korea, May 21-25, 2018, Source: NTT Docomo, Inc., Title: Remaining Issues CA and type1 HARQ-ACK codebook.

R1-1903206, 3GPP TSG RAN WG1 Meeting #96, Athens, Greece, Feb. 25-Mar. 1, 2019, Source: Huawei, HiSilicon, Title: Clarification on HARQ-ACK codebook and PUCCH resource determination.

(56) References Cited

OTHER PUBLICATIONS

R1-1813114, 3GPP TSG RAN WG1 Meeting #95, Spokane, USA, Nov. 12-16, 2018, Source: Nokia, Nokia Shanghai Bell, Title: On UCI Enhancements for URLLC.
Feb. 13, 2023—European Office Action—20183737.4.

* cited by examiner

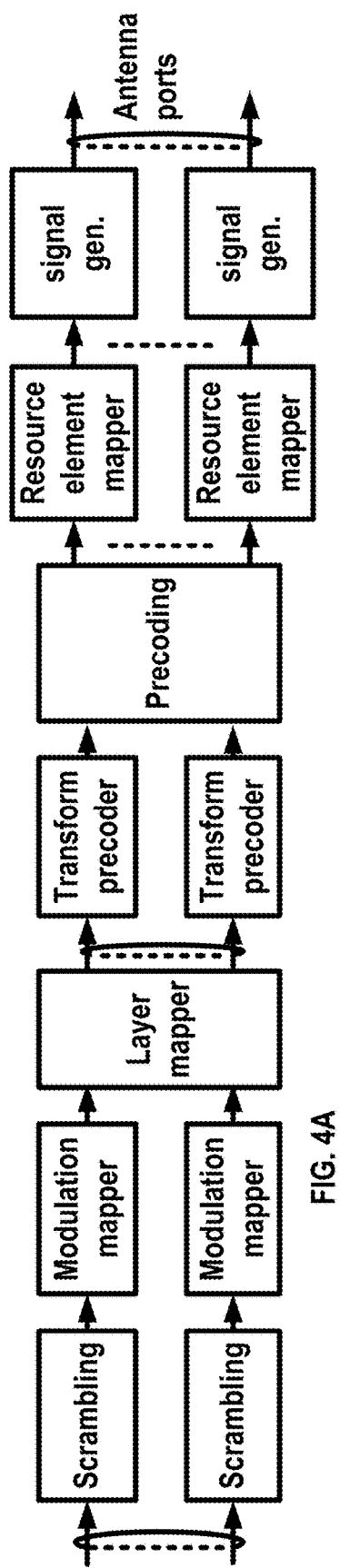
FIG. 4A
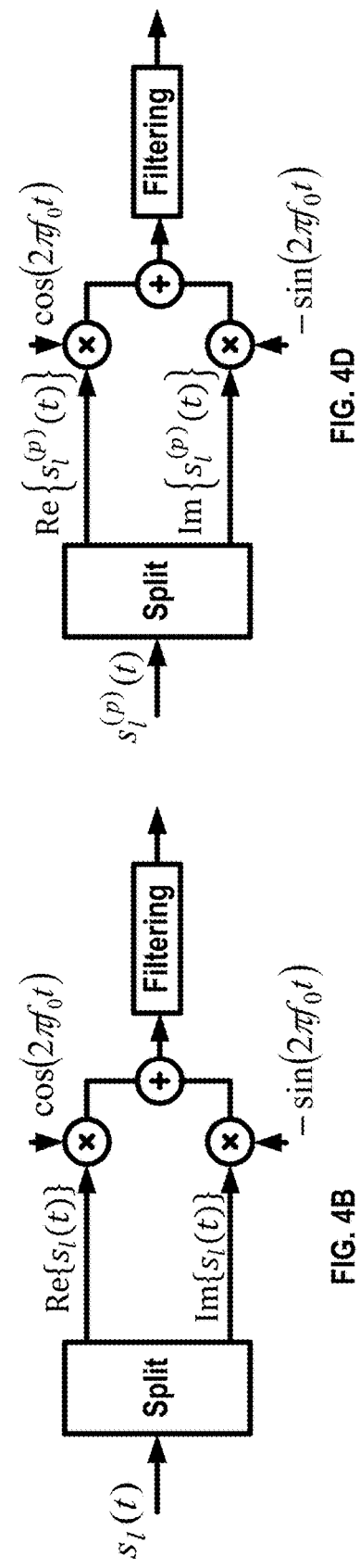
FIG. 4B
FIG. 4D
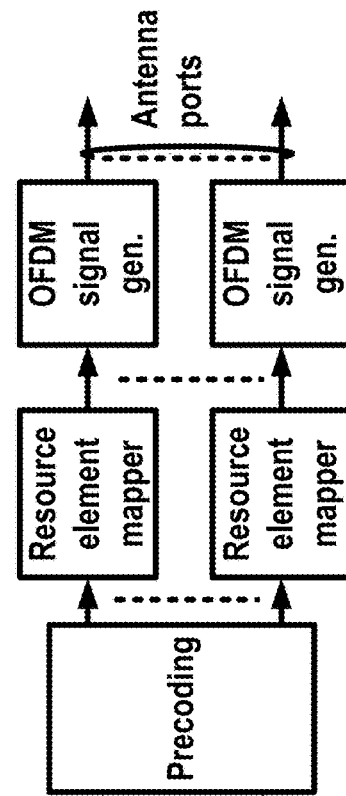
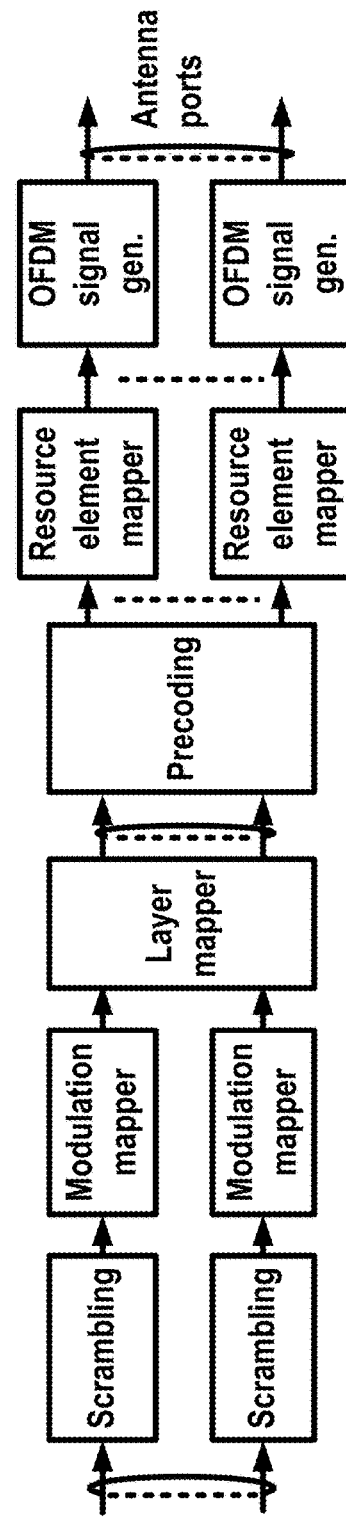
FIG. 4C

WIRELESS RESOURCE DETERMINATION AND USE

CROSS-REFERENCE TO RELATED APPLICATIONS

This application is a continuation of U.S. patent application Ser. No. 16/919,287, filed Jul. 2, 2020, which claims the benefit of U.S. Provisional Application No. 62/869,642, filed Jul. 2, 2019. Each of the above-referenced applications is hereby incorporated by reference in its entirety.

BACKGROUND

Wireless devices communicate with base stations and/or other wireless devices. Wireless devices send a variety of messages using a variety of resources, including sending messages via a physical uplink control channel (PUCCH) resource.

SUMMARY

The following summary presents a simplified summary of certain features. The summary is not an extensive overview and is not intended to identify key or critical elements.

Wireless communications and control information transmission/reception are described. Control information may be used to schedule transmissions, such as downlink transmissions, uplink transmissions, sidelink transmissions, and/or any other transmissions. A plurality of control information messages may be received, during the same monitoring period, indicating a plurality of different time and/or frequency resources for the wireless device to use for a transmission. The control information messages may be used to determine, for the transmission, a resource from among the plurality of different resources. The resource for the transmission may be determined, for example, based on a transport block (TB), a coreset, a PDCCH monitoring occasion, a search space set, timing, and/or a priority parameter.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

DETAILED DESCRIPTION

Figure 1:
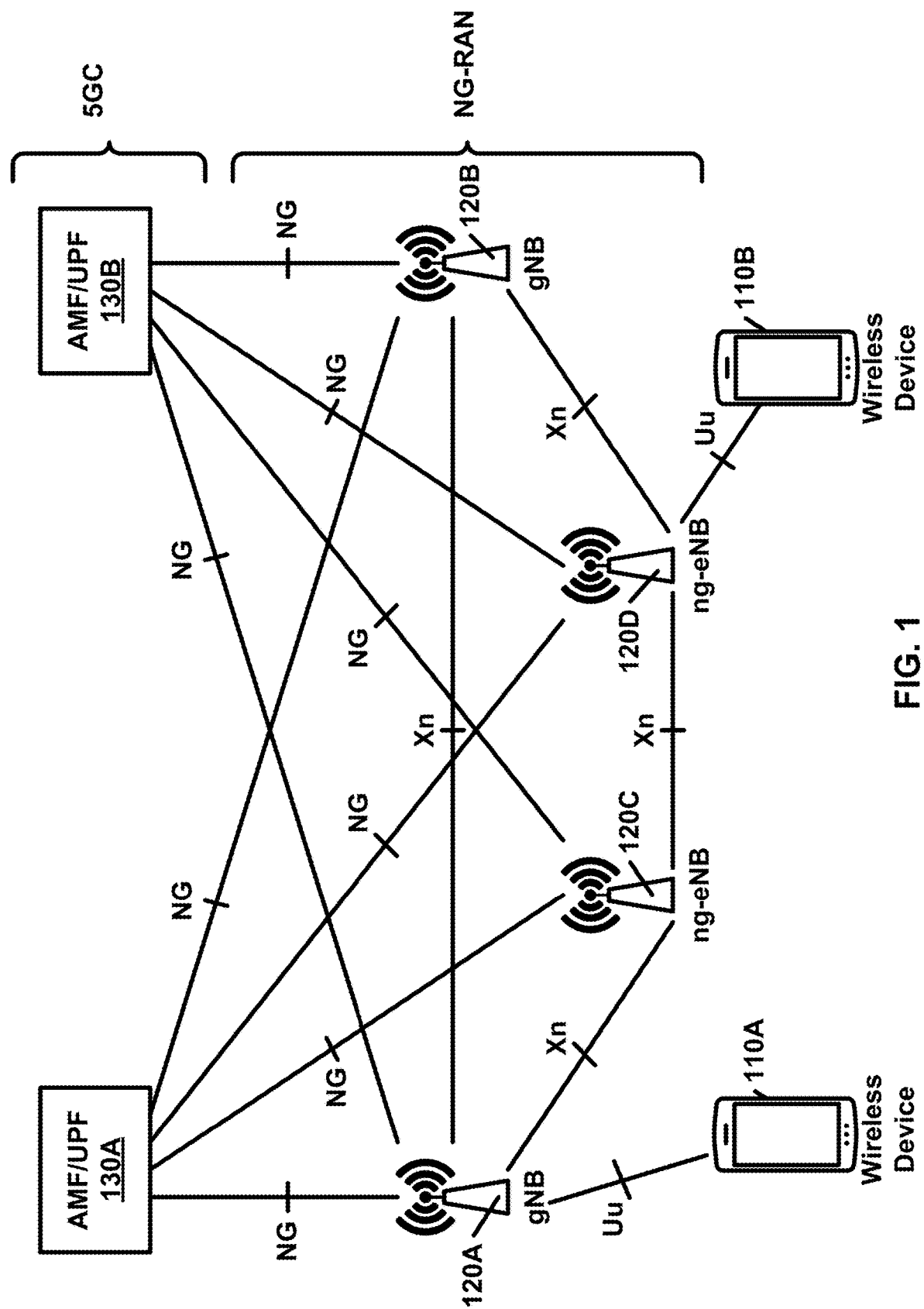
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

The accompanying drawings and descriptions provide examples. It is to be understood that the examples shown in the drawings and/or described are non-exclusive and that there are other examples of how features shown and described may be practiced. Example embodiments of the present disclosure enable operation of wireless resource determination, such as physical uplink control channel resource determination. Embodiments of the technology disclosed herein may be employed in the technical field of multicarrier communication systems. More particularly, the embodiments of the technology disclosed herein may relate to physical uplink control channel resource determination in a multicarrier communication system.

The following acronyms are used throughout the drawings and/or descriptions, and are provided below for convenience although other acronyms may be introduced in the detailed description:

3GPP 3$^{rd}$ Generation Partnership Project
5G 5$^{th}$ generation mobile networks
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CBR Channel Busy Ratio
CC Component Carrier
CCCH Common Control Channel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CR Channel Occupancy Ratio
CS Configured Scheduling
CSI Channel State Information
CSI-RS Channel State Information-Reference Signal
CQI Channel Quality Indicator
CRI CSI-RS resource indicator
CSS Common Search Space
CU Central Unit
D2D device to device
DC Dual Connectivity
DCCH Dedicated Control Channel
DCI Downlink Control Information
DL Downlink
DL-SCH Downlink Shared Channel
DM-RS DeModulation Reference Signal
DRB Data Radio Bearer
DRX Discontinuous Reception
DTCH Dedicated Traffic Channel
DU Distributed Unit
eNB Evolved Node B
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
GNSS Global Navigation Satellite System
GPS Global Positioning System
gNB next generation Node B
HARQ Hybrid Automatic Repeat Request
HDL Hardware Description Languages
IE Information Element
IBE In-Band Emission
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MIMO Multiple Input Multiple Output
MME Mobility Management Entity
MN Master Node
MU-MIMO multi-user-MIMO
NACK Negative Acknowledgement
NAS Non-Access Stratum
NDI New Data Indicator
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NR UE New Radio UE
NSSAI Network Slice Selection Assistance Information
O&M Operation and Maintenance
OFDM Orthogonal Frequency Division Multiplexing
PBCH Physical Broadcast Channel
PCC Primary Component Carrier
PCCH Paging Control Channel
PCell Primary Cell
PCH Paging Channel
PDCCH Physical Downlink Control Channel
PDCP Packet Data Convergence Protocol
PDSCH Physical Downlink Shared Channel
PDU Protocol Data Unit
PHICH Physical HARQ Indicator Channel
PHY PHYsical
PLMN Public Land Mobile Network
PMI Precoding Matrix Indicator
PRACH Physical Random Access Channel
PRB Physical Resource Block
PSBCH Physical Sidelink Broadcast Channel
PSCCH Physical Sidelink Control Channel
PSCell Primary Secondary Cell
PSDCH Physical Sidelink Discovery Channel
PSS Primary Synchronization Signal
PSSCH Physical Sidelink Shared Channel
pTAG primary Timing Advance Group
PT-RS Phase Tracking Reference Signal
PUCCH Physical Uplink Control Channel
PUSCH Physical Uplink Shared Channel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access Channel
RAN Radio Access Network
RAT Radio Access Technology
RA-RNTI Random Access-Radio Network Temporary Identifier RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSSI Received Signal Strength Indicator
RSU Roadside Unit
RV Redundancy Version
RSRP Reference Signal Received Power
S-PSS Sidelink Primary Synchronization Signal
S-SSB Sidelink Synchronization Signal Block
S-SSS Sidelink Secondary Synchronization Signal
SCC Secondary Component Carrier
SCell Secondary Cell
SCG Secondary Cell Group
SCS Subcarrier spacing
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SLSS Sidelink Synchronization Signal
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared Channel
UPF User Plane Function
UPGW User Plane Gateway
URLLC Ultra-Reliable Low-Latency Communication
V2X Vehicle-to-everything
V2P Vehicle-to-pedestrian
V2V Vehicle-to-vehicle
V2I Vehicle-to-infrastructure
V2N Vehicle-to-network
V2I/N Vehicle-to-infrastructure/network
VHDL VHSIC Hardware Description Language
VHSIC Very High Speed Integrated Circuit
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNB s 120A and 120B) and/or one or more second base stations (e.g., ng-eNB s 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between $3^{rd}$ Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
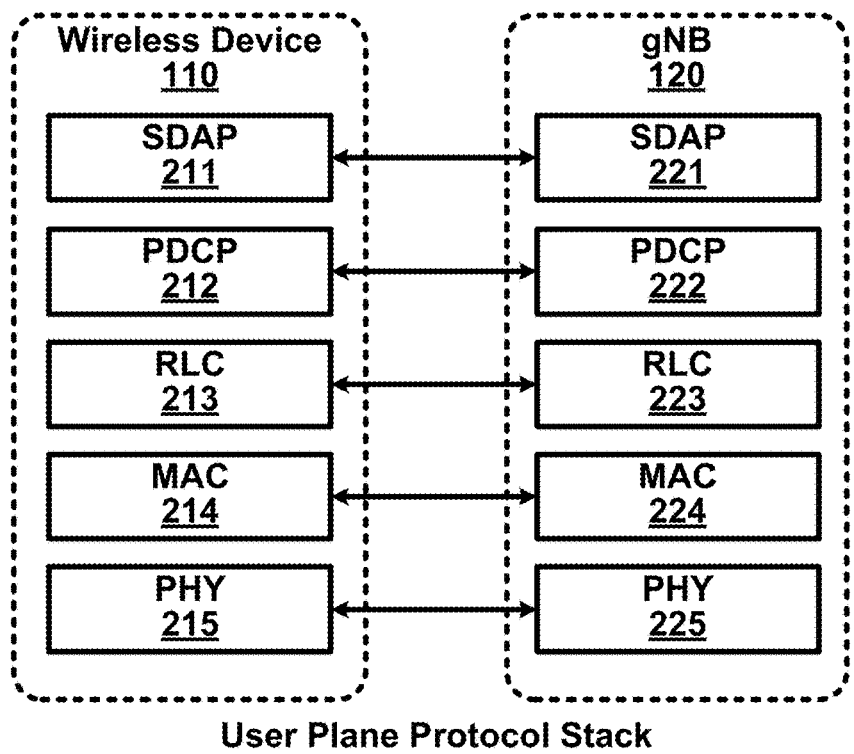
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TB s) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
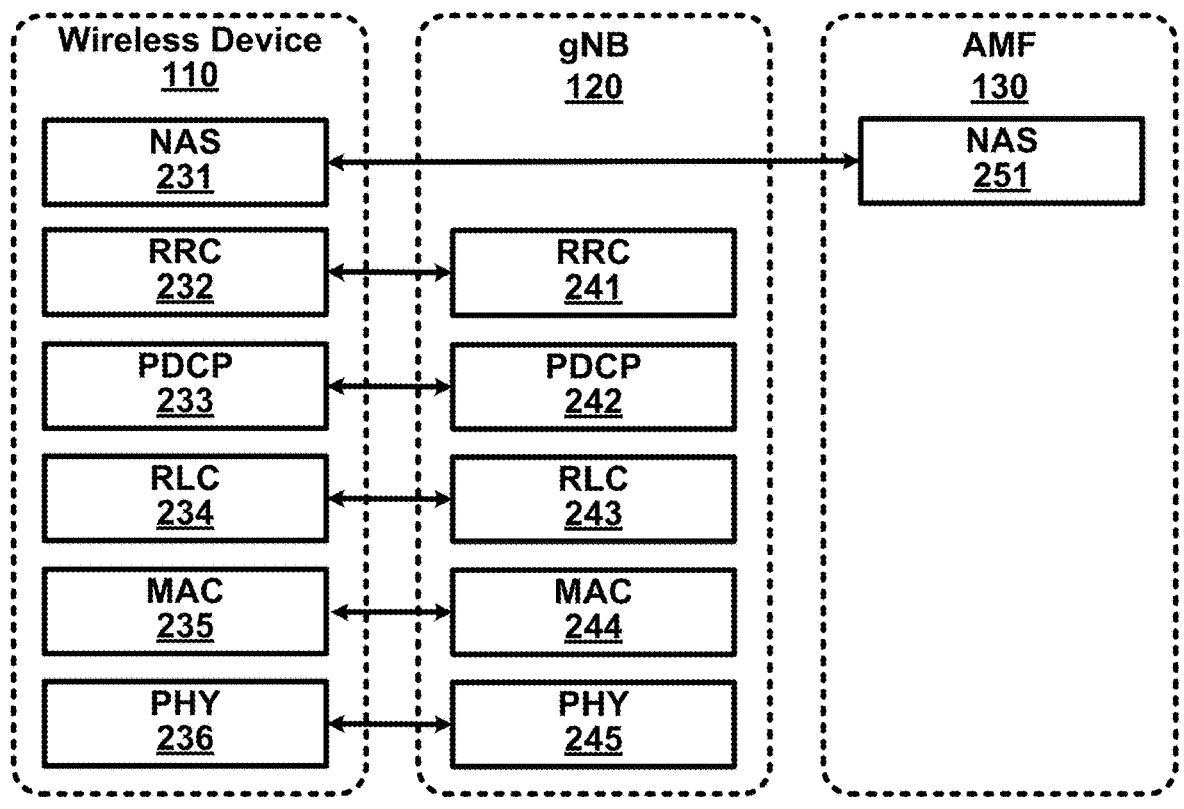
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel Identifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
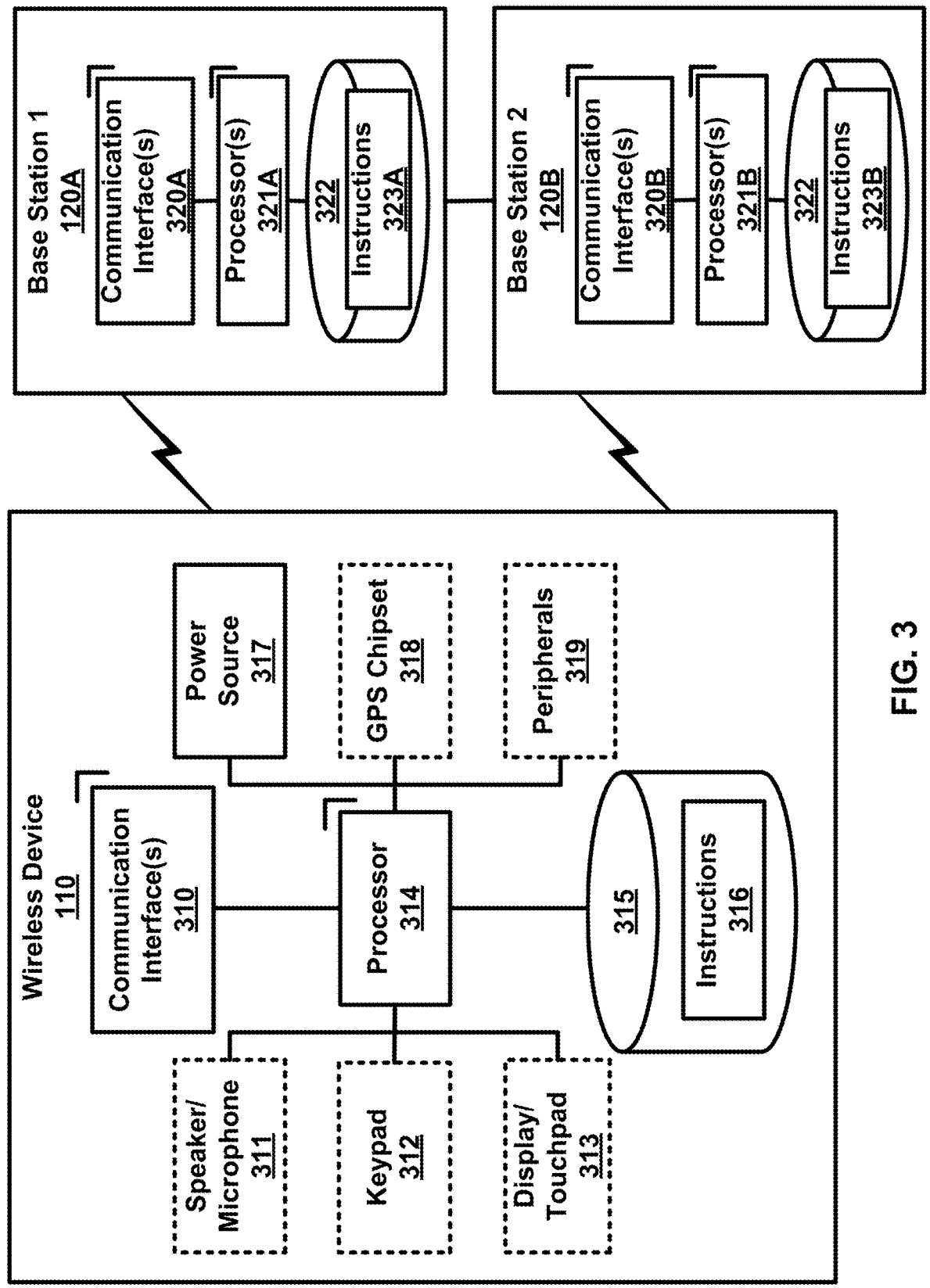
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, one or more transmission and reception points (TRPs), or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any quantity/number of sectors, for example: 1, 2, 3, 4, or 6 sectors. A base station may comprise any quantity/number of transmission and reception points (TRPs) (e.g., two TRPs, or any quantity of TRPs). A base station may comprise any quantity/number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated signaling (e.g., RRC signaling) may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, transmission and reception points (TRPs), computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a TRP, a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access Channel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
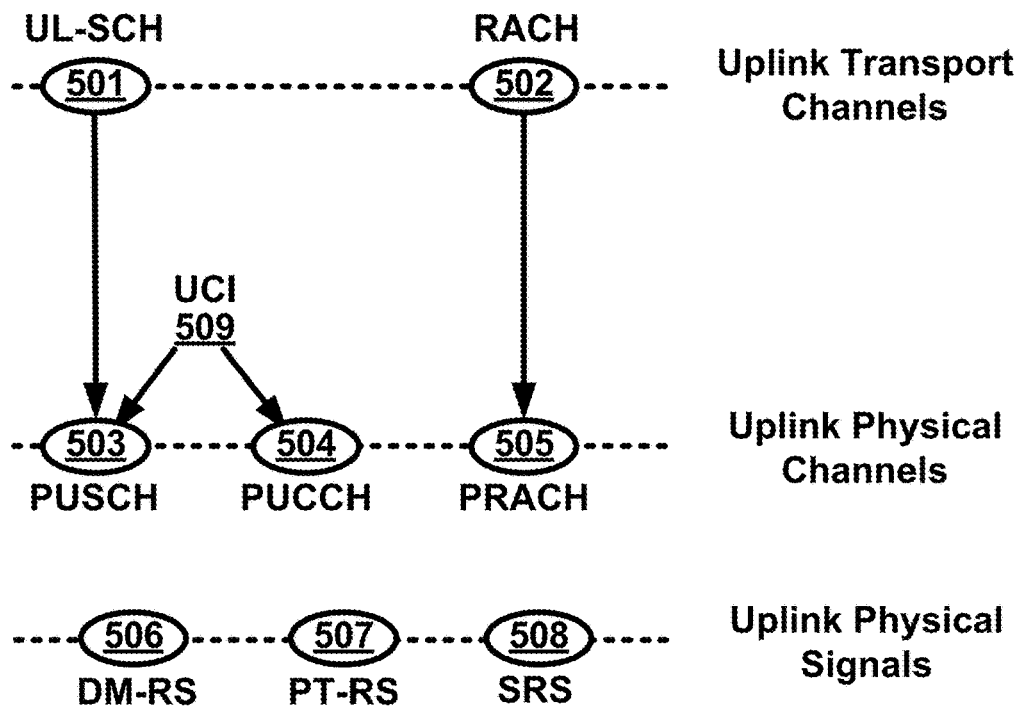
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared Channel (UL-SCH) 501 and/or a Random Access Channel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum quantity/number of front-loaded DM-RS symbols for PUSCH and/or PUCCH. The wireless device may schedule a single-symbol DM-RS and/or double symbol DM-RS based on a maximum quantity/number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A quantity/number of PT-RS ports may be less than a quantity/number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a quantity/number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a quantity/number of OFDM symbols in a SRS resource, starting OFDM symbol of a SRS resource, an SRS bandwidth, a frequency hopping bandwidth, a cyclic shift, and/or an SRS sequence ID.

Figure 5B:
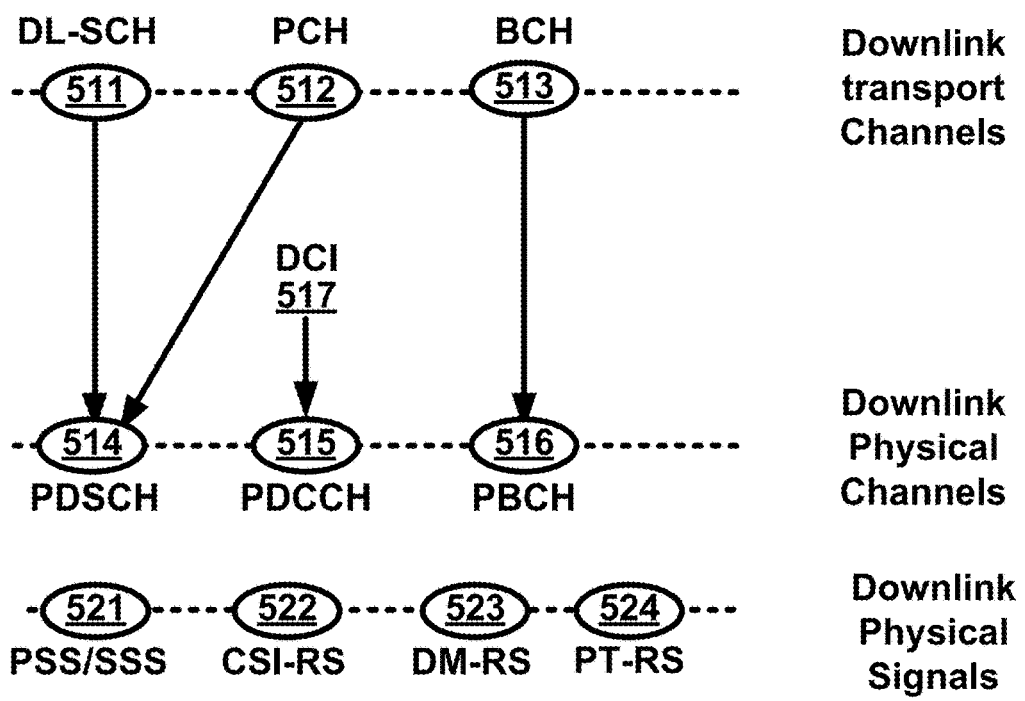
FIG. 5B shows an example downlink channel mapping and example downlink physical signals.

FIG. 5B shows an example downlink channel mapping and downlink physical signals. Downlink transport channels may comprise a Downlink-Shared Channel (DL-SCH) 511, a Paging Channel (PCH) 512, and/or a Broadcast Channel (BCH) 513. A transport channel may be mapped to one or more corresponding physical channels. A UL-SCH 501 may be mapped to a Physical Uplink Shared Channel (PUSCH) 503. A RACH 502 may be mapped to a PRACH 505. A DL-SCH 511 and a PCH 512 may be mapped to a Physical Downlink Shared Channel (PDSCH) 514. A BCH 513 may be mapped to a Physical Broadcast Channel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control Channel (PUCCH) 504 may carry UCI 509 from a wireless device to a base station. A Physical Downlink Control Channel (PDCCH) 515 may transmit the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS block and/or PBCH (SSB/PBCH) may comprise one or more OFDM symbols (e.g., 4 OFDM symbols numbered in increasing order from 0 to 3) within the SSB/PBCH. An SSB/PBCH may comprise the PSS/SSS 521 and/or the PBCH 516. In the frequency domain, an SSB/PBCH may comprise one or more contiguous subcarriers (e.g., 240 contiguous subcarriers with the subcarriers numbered in increasing order from 0 to 239) within the SSB/PBCH. The PSS/SSS 521 may occupy, for example, 1 OFDM symbol and 127 subcarriers. The PBCH 516 may span across, for example, 3 OFDM symbols and 240 subcarriers. A wireless device may assume that one or more SSB/PBCH transmitted with a same block index may be quasi co-located, for example, with respect to Doppler spread, Doppler shift, average gain, average delay, and/or spatial Rx parameters. A wireless device may not assume quasi co-location for other SSB/PBCH transmissions. A periodicity of an SSB/PBCH may be configured by a radio network (e.g., by an RRC signaling). One or more time locations in which the SSB/PBCH may be sent may be determined by sub-carrier spacing. A wireless device may assume a band-specific sub-carrier spacing for an SSB/PBCH, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a quantity/number of antenna ports. A base station may configure a wireless device with 32 ports, or any quantity/other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum quantity/number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A quantity/number of PT-RS ports may be less than a number of DM-RS ports in a scheduled resource. The downlink PT-RS 524 may be confined in the scheduled time/frequency duration for a wireless device.

Figure 6:
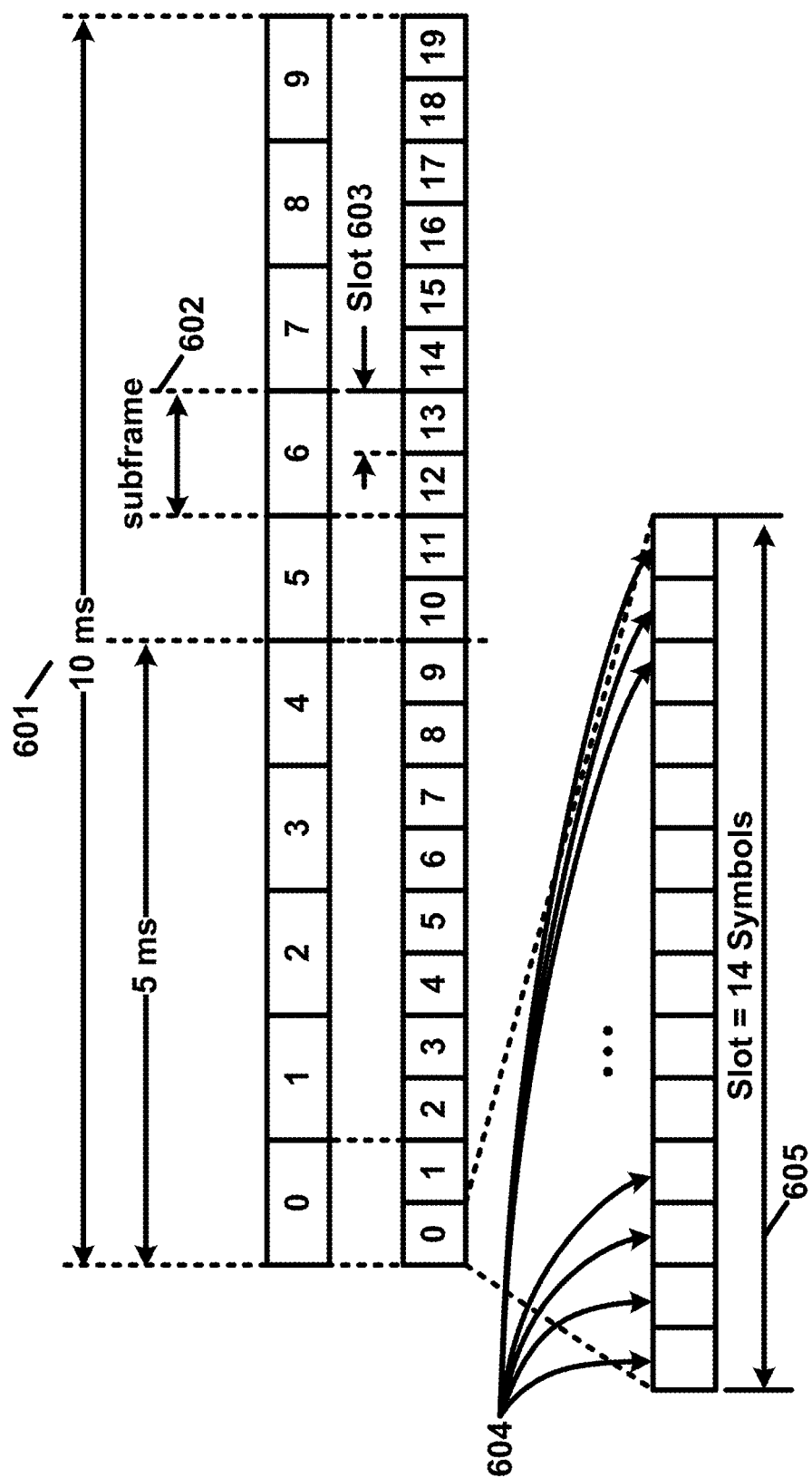
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The quantity/number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
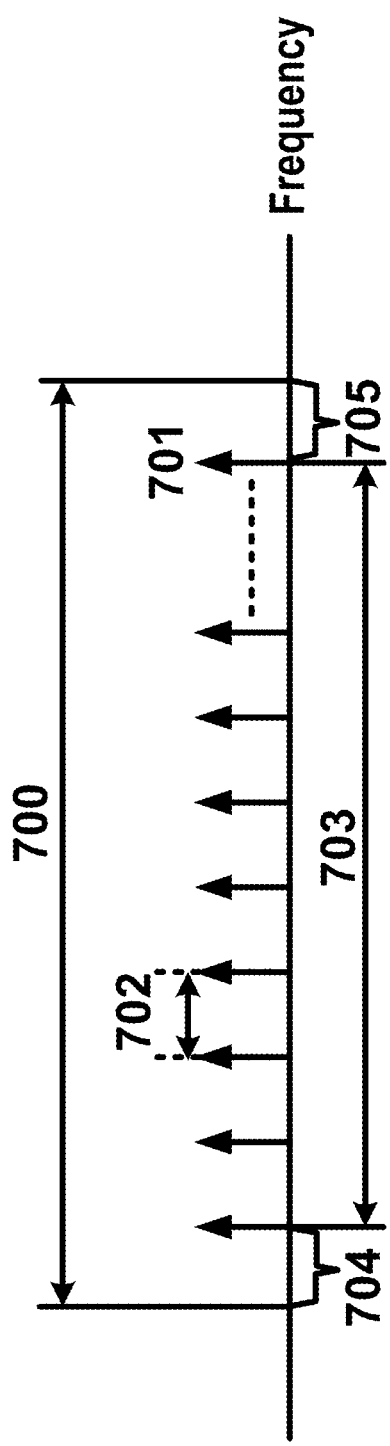
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a quantity/number of subcarriers 703 in a carrier. A bandwidth occupied by a quantity/number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A quantity/number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in quantity/number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
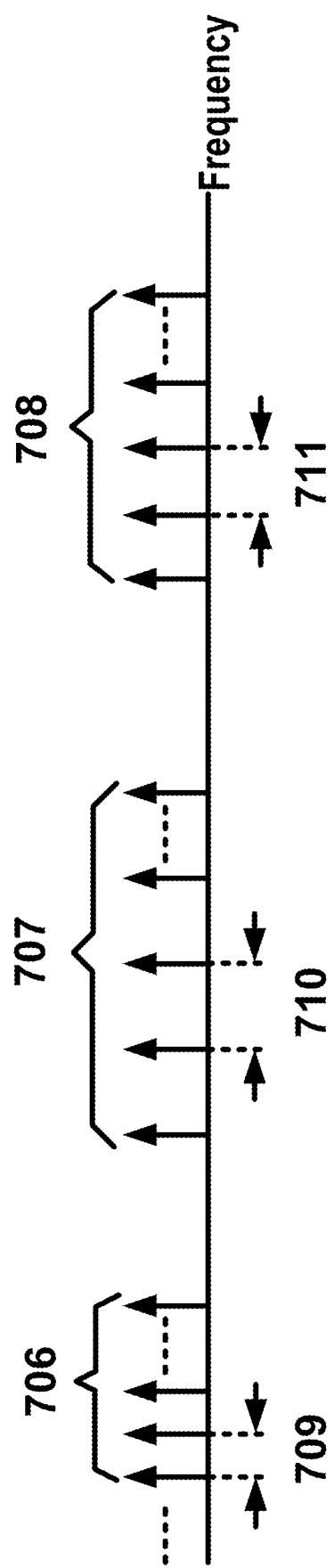

FIG. 7B shows examples of component carriers. A first component carrier may comprise a first quantity/number of subcarriers 706 having a first subcarrier spacing 709. A second component carrier may comprise a second quantity/number of subcarriers 707 having a second subcarrier spacing 710. A third component carrier may comprise a third quantity/number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
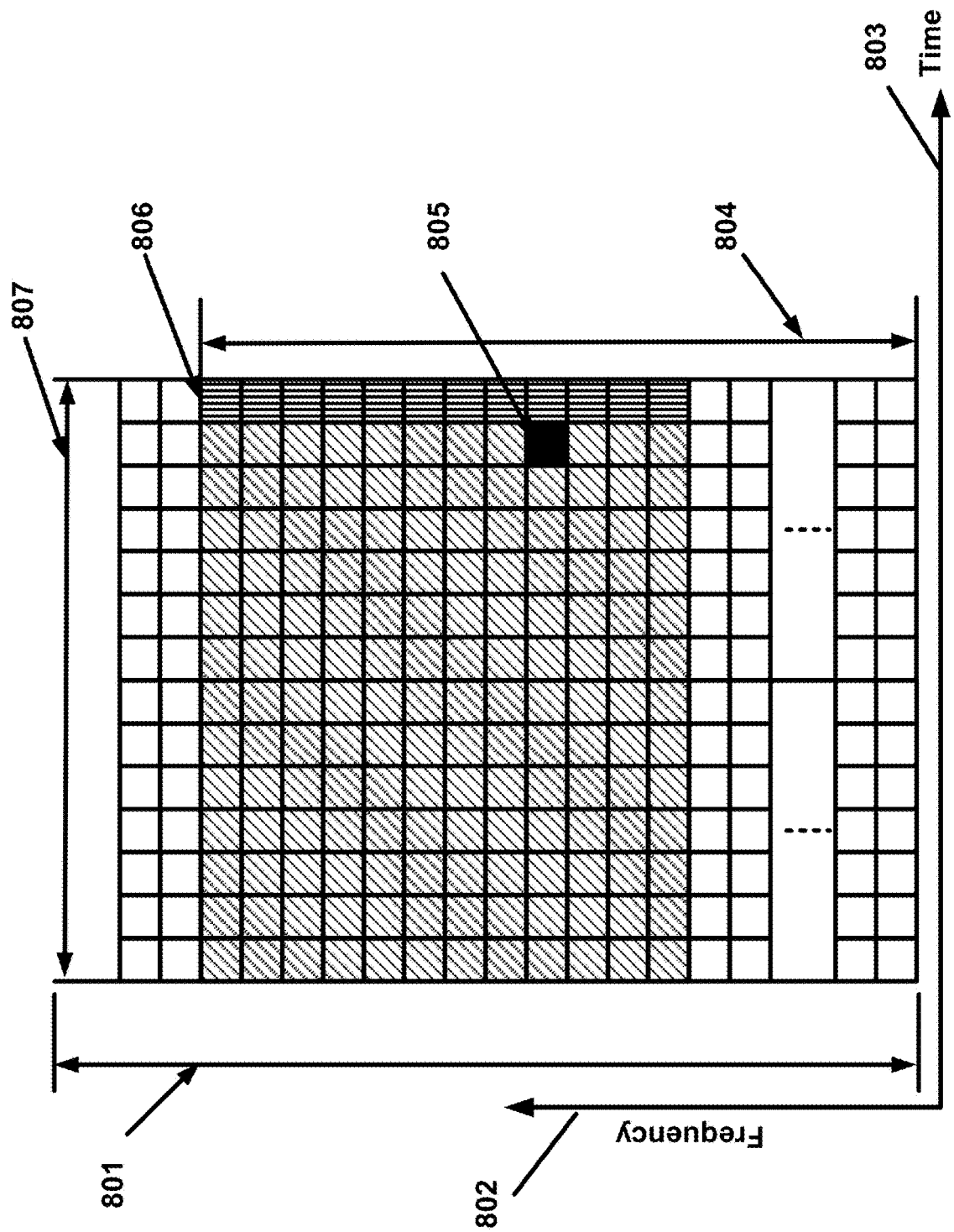
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first quantity/number of OFDM symbols in a subframe and a second quantity/number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first quantity/number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second quantity/number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a pre-emption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCLed with the DM-RS antenna port(s). A different set of DM-RS antenna port(s) for a DL data channel may be indicated as QCL with a different set of the RS antenna port(s).

Figure 9A:
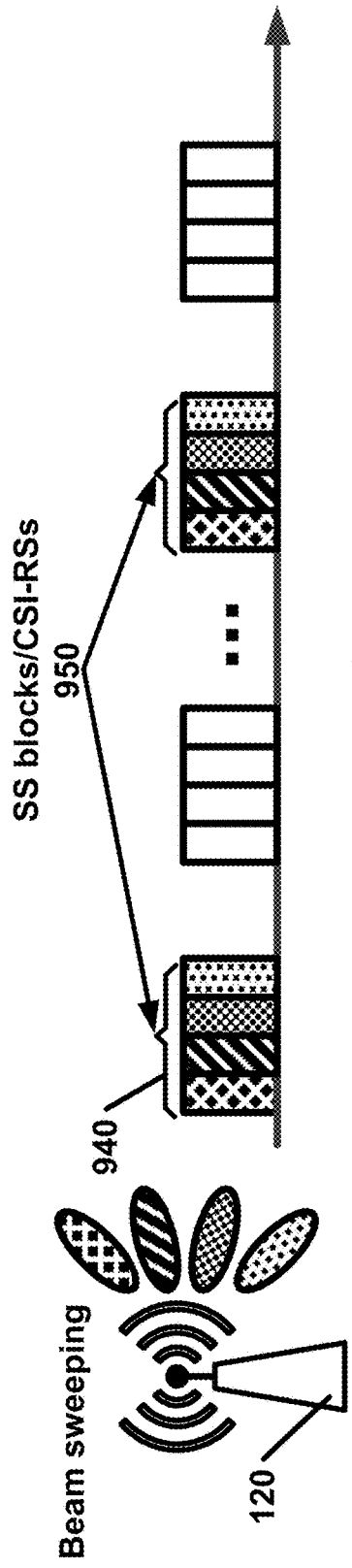
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming an SS burst 940, for example, in a multi-beam operation. One or more SS blocks may be sent (e.g., transmitted) on one beam. If multiple SS bursts 940 are transmitted with multiple beams, the SS bursts 940 together may form the SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
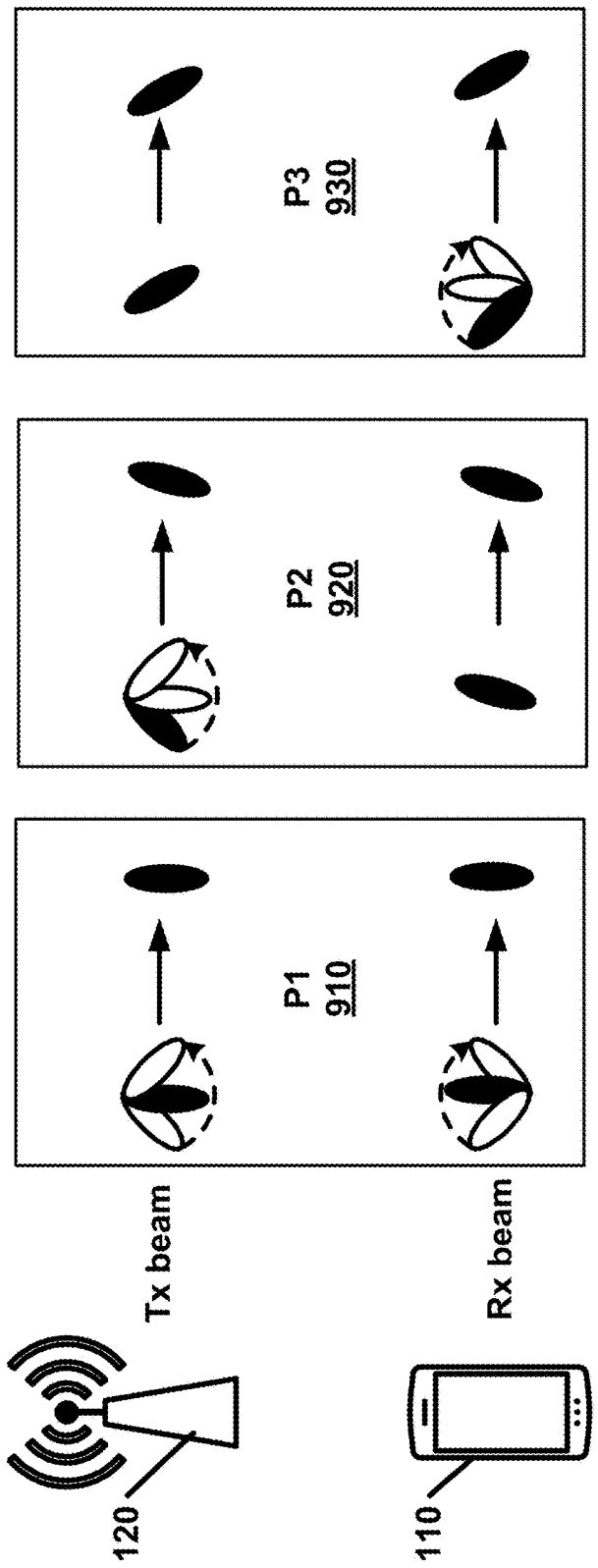
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
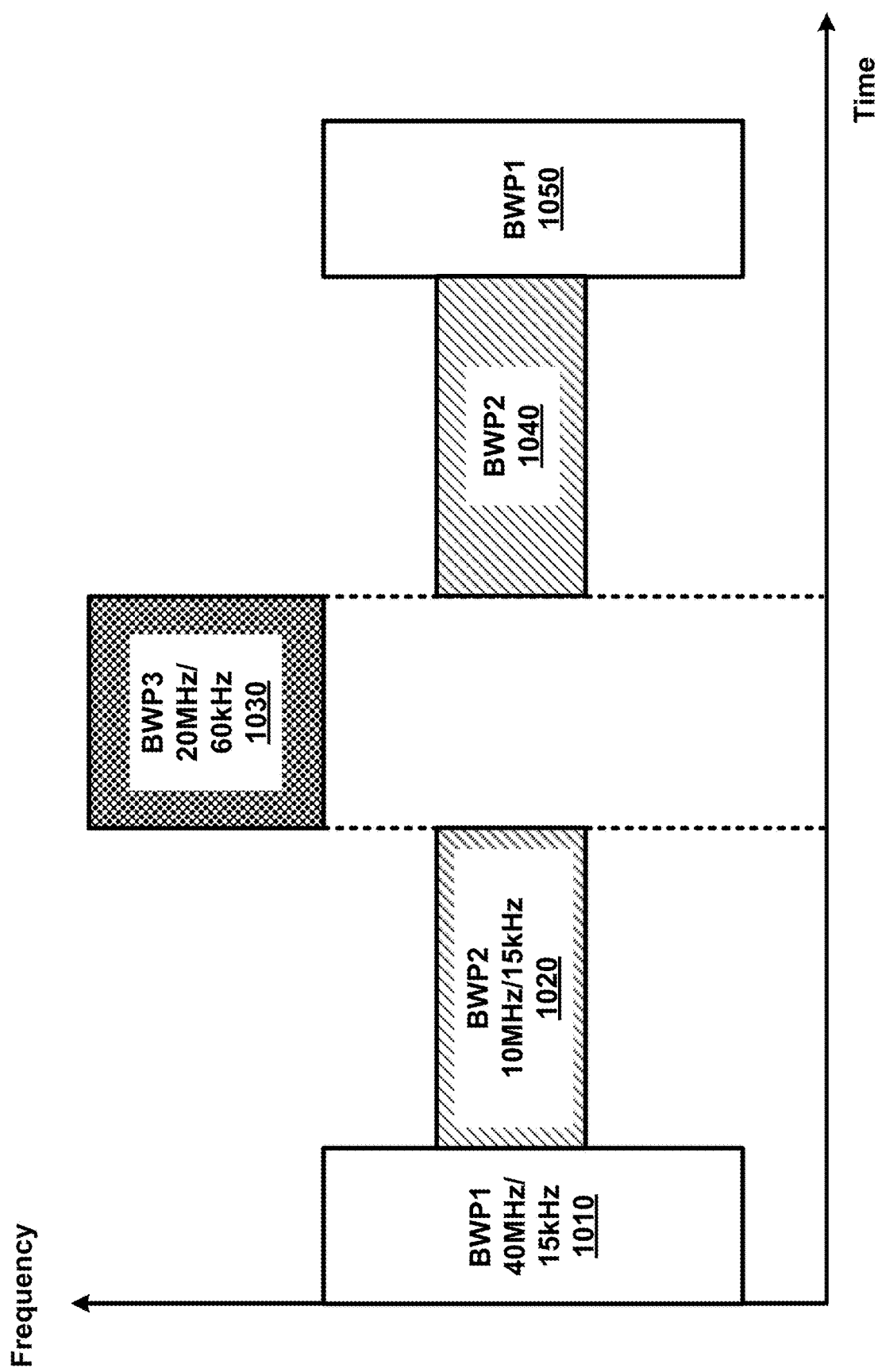
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any quantity/number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and quantity/number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure (e.g., refrain from configuring) a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
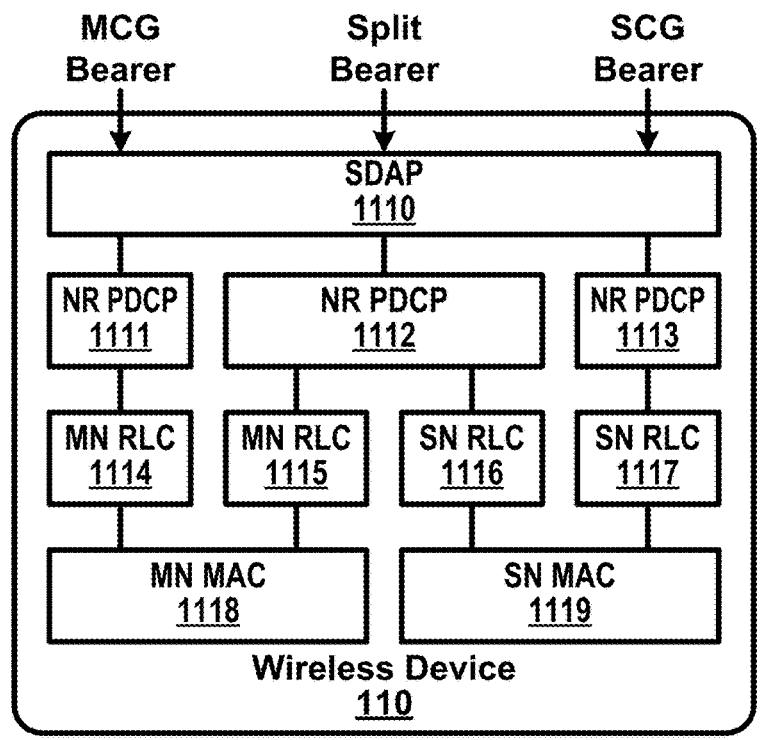
FIG. 11A and FIG. 11B show examples of multi connectivity.
Figure 11B:
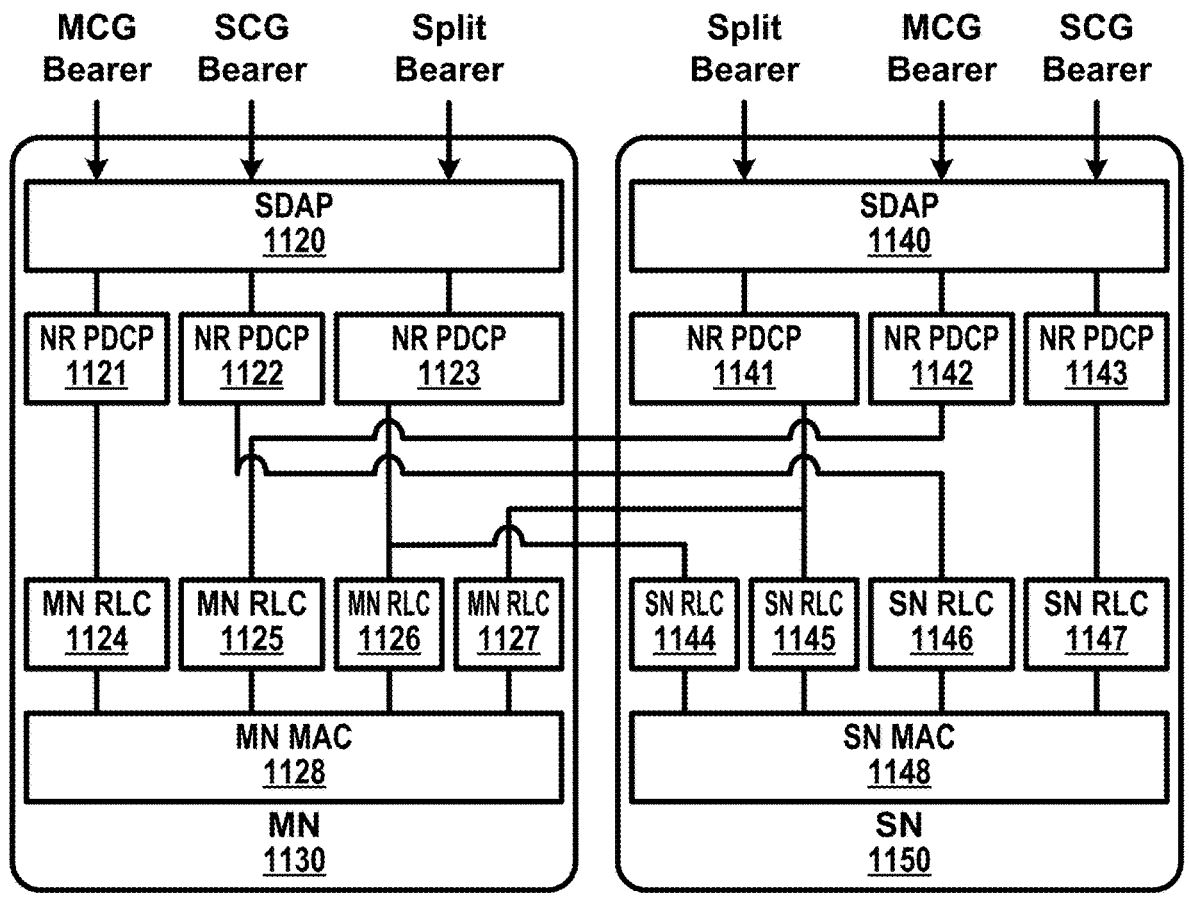

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In wireless communications (e.g., in multi connectivity), a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCg, PCell), and may be configured with PUCCH resources. If an SCG is configured, there may be at least one SCG bearer or one split bearer. After or upon detection of a physical layer problem or a random access problem on a PSCell, or a quantity/number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) transmitted via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
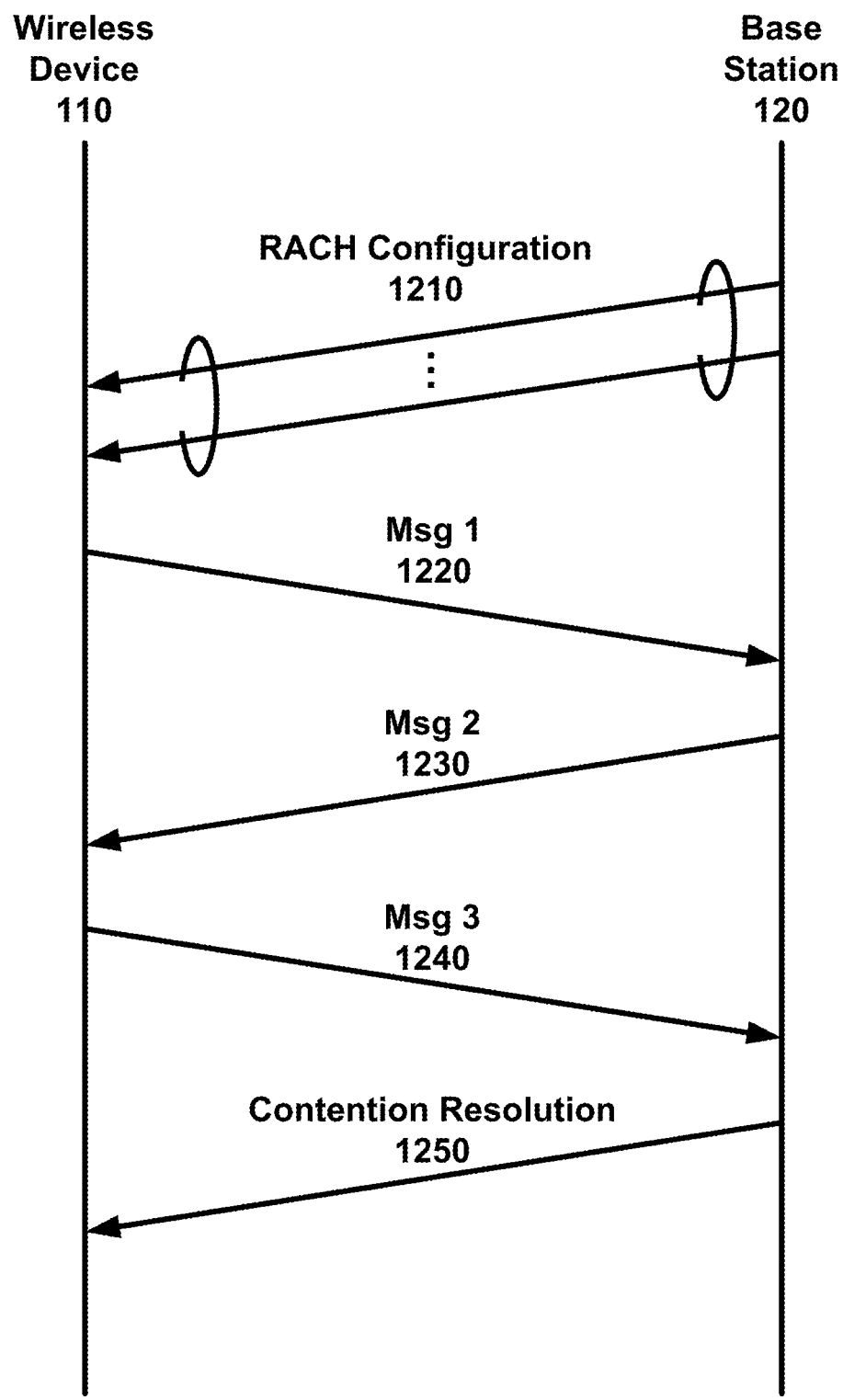
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg 1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum quantity/number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request/procedure and corresponding PRACH resource(s) (e.g., if any), a time window to monitor RA response(s), a time window to monitor response(s) on a beam failure recovery request/procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request/procedure associated with at least one of SS blocks and/or CSI-RSs. A wireless device may select a random access preamble index corresponding to a selected SS block or a CSI-RS from a set of one or more random access preambles for a beam failure recovery request/procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request/procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
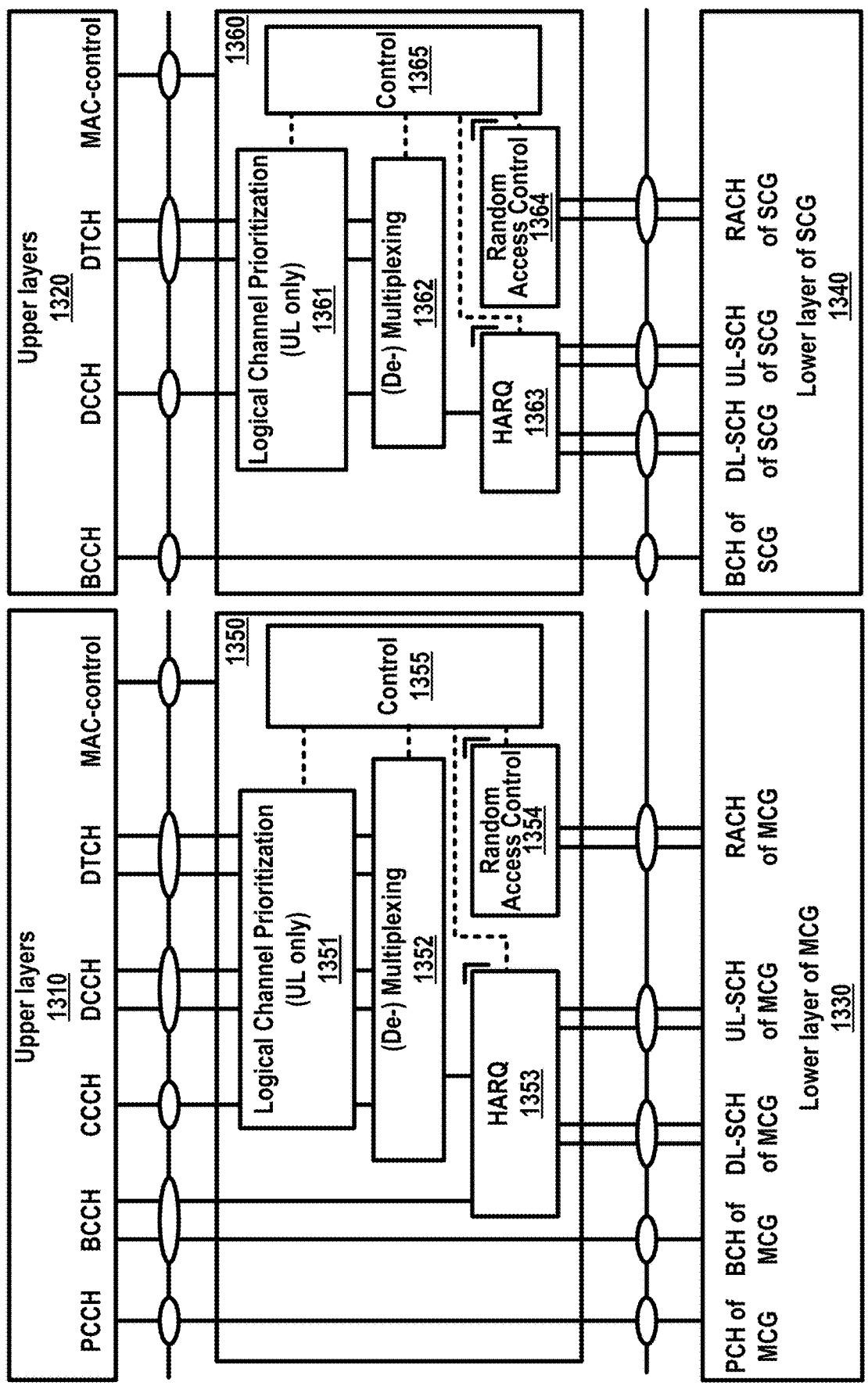
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a quantity/number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
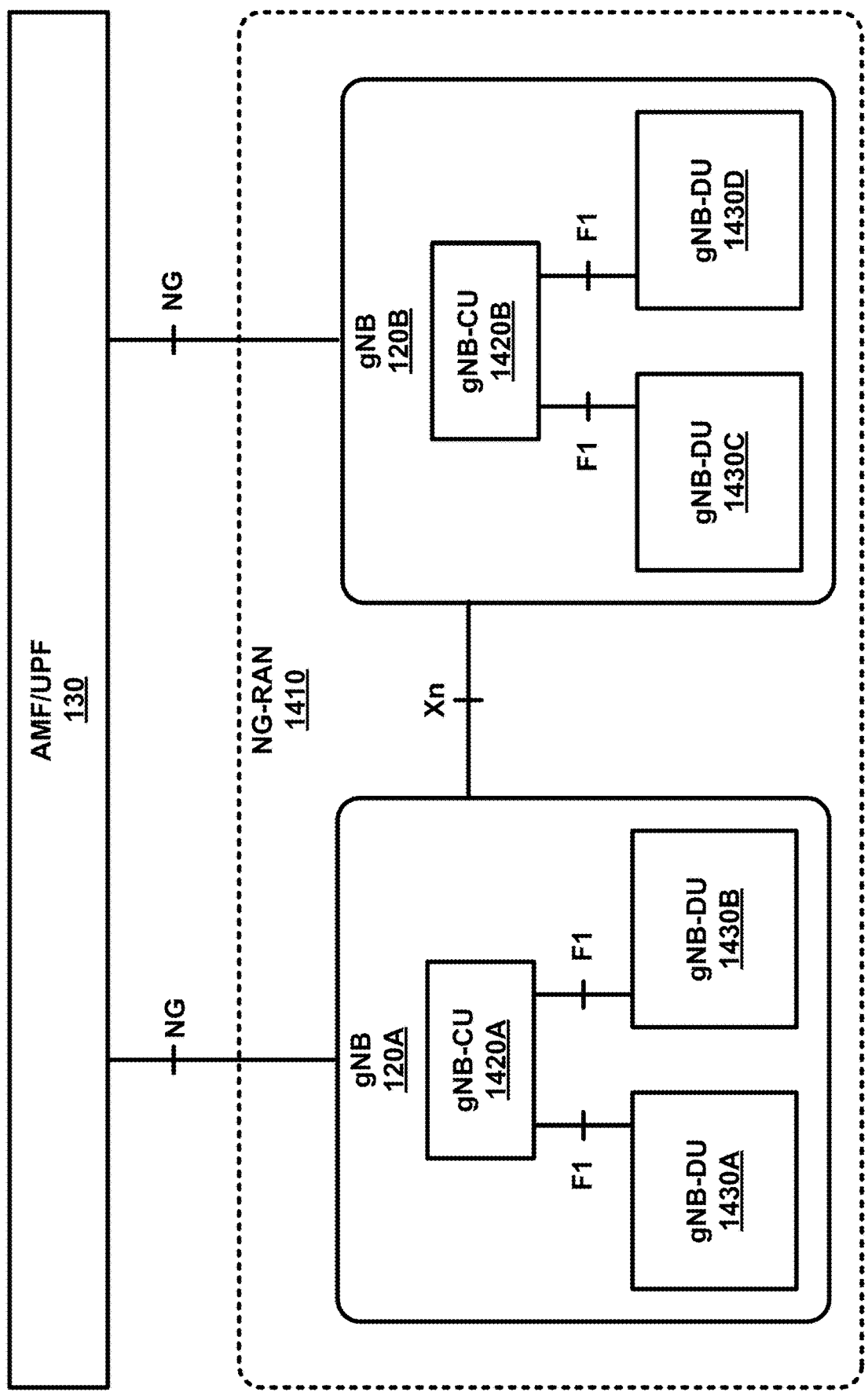
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station Dus may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
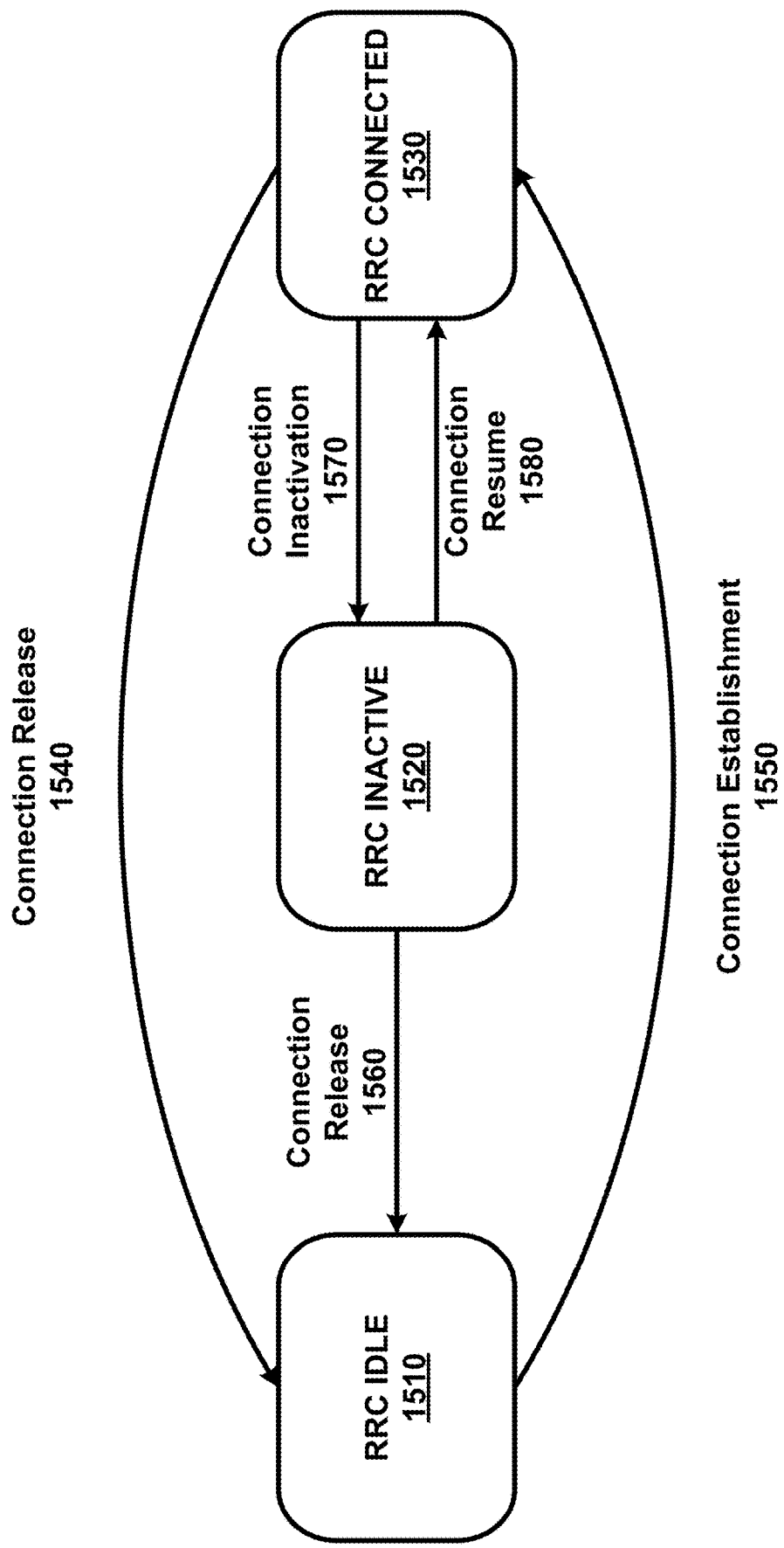
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

Control information may be used to schedule transmissions between devices (e.g., wireless devices, base stations, etc.), such as downlink transmissions, uplink transmissions, sidelink transmissions, and/or any other transmissions. Various types of control information (e.g., downlink control information (DCI)) may indicate to a wireless device a time and/or frequency resource (e.g., time slot, channel, etc.). A plurality of DCI messages, for scheduling reception of downlink transport blocks (TB s), may be received during a same monitoring period (e.g., a same PDCCH monitoring occasion). Each DCI message may indicate a downlink resource (e.g., a downlink time slot, a PDSCH resource, etc.) for receiving at least one TB. Each DCI message may indicate an uplink resource (e.g., an uplink time slot, a PUCCH resource, etc.) to use for a transmission, such as for sending an acknowledgment of the at least one TB (e.g., a HARQ-ACK information). The plurality of DCI messages may indicate the same time slot to use for the transmission. The wireless device may be unable to send separate transmissions in the same time slot. As a result, the wireless device may determine to multiplex all of the transmissions into one message via the same resource. However, each DCI message may indicate a different resource to use for its corresponding transmission. Thus, a wireless device may not be able to determine which resource (e.g., PUCCH resource) to use for a transmission (e.g., a multiplexed transmission), such as to provide acknowledge of receipt of the TB(s) scheduled by the DCI message(s). Multiple PUCCH resources may satisfy a rule, for example, if multiple DCI messages are received/detected in the same PDCCH monitoring occasion. It may be unclear which PUCCH resource, indicated by which DCI message, should be used by the wireless device to send acknowledgement of the TB(s). Additionally or alternatively, a base station may not be able to determine which resource the wireless device will use to send acknowledgement of the TB(s). Problems may arise between the base station and the wireless device, such as misalignment of communications, increased monitoring requirements, increased use of processing power, and/or delay in providing and/or determining an acknowledgement of communication.

As described herein, wireless communications may be improved for communicating between various devices (e.g., wireless device-to-base station, base station-to-wireless device, wireless device-to-wireless device, etc.). A wireless device may determine to use a resource (e.g., PUCCH resource), indicated by control information (e.g., DCI), for sending an acknowledgement (e.g., HARQ-ACK feedback information) of a reception of data (e.g., at least one TB). The wireless device may use a resource indicated by a DCI message that has been determined from a plurality of DCI messages. The plurality of DCI messages may be received during a same monitoring period (e.g., a same PDCCH monitoring occasion). Each DCI message may indicate a downlink resource (e.g., a downlink time slot, a PDSCH resource, etc.) for receiving at least one TB. Each DCI message may indicate an uplink resource (e.g., an uplink time slot, a PUCCH resource, etc.) to use for a transmission, such as for sending an acknowledgment of the at least one TB (e.g., a HARQ-ACK information). The plurality of DCI messages may indicate the same time slot to use for the transmission (e.g., acknowledgement). The resource may be determined, for example, based on at least one of a: TB, coreset, PDCCH monitoring occasion, search space set, timing, and/or priority parameter that may be associated with the determined DCI message. As described herein, wireless communications may be improved to provide various advantages, such as improved alignment of communications between devices, decreased monitoring requirements, decreased processing power, and/or reduced delay in providing and/or determining an acknowledgement of successful receipt of transmissions.

A wireless device may select/determine control information (e.g., for selecting/determining a resource) from among other control information in a plurality of messages, based on one or more factors. One or more rules may indicate DCI and/or a resource to use for a transmission (e.g., an acknowledgement of reception of data). Resource determination may be based on a serving cell index and/or a PDCCH monitoring index, for example, if a DCI message is received. Additionally or alternatively, a resource, indicated by a last DCI message that may be received, may be used to send a transmission, for example, if a wireless device receives a plurality of DCI messages that indicate the same time slot for sending the transmission. A rule may indicate that the resource indicated by the DCI message with the latest search space set starting time, and/or the DCI message on the serving cell having the highest serving cell index, should be used for sending the transmission A wireless device may select/determine a DCI message from among a plurality of DCI messages, for example, based on one or more TB s associated with each DCI message of the plurality of DCI messages. TB reception scheduling of a first DCI message may be compared with TB reception scheduling of other DCI messages. The latest or earliest TB scheduling may be selected. A resource (e.g., PUCCH resource) associated with the latest or earliest TB may be used to send a message (e.g., HARQ-ACK feedback information associated with a TB(s)).

A wireless device may use a resource indicated by a DCI message based on one or more coresets. For example, the DCI message may be determined from among the plurality of DCI messages, based on coresets associated with each DCI message of the plurality of DCI messages. A DCI message may be determined that is associated with a coreset having the highest index, or the lowest index, from among all coresets associated with the plurality of DCI messages.

A wireless device may use a resource indicated by a DCI message based on a PDCCH monitoring occasion and/or a search space set associated with a PDCCH monitoring occasion. For example, the DCI message may be determined from among the plurality of DCI messages, based on PDCCH monitoring occasions and/or search space sets associated with each DCI message of the plurality of DCI messages. A DCI message may be determined from among the plurality of DCI messages, for example, if it is received in the PDCCH monitoring occasion associated with a search space set with the highest index or lowest index.

A wireless device may use a resource indicated by a DCI message based on a priority parameter. For example, the DCI message may be determined from among the plurality of DCI messages, based on priority parameters indicated by each DCI message of the plurality of DCI messages. A DCI message may be determined from among the plurality of DCI messages, for example, if it indicates the priority parameter with the highest or lowest priority. Using a priority parameter to determine the DCI may allow a wireless device to use better quality resources. For example, a base station may be able to determine a quality or robustness of an uplink resource. The base station may assign a higher priority to a DCI message associated with a higher quality uplink resource. A wireless device may send (e.g., transmit) a message using a higher quality (e.g., more robust, less error prone, etc.) communication resource to the base station, for example, if the base station assigns a higher priority to a DCI message associated with a higher quality resource.

A plurality of DCI messages may indicate different timing for sending information. For example, a wireless device may order the DCI messages for example, based on the different timing to determine resources for sending messages. The base station may cause a plurality of DCI messages, to be received by the wireless device, to indicate different timing for transmission(s) scheduled by the plurality of DCI messages.

A base station (e.g., gNB) may send (e.g., transmit) a DCI message via a PDCCH. The DCI message may be for scheduling an assignment/grant, a slot format notification, a pre-emption indication, and/or power-control commands. The DCI message may comprise an indicator (e.g., identifier) of a DCI format, one or more downlink scheduling assignments, one or more uplink scheduling grants, a slot format indicator, a pre-emption indication, a power-control for PUCCH/PUSCH, and/or a power-control for SRS. A downlink scheduling assignment DCI message may comprise parameters indicating an identifier of a DCI format, a PDSCH resource indication, a transport format, HARQ information, control information related to multiple antenna schemes, and/or a command for power control of the PUCCH.

An uplink scheduling grant DCI message may comprise parameters indicating an identifier of a DCI format, PUSCH resource indication, transport format, HARQ related information, and/or a power control command of the PUSCH. Different types of control information may correspond to different DCI message sizes. Supporting multiple beams and/or spatial multiplexing in the spatial domain and non-contiguous allocation of RBs in the frequency domain may require a larger scheduling message, for example, than an uplink grant allowing for frequency-contiguous allocation. DCI may be categorized into different DCI formats, for example, if a format corresponds to a predetermined message size and/or usage.

A wireless device may monitor one or more PDCCH for detecting one or more DCI with one or more DCI formats (e.g., common search space and/or wireless device-specific search space). A wireless device may monitor PDCCH with a limited set of DCI formats, for example, to reduce power consumption. More power may be consumed at the wireless device, for example, if there are more DCI formats to be detected.

Information in the DCI formats for downlink scheduling may comprise an indicator (e.g., identifier) of a DCI format, carrier indicator, frequency domain resource assignment, time domain resource assignment, bandwidth part indicator, HARQ process number, one or more MCS, one or more NDI, one or more RV, MIMO related information, Downlink assignment index (DAI), PUCCH resource indicator, PDSCH-to-HARQ_feedback timing indicator, TPC for PUCCH, SRS request, and/or padding. MIMO related information may comprise PMI, precoding information, transport block swap flag, power offset between PDSCH and reference signal, reference-signal scrambling sequence, number of layers, antenna ports (e.g., for the transmission), and/or Transmission Configuration Indication (TCI). Information in the DCI formats used for uplink scheduling may comprise an indicator (e.g., identifier) of a DCI format, carrier indicator, bandwidth part indication, resource allocation type, frequency domain resource assignment, time domain resource assignment, MCS, NDI, phase rotation of the uplink DMRS, precoding information, CSI request, SRS request, Uplink index/DAI, TPC for PUSCH, and/or padding.

A base station may perform CRC scrambling for a DCI message, for example, before transmitting the DCI message via a PDCCH. The base station may perform CRC scrambling, for example, using binary addition of multiple bits of one or more wireless device indicators (e.g., identifiers) (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) and/or the CRC bits of the DCI message. The wireless device may check the CRC bits of the DCI message, for example, based on (e.g., after or in response to) detecting the DCI message. The wireless device may receive the DCI message, for example, if the CRC is scrambled by a sequence of bits that corresponds to (e.g., is the same as) the one or more wireless device indicators (e.g., identifiers).

A base station may send (e.g., transmit) one or more PDCCH in different control resource sets (e.g., coresets), for example, to support wide bandwidth operation. A base station may send (e.g., transmit) one or more RRC messages. The one or more RRC messages may comprise configuration parameters of one or more coresets. A coreset may comprise one or more of a first OFDM symbol, a number of consecutive OFDM symbols, a set of resource blocks, and/or a CCE-to-REG mapping. A base station may send (e.g., transmit) a PDCCH in a coreset dedicated for a particular purpose, for example, for beam failure recovery confirmation. A wireless device may monitor PDCCH for detecting DCI in one or more configured coresets, for example, to reduce power consumption.

A wireless device may be configured, by a base station, with one or more serving cells. The base station may activate one or more second serving cells of the one or more serving cells. The base station may configure each activated serving cell of the one or more second serving cells with PDCCH monitoring. The wireless device may monitor a set of PDCCH candidates in one or more coresets. The one or more coresets may be on an active DL BWP of each activated serving cell configured with its corresponding PDCCH monitoring. The wireless device may monitor the set of PDCCH candidates in the one or more coresets, for example, according to corresponding search space sets. The monitoring may comprise decoding each PDCCH candidate of the set of PDCCH candidates according to monitored DCI formats.

A set of PDCCH candidates (e.g., for monitoring by a wireless device) may be defined in terms of PDCCH search space sets. A search space set may be a common search space (CSS) set and/or a wireless device specific search space (USS) set. One or more PDCCH monitoring occasions may be associated with a SS/PBCH block (SSB/PBCH). The SSB/PBCH may be quasi-co-located with a CSI-RS. A TCI state of an active BWP may comprise the CSI-RS. The active BWP may comprise a coreset identified with an index being equal to zero (e.g., Coreset zero). The wireless device may determine the TCI state based on (e.g., based on whichever is most recent) an indication by a MAC CE activation command and/or a random access procedure that is not initiated by a PDCCH order. The PDCCH order may trigger a non-contention based random access procedure. A wireless device may monitor corresponding PDCCH candidates at the one or more PDCCH monitoring occasions, for example, based on the one or more PDCCH monitoring occasions being associated with the SS/PBCH block (e.g., for a DCI format with CRC scrambled by a C-RNTI).

A base station may configure a wireless device with one or more DL BWPs in a serving cell. The wireless device may be provided (e.g., via a higher layer signaling) with one or more (e.g., 2, 3, etc.) coresets, for example, for a DL BWP of the one or more DL BWPs. For a coreset of the one or more coresets, the base station may provide the wireless device, via a higher layer parameter (e.g., ControlResourceSet), with at least one of: a coreset index (e.g., provided via a higher layer parameter such as controlResourceSetId); a DMRS scrambling sequence initialization value (e.g., provided via a higher layer parameter such as pdcch-DMRS-ScramblingID); a quantity/number of consecutive symbols (e.g., provided by a higher layer parameter duration), a set of resource blocks (e.g., provided by higher layer parameter such as frequencyDomainResources), CCE-to-REG mapping parameters (e.g., provided by higher layer parameter such as cce-REG-MappingType), an antenna port quasi co-location (e.g., from a set of antenna port quasi co-locations provided by a first higher layer parameter such as tci-StatesPDCCH-ToAddList and/or a second higher layer parameter tci-StatesPDCCH-ToReleaseList), and/or an indication for a presence or absence of a transmission configuration indication (TCI) field for a DCI format (e.g., DCI format 1_1) transmitted by a PDCCH in the coreset (e.g., provided by higher layer parameter TCI-PresentInDCI). The antenna port quasi co-location may indicate quasi co-location information of one or more DM-RS antenna ports (e.g., for a PDCCH reception in the coreset). The coreset index may be unique among the one or more DL BWPs of the serving cell. The wireless device may determine that a TCI field is absent/disabled in the DCI format, for example, if the higher layer parameter TCI-PresentInDCI is absent.

A first higher layer parameter (e.g., tci-StatesPDCCH-ToAddList) and/or a second higher layer parameter (e.g., tci-StatesPDCCH-ToReleaseList) may provide a subset of TCI states (e.g., defined in pdsch-Config). The wireless device may use the subset of the TCI states to provide one or more QCL relationships. For example, the one or more QCL relationships may be between one or more RS in a TCI state of the subset of the TCI states, and one or more DM-RS ports of a PDCCH reception in the coreset.

A base station may configure a coreset for a wireless device. A coreset index may be provided by higher layer parameter (e.g., controlResourceSetId). The coreset index of the coreset may be non-zero. The base station may not provide the wireless device with a configuration of one or more TCI states for the coreset (e.g., by a first higher layer parameter such as tci-StatesPDCCH-ToAddList and/or a second higher layer parameter such as tci-StatesPDCCH-ToReleaseList). The wireless device may determine that one or more DMRS antenna ports for a PDCCH reception in the coreset is quasi co-located with an RS (e.g., SSB/PBCH), for example, if the wireless device is not provided with the configuration of the one or more TCI states for the coreset. The wireless device may indicate (e.g., identify) the RS during an initial access procedure.

A base station may configure a coreset for a wireless device. A coreset index may be provided by higher layer parameter (e.g., controlResourceSetId). The coreset index of the coreset may be non-zero. The base station may provide the wireless device with a configuration (e.g., an initial configuration) of at least two TCI states for the coreset. The configuration may be provided by a first higher layer parameter (e.g., tci-StatesPDCCH-ToAddList) and/or a second higher layer parameter (e.g., tci-StatesPDCCH-ToReleaseList). The wireless device may receive the initial configuration of the at least two TCI states from the base station. The wireless device may not receive a MAC CE activation command for at least one of the at least two TCI states for the coreset. The wireless device may determine that one or more DMRS antenna ports for a PDCCH reception in the coreset is quasi co-located with an RS (e.g., SSB/PBCH). The wireless device may determine that one or more DMRS antenna ports is quasi co-located with an RS, for example, based on being provided with the initial configuration for the coreset and/or based on not receiving the MAC CE activation command for the coreset. The wireless device may identify the RS during an initial access procedure.

A base station may configure a coreset for a wireless device. A coreset index may be provided by higher layer parameter (e.g., controlResourceSetId). The coreset index of the coreset may be equal to zero. The wireless device may not receive a MAC CE activation command for a TCI state for the coreset. The wireless device may determine that one or more DMRS antenna ports for a PDCCH reception in the coreset is quasi co-located with an RS (e.g., SS/PBCH block), for example, if the wireless device does not receive the MAC CE activation command. The wireless device may identify the RS during an initial access procedure. The wireless device may indicate (e.g., identify) the RS from a random-access procedure (e.g., the most recent random-access procedure). The wireless device may not initiate the most recent random-access procedure, for example, if a PDCCH order triggering a non-contention based random-access procedure is received.

A base station may provide a wireless device with a single TCI state for a coreset. The base station may provide the single TCI state by a first higher layer parameter (e.g., tci-StatesPDCCH-ToAddList) and/or a second higher layer parameter (e.g., tci-StatesPDCCH-ToReleaseList). The wireless device may determine that one or more DM-RS antenna ports for a PDCCH reception in the coreset is quasi co-located with one or more DL RSs configured by the single TCI state, for example, if the wireless device is provided with the single TCI state for the coreset.

A base station may configure a coreset for a wireless device. The base station may provide the wireless device with a configuration of at least two TCI states for the coreset. The configuration may be provided by a first higher layer parameter (e.g., tci-StatesPDCCH-ToAddList) and/or a second higher layer parameter (e.g., tci-StatesPDCCH-ToReleaseList). The wireless device may receive the configuration of the at least two TCI states from the base station. The wireless device may receive a MAC CE activation command for at least one of the at least two TCI states for the coreset. The wireless device may determine that one or more DM-RS antenna ports for a PDCCH reception in the coreset is quasi co-located with one or more DL RSs configured by the at least one of the at least two TCI states, for example, if the wireless device receives the MAC CE activation command for the at least one of the at least two TCI states.

A base station may configure a coreset for a wireless device. A coreset index may be provided by higher layer parameter (e.g., controlResourceSetId). The coreset index of the coreset may be equal to zero. The base station may provide the wireless device with a configuration of at least two TCI states for the coreset. The wireless device may receive the configuration of the at least two TCI states from the base station. The wireless device may receive a MAC CE activation command for at least one of the at least two TCI states for the coreset. The wireless device may determine (e.g., based on the coreset index being equal to zero) that a QCL type (e.g., QCL-TypeD) of a first RS (e.g., CSI-RS) in the at least one of the at least two TCI states is to be provided by a second RS (e.g., SS/PBCH block). The wireless device may determine (e.g., based on the coreset index being equal to zero) that a QCL type (e.g., QCL-TypeD) of a first RS (e.g., CSI-RS) in the at least one of the at least two TCI states is spatial QCL-ed with a second RS (e.g., SS/PBCH block).

A wireless device may receive a MAC CE activation command for at least one of at least two TCI states for a coreset. A PDSCH may provide the MAC CE activation command. The wireless device may transmit HARQ-ACK information for the PDSCH in a slot. The wireless device may apply the MAC CE activation command X msec (e.g., 3 msec, 5 msec, or any other duration) after the slot, for example, if the wireless device receives the MAC CE activation command for the at least one of the at least two TCI states for the coreset (e.g., based on the transmitting HARQ-ACK information in the slot). A first BWP may be active in a second slot, for example, if the wireless device applies the MAC CE activation command in the second slot. The first BWP may be an active BWP, for example, if the first BWP is active in the second slot.

A base station may configure a wireless device with one or more DL BWPs in a serving cell. The wireless device may be provided by higher layers with one or more (e.g., 3, 5, 10, or any other quantity/number) search space sets, for example, for a DL BWP of the one or more DL BWPs. For a search space set of the one or more search space sets, the wireless device may be provided with information by a higher layer parameter (e.g., SearchSpace). The information may comprise a search space set index that may be provided by a higher layer parameter (e.g., searchSpaceId). The information may comprise an association between the search space set and a coreset that may be provided by a higher layer parameter (e.g., controlResourceSetId). The information may comprise a PDCCH monitoring periodicity of a first number of slots and/or a PDCCH monitoring offset of a second number of slots. The PDCCH monitoring periodicity and/or the PDCCH monitoring offset may be provided by a higher layer parameter (e.g., monitoringSlotPeriodicityAndOffset). The information may comprise a PDCCH monitoring pattern within a slot that indicates first symbol(s) of the coreset within the slot for PDCCH monitoring. The PDCCH monitoring pattern may be provided by a higher layer parameter (e.g., monitoringSymbolsWithinSlot). The information may comprise a duration of a third number of slots that may be provided by a higher layer parameter (e.g., duration). The information may comprise a number of PDCCH candidates. The information may comprise an indication that the search space set is either a common search space set and/or a wireless device specific search space set. The indication may be provided by a higher layer parameter (e.g., searchSpaceType). The duration may indicate a number of slots that the search space set comprises.

A wireless device may not expect two PDCCH monitoring occasions on an active DL BWP (e.g., for a same search space set and/or for different search space sets) in a same CORESET to be separated by a non-zero number of symbols that is smaller than the CORESET duration. The wireless device may determine a PDCCH monitoring occasion on an active DL BWP based on the PDCCH monitoring periodicity, the PDCCH monitoring offset, and/or the PDCCH monitoring pattern within a slot. The wireless device may determine that a PDCCH monitoring occasion exists in a first slot, for example, for the search space set. The wireless device may monitor at least one PDCCH (e.g., to determine the search space set) for the duration of a number (e.g., three) of slots starting from the first slot. For example, the wireless device may monitor a consecutive number of slots (e.g., three slots consecutively).

A wireless device may monitor one or more PDCCH candidates in a USS set. The USS set may be on an active DL BWP of a serving cell. A base station may not configure the wireless device with a carrier indicator field. The wireless device may monitor (e.g., based on not being configured with the carrier indicator field) the one or more PDCCH candidates without the carrier indicator field.

A wireless device may monitor one or more PDCCH candidates in a USS set. The USS set may be on an active DL BWP of a serving cell. A base station may configure the wireless device with a carrier indicator field. The wireless device may monitor the one or more PDCCH candidates with the carrier indicator field, for example, based on being configured with the carrier indicator field.

A base station may configure a wireless device to monitor one or more PDCCH candidates with a carrier indicator field in a first cell. The carrier indicator field may indicate a second cell. The carrier indicator field may correspond to a second cell. The wireless device may not expect to monitor the one or more PDCCH candidates on an active DL BWP of the second cell (e.g., based on monitoring the one or more PDCCH candidates in the first cell, with the carrier indicator field indicating the second cell).

A wireless device may monitor one or more PDCCH candidates on an active DL BWP of a serving cell. The wireless device may monitor the one or more PDCCH candidates for the serving cell, for example, based on the monitoring the one or more PDCCH candidates on the active DL BWP of the serving cell. A wireless device may monitor one or more PDCCH candidates on an active DL BWP of a serving cell. The wireless device may monitor the one or more PDCCH candidates to determine at least the serving cell, for example, based on the monitoring the one or more PDCCH candidates on the active DL BWP of the serving cell. The wireless device may monitor the one or more PDCCH candidates for the serving cell and/or one or more additional serving cells.

A base station may configure a wireless device with one or more cells. The base station may configure the wireless device for a single-cell operation, for example, if a number of the one or more cells is one. The base station may configure the wireless device for an operation with a carrier aggregation in a same frequency band (e.g., intra-band), for example, if a number of the one or more cells is more than one.

The wireless device may monitor one or more PDCCH candidates in overlapping PDCCH monitoring occasions. The monitoring occasions may be in a plurality of coresets on active DL BWP(s) of the one or more cells. The plurality of the coresets may have one or more different QCL-TypeD properties.

A first PDCCH monitoring occasion in a first coreset, of the plurality of coresets, of a first cell of the one or more cells may overlap with a second PDCCH monitoring occasion in a second coreset, of the plurality of coresets, of the first cell. The wireless device may monitor at least one first PDCCH candidate in the first PDCCH monitoring occasion (e.g., on an active DL BWP, of the active DL BWP(s), of the first cell). The wireless device may monitor one or more second PDCCH candidates in the second PDCCH monitoring occasion (e.g., on the active DL BWP, of the active DL BWP(s), of the first cell).

A first PDCCH monitoring occasion in a first coreset, of the plurality of coresets, of a first cell of the one or more cells may overlap with a second PDCCH monitoring occasion in a second coreset, of the plurality of coresets, of a second cell of the one or more cells. The wireless device may monitor one or more first PDCCH candidates in the first PDCCH monitoring occasion (e.g., on a first active DL BWP, of the active DL BWP(s), of the first cell). The wireless device may monitor one or more second PDCCH candidates in the second PDCCH monitoring occasion on a second active DL BWP, of the active DL BWP(s), of the second cell. A first QCL type property (e.g., QCL-TypeD) of the first coreset may be different from a second QCL type property (e.g., QCL-TypeD) of the second coreset.

The wireless device may determine a selected coreset, of the plurality of the coresets, of a cell of the one or more cells. The wireless device may determine a selected coreset (e.g., for a coreset determination rule), for example, based on the monitoring the one or more PDCCH candidates in the overlapping PDCCH monitoring occasions in the plurality of coresets. Additionally or alternatively, the wireless device may determine a selected coreset based on the plurality of the coresets having different receiving beams (e.g., different QCL-TypeD properties). The wireless device may monitor at least one PDCCH candidate, in the overlapping PDCCH monitoring occasions, in the selected coreset on an active DL BWP of the cell, for example, based on the determining. The selected coreset may be associated with a search space set, for example, based on a higher layer parameter (e.g., controlResourceSetId).

One or more coresets of the plurality of coresets may be associated with a CSS set. The one or more coresets may comprise at least one search space set (e.g., an association between the at least one search space set and the coreset may be provided by a higher layer parameter controlResourceSetId). The search space set may have at least one PDCCH candidate in the overlapping PDCCH monitoring occasions. Additionally or alternatively, the search space set may be a CSS set.

The first coreset may be associated with a first CSS set. The first coreset may be associated with a first USS set. The second coreset may be associated with a second CSS set. The second coreset may be associated with a second USS set. A coreset (e.g., the first coreset, the second coreset) may be associated with a CSS set (e.g., the first CSS set and/or the second CSS set). A coreset may be associated with a CSS set, for example, if at least one search space set of the coreset is a CSS set (or a USS set). A coreset (e.g., the first coreset, the second coreset) that may be associated with a USS set (e.g., the first USS set and/or the second USS set) may comprise the USS set. The one or more coresets may comprise the first CSS set and the second CSS set, for example, if the first coreset is associated with the first CSS set and the second coreset is associated with the second CSS set.

The one or more selected cells may comprise the first cell and the second cell, for example, if the one or more coresets comprises the first coreset and the second coreset and/or if the first coreset is configured in the first cell and the second coreset is configured in the second cell. The one or more selected cells may comprise the first cell, for example, if the one or more coresets comprises the first coreset and the second coreset. The one or more selected cells may comprise the first cell, for example, based on the first coreset being configured in the first cell and/or the second coreset being configured in the first cell.

The at least one coreset may comprise the first coreset and/or the second coreset. A first search space set of the first coreset may be indicated (e.g., identified) by a first search space set specific index (e.g., provided by a higher layer parameter searchSpaceId). The wireless device may monitor a first PDCCH candidate in a first PDCCH monitoring occasion in the first coreset that is associated with the first search space set (e.g., the association may be provided by a higher layer parameter controlResourceSetId). A second search space set of the second coreset of the at least one coreset may be identified by a second search space set specific index (e.g., provided by a higher layer parameter searchSpaceId). The wireless device may monitor a second PDCCH candidate in a second PDCCH monitoring occasion in the second coreset associated with the second search space set (e.g., the association may be provided by a higher layer parameter controlResourceSetId). The first search space set specific index may be lower than the second search space set specific index. The wireless device may select the first search space set, for example, based on the first search space set specific index being lower than the second search space set specific index (e.g., for a coreset determination rule). The wireless device may monitor the at least one first PDCCH candidate in the first PDCCH monitoring occasion in the first core set on the active DL BWP of the first cell, for example, based on the selecting the first search space set (e.g., for the coreset determination rule). The wireless device may stop monitoring the at least one second PDCCH candidate in the second PDCCH monitoring occasion in the second coreset on the active DL BWP of the first cell based on (e.g., after or in response to) the selecting (e.g., for the coreset determination rule). The wireless device may stop monitoring the at least one second PDCCH candidate in the second PDCCH monitoring occasion in the second coreset on the active DL BWP of the first cell, for example, based on the selecting.

The first cell may be indicated (e.g., identified) by a first cell-specific index. The second cell may be indicated (e.g., identified) by a second cell-specific index. The first cell-specific index may be lower than the second cell-specific index. The wireless device may select the first cell based on the first cell-specific index being lower than the second cell-specific index, for example, if the one or more selected cells comprises the first cell and the second cell.

The one or more coresets may comprise the first coreset, for example, if the first coreset is associated with the first CSS set and/or the second coreset is associated with the second USS set. The one or more selected cells may comprise the first cell based on the first coreset being configured in the first cell, for example, if the one or more coresets comprises the first coreset.

The one or more coresets may comprise the second coreset, for example, if the first coreset is associated with the first USS set and the second coreset is associated with the second CSS set. The one or more coresets may comprise the second coreset, for example, if a wireless device selects the second coreset. The one or more selected cells may comprise the first cell, for example, if the second coreset is configured in the first cell. The one or more selected cells may comprise the second cell, for example, if the one or more coresets comprises the second coreset and the second coreset is configured in the second cell.

The wireless device may determine that the one or more coresets are associated with one or more selected cells of the one or more cells. The base station may configure a first coreset of the one or more coresets in a first cell of the one or more selected cells. The base station may configure a second coreset of the one or more coresets in the first cell. The base station may configure a third coreset of the one or more coresets in a second cell of the one or more selected cells. The first cell and the second cell may be different cells.

The wireless device may receive, from the base station, one or more configuration parameters. The one or more configuration parameters may indicate cell-specific indices (e.g., provided by a higher layer parameter servCellIndex) for the one or more cells. Each cell of the one or more cells may be indicated (e.g., identified) by a respective one cell-specific index of the cell-specific indices. A cell-specific index of a cell of the one or more selected cells may be lowest among the cell-specific indices of the one or more selected cells. The wireless device may select the cell with the lowest cell specific index of the one or more selected cells, for example, if the wireless device determines that the one or more coresets are associated with the one or more selected cells (e.g., for the coreset determination rule).

The base station may configure at least one coreset of the one or more core sets in the cell (e.g., the selected cell). At least one search space set of the at least one coreset may have at least one PDCCH candidate in the overlapping PDCCH monitoring occasions. Additionally or alternatively, the at least one search space set may be a CSS set.

The one or more configuration parameters may indicate search space set specific indices (e.g., provided by a higher layer parameter searchSpaceId) for the at least one search space set of the cell. Each search space set of the at least one search space set may be identified by a respective search space set specific index of the search space set specific indices. The wireless device may determine that a search space specific index of a search space set of the at least one search space set is the lowest among the search space set specific indices of the at least one search space set. The wireless device may select the search space set, for example, based on determining that the search space specific index of the search space set specific index is the lowest among the search space set specific indices of the at least one search space set (e.g., for the coreset determination rule). The search space set may be associated with a selected coreset of the at least one coreset (e.g., the search space set may be associated, based on a higher layer parameter controlResourceSetId, with the selected coreset).

The wireless device may monitor at least one PDCCH in the selected coreset of the plurality of the coresets, for example, based on selecting the cell and/or selecting the search space set associated with the selected coreset. The wireless device may monitor the at least one PDCCH, for example, if the wireless device monitors the one or more PDCCH candidates in the overlapping PDCCH monitoring occasions in the plurality of coresets and the plurality of the coresets have the different QCL-TypeD property. The wireless device may select the selected coreset associated with the search space set and/or the cell for the coreset determination rule.

The selected coreset may have a first QCL-TypeD property. A second coreset of the plurality of the coresets may have a second QCL-TypeD property. The selected coreset and the second coreset may be different. The first QCL-TypeD property and the second QCL-TypeD property may be the same. The wireless device may monitor at least one second PDCCH candidate (e.g., in the overlapping PDCCH monitoring occasions) in the second coreset of the plurality of the coresets, for example, based on the first QCL-TypeD property of the selected coreset and the second QCL-TypeD property of the second coreset being the same. The first QCL-TypeD property and the second QCL-TypeD property may be different. The wireless device may stop monitoring at least one PDCCH candidate (in the overlapping PDCCH monitoring occasions) in the second coreset of the plurality of the coresets, for example, based on the first QCL-TypeD property of the selected coreset and the second QCL-TypeD property of the second coreset being different. The wireless device may stop monitoring at least one PDCCH candidate (e.g., in the overlapping PDCCH monitoring occasions) in the second coreset of the plurality of the coresets based on the first QCL-TypeD property of the selected coreset and the second QCL-TypeD property of the second coreset being different.

A wireless device may determine/consider that a first QCL type (e.g., QCL TypeD) property of a first RS (e.g., SS/PBCH block) is different from a second QCL type (e.g., QCL TypeD) property of a second RS (CSI-RS), for example, for the coreset determination rule. A first RS (e.g., CSI-RS) may be associated (e.g., QCL-ed) with an RS (e.g., SS/PBCH block) in a first cell, for example, for the coreset determination rule. A second RS (e.g., CSI-RS) may be associated (e.g., QCL-ed) with the RS in a second cell. The wireless device may determine, based on the first RS and the second RS being associated with the RS in the first cell, that a first QCL type (e.g., QCL TypeD) property of the first RS and a second QCL type (e.g., QCL TypeD) property of the second RS are the same. The wireless device may determine a quantity/number of active TCI states from the plurality of coresets.

A wireless device may monitor multiple search space sets associated with different CORESETs for one or more cells (e.g., for a single cell operation and/or for an operation with carrier aggregation in the same frequency band). At least two monitoring occasions of at least two search space sets of the multiple search space sets may overlap in time (e.g., at least one symbol, slot, subframe, etc.). The at least two search space sets may be associated with at least two first coresets. The at least two first coresets may have different QCL-TypeD properties. The wireless device may monitor at least one search space set associated with a selected coreset in an active DL BWP of a cell (e.g., for the coreset determination rule). The at least one search space set may be a CSS set. A cell-specific index of the cell may be lowest among cell-specific indices of the one or more cells comprising the cell. At least two second coresets of the cell may comprise a CSS set. The wireless device may select a selected coreset of the at least two second coresets, for example, based on the at least two second coresets of the cell comprising the CSS set. Additionally or alternatively, the wireless device may select a selected coreset of the at least two second coresets, for example, based on a search space specific index of a search space set associated with the selected coreset being the lowest among search space specific indices of search space sets associated with the at least two second coresets. The wireless device may monitor the search space set in the at least two monitoring occasions.

The wireless device may determine that the at least two first coresets may not be associated with a CSS set. The wireless device may determine that each coreset of the at least two first coresets may not be associated with a CSS set. The wireless device may monitor at least one search space set associated with a selected coreset in an active DL BWP of a cell, for example, for the coreset determination rule and based on the determining. The at least one search space set may be a USS set. A cell-specific index of the cell may be lowest among cell-specific indices of the one or more cells comprising the cell. At least two second coresets of the cell may comprise a USS set. The wireless device may select a selected coreset of the at least two second coresets, for example, based on the at least two second coresets of the cell comprising the USS set. Additionally or alternatively, the wireless device may select a selected coreset of the at least two second coresets, for example, based on a search space specific index of a search space set associated with the selected coreset being the lowest among search space specific indices of search space sets associated with the at least two second coresets. The wireless device may monitor the search space set in the at least two monitoring occasions.

A base station may indicate, to a wireless device, a TCI state for a PDCCH reception for a coreset of a serving cell by sending a TCI state indication for wireless-device-specific PDCCH MAC CE. The MAC entity may indicate to lower layers (e.g., PHY) the information regarding the TCI state indication for the wireless-device-specific PDCCH MAC CE, for example, if a MAC entity of the wireless device receives a TCI state indication for wireless-device-specific PDCCH MAC CE on/for a serving cell.

A TCI state indication for wireless-device-specific PDCCH MAC CE may be identified by a MAC PDU subheader with LCID. The TCI state indication for wireless-device-specific PDCCH MAC CE may have a fixed size of 16 bits or any other quantity/number of bits. The TCI state indication may comprise one or more fields. The one or more fields may comprise a serving cell ID, coreset ID, TCI state ID and/or a reserved bit.

The serving cell ID may indicate the identity of the serving cell (e.g., the serving cell for which the TCI state indication for the wireless-device-specific PDCCH MAC CE applies). The length of the serving cell ID may be n bits (e.g., n=5 bits or any other quantity/number of bits). The coreset ID may indicate a control resource set. The control resource set may be identified with a control resource set ID (e.g., ControlResourceSetId). The TCI State may be indicated to the control resource set ID. The length of the coreset ID may be n3 bits (e.g., n3=4 bits or any other quantity/number of bits). The TCI state ID may indicate a TCI state identified by TCI-StateId. The TCI state may be applicable to the control resource set identified by the coreset ID. The length of the TCI state ID may be n4 bits (e.g., n4=6 bits or any other quantity/number of bits).

An information element ControlResourceSet may be used to configure a time/frequency control resource set (CORESET) (e.g., which may be used to search for downlink control information). An information element TCI-State may associate one or two DL reference signals with a corresponding quasi-colocation (QCL) type. The information element TCI-State may comprise one or more fields (e.g., including TCI-StateId and/or QCL-Info). The QCL-Info may comprise one or more second fields. The one or more second fields may comprise serving cell index, BWP ID, a reference signal index (e.g., SSB-index, NZP-CSI-RS-ResourceID), and/or a QCL Type (e.g., QCL-typeA, QCL-typeB, QCL-typeC, QCL-typeD). The TCI-StateID may indicate (e.g., identify) a configuration of a TCI state.

The serving cell index may indicate a serving cell in which a reference signal (e.g., indicated by the reference signal index) is sent. The information element TCI-State may apply to a serving cell in which the information element TCI-State is configured, for example, if the serving cell index is absent in an information element TCI-State. The reference signal may be located on a second serving cell (e.g., different from the serving cell in which the information element TCI-State is configured), for example, if the QCL-Type is configured as first type (e.g., TypeD, TypeA, TypeB). The BWP ID may indicate a downlink BWP of the serving cell in which the reference signal is located.

An information element SearchSpace may define how and/or where to search for PDCCH candidates in a search space. The search space may be identified by a searchSpaceId field in the information element SearchSpace. Each search space may be associated with a control resource set (e.g., ControlResourceSet). The control resource set may be indicated (e.g., identified) by a controlResourceSetId field in the information element SearchSpace. The controlResourceSetId field may indicate the control resource set (CORESET) that is applicable for the SearchSpace.

A wireless device may determine monitoring occasions for PDCCH. The wireless device may determine monitoring occasions for PDCCH, for example, with DCI format 1_0 and/or DCI format 1_1 for scheduling PDSCH receptions or SPS PDSCH release on an active DL BWP of a serving cell c, and for which the wireless device sends (e.g., transmits) HARQ-ACK information in a same PUCCH in slot n. The wireless device may determine monitoring occasions for PDCCH based on at least one of: PDSCH-to-HARQ_feedback timing values for PUCCH transmission with HARQ-ACK information in slot n (e.g., based on or in response to PDSCH receptions or SPS PDSCH release slot offsets K_0 provided by time domain resource assignment field in DCI format 1_0 or DCI format 1_1 for scheduling PDSCH receptions or SPS PDSCH release) and/or a parameter (e.g., pdsch-AggregationFactor, if provided).

A set of PDCCH monitoring occasions for DCI format 1_0 or DCI format 1_1 for scheduling PDSCH receptions or SPS PDSCH release may comprise a union of PDCCH monitoring occasions across active DL BWPs of configured serving cells. The serving cells may be ordered in ascending order of start time of the search space set associated with a PDCCH monitoring occasion. The cardinality of the set of PDCCH monitoring occasions may indicate/define a total quantity/number M of PDCCH monitoring occasions.

A value of a counter downlink assignment indicator (DAI) field in DCI format 1_0 or DCI format 1_1 may denote the accumulative number of {serving cell, PDCCH monitoring occasion}-pair(s) in which PDSCH reception(s) or SPS PDSCH release associated with DCI format 1_0 or DCI format 1_1 is present. The PDSCH reception(s) or SPS PDSCH release may be as large as the current serving cell and current PDCCH monitoring occasion. For example, the accumulative number may be first in ascending order of serving cell index and then in ascending order of PDCCH monitoring occasion index m, where $0 \leq m < M$.

A value of the total DAI (e.g., if present) in DCI format 1_1 may denote the total quantity/number of {serving cell, PDCCH monitoring occasion}-pair(s) in which PDSCH reception(s) or SPS PDSCH release associated with DCI format 1_0 or DCI format 1_1 is present. The total quantity/number of pairs may be numbered as high as the current PDCCH monitoring occasion m. The total quantity/number of pairs may be updated based on each PDCCH monitoring occasion (e.g., before, during, and/or after each PDCCH monitoring occasion).

A wireless device may determine HARQ-ACK feedback corresponding to PDSCH receptions and/or SPS PDSCH release DCI. A wireless device may send (e.g., transmit) HARQ-ACK information in a PUCCH in slot n. The wireless device may determine the $\tilde{o}_0^{ACK}$, $\tilde{o}_1^{ACK}$, . . . , $\tilde{o}_{O^{ACK}_{-1}}{}^{ACK}$, for a total number of $O_{ACK}$ HARQ-ACK information bits, for example, for any PUCCH format.

$O^{ACK}$ may equal $O^{ACK}+1$, and $o_{O^{ACK}_{-1}}{}^{ACK}$ may equal the HARQ-ACK information bit associated with the SPS PDSCH reception, for example, if SPS PDSCH reception is activated for the wireless device and the wireless device is configured to receive SPS PDSCH in a slot $n-K_{1,c}$ for serving cell c. $K_{1,c}$ may be the PDSCH-to-HARQ-feedback timing value for SPS PDSCH on serving cell c.

A wireless device may send (e.g., transmit) one or more PUCCH with HARQ-ACK information in a slot. The PDSCH-to-HARQ-timing-indicator field values may map to {1, 2, 3, 4, 5, 6, 7, 8}, for example, for DCI format 1_0. The PDSCH-to-HARQ-timing-indicator field values (e.g., if present) may map to values for a set of number of slots provided by RRC parameter dl-DataToUL-ACK, for example, for DCI format 1_1. A wireless device may send (e.g., transmit) the PUCCH in slot n+k, where k may be provided by the PDSCH-to-HARQ-timing-indicator field in DCI format 1_0 (e.g., for a SPS PDSCH reception ending in slot n). Alternatively, k may be provided in DCI format 1_1 activating the SPS PDSCH reception (e.g., if present).

The wireless device may provide corresponding HARQ-ACK information in a PUCCH transmission within slot n+k (e.g., where k is provided by dl-DataToUL-ACK), for example, if a wireless device detects a DCI format 1_1 that does not include a PDSCH-to-HARQ-timing-indicator field and/or schedules a PDSCH reception and/or activates a SPS PDSCH reception ending in slot n. The wireless device may provide corresponding HARQ-ACK information in a PUCCH transmission within slot n+k, for example, if a wireless device detects a DCI format 1_0 or a DCI format 1_1 scheduling a PDSCH reception ending in slot n. Additionally or alternatively the wireless device may provide corresponding HARQ-ACK information in a PUCCH transmission within slot n+k, for example, if the wireless device detects a DCI format 1_0 indicating a SPS PDSCH release through a PDCCH reception ending in slot n. The value k may be a quantity/number of slots. The value k may be indicated by the PDSCH-to-HARQ-timing-indicator field in the DCI format (e.g., if present). Additionally or alternatively, the value k may be provided by dl-DataToUL-ACK. The value k may correspond to a last slot of the PUCCH transmission that overlaps with the PDSCH reception, for example if k=0. Additionally or alternatively, the value k may correspond with the PDCCH reception, for example, if k=0 and/or if there is a SPS PDSCH release.

A wireless device may determine a PUCCH resource after or based on determining a set of PUCCH resources for $O_{UCI}$ HARQ-ACK information bits (e.g., for a PUCCH transmission with HARQ-ACK information). The PUCCH resource determination may be based on a PUCCH resource indicator field. For example, the PUCHH resource determination may be based on a DCI message format of the DCI message formats 1_0 or DCI formats 1_1 that have a value of a PDSCH-to-HARQ_feedback timing indicator field. Each value of the PDSCH-to-HARQ_feedback timing indicator field may indicate the same slot for the PUCCH transmission. The wireless device may detect the PUCCH transmission. The wireless device may send (e.g., transmit) corresponding HARQ-ACK information in the PUCCH. Detected DCI formats may be indexed in an ascending order across serving cells indexes for the same PDCCH monitoring occasion, for example, for PUCCH resource determination. Subsequently or alternatively, detected DCI formats may be indexed in an ascending order across PDCCH monitoring occasion indexes, for example, for PUCCH resource determination.

PUCCH resource indicator field values may map to values of a set of PUCCH resource indexes. The indexes may be provided by RRC parameter ResourceList for PUCCH resources. The PUCCH resources may be from a set of PUCCH resources provided by PUCCH-ResourceSet (e.g., with a maximum of eight PUCCH resources).

A wireless device may detect a first DCI format 1_0 or DCI format 1_1 indicating a first resource for a PUCCH transmission with corresponding HARQ-ACK information in a slot. Additionally or alternatively, the wireless device may detect, at a later time, a second DCI format 1_0 or DCI format 1_1 indicating a second resource for a PUCCH transmission with corresponding HARQ-ACK information in the slot. The wireless device may not expect to multiplex HARQ-ACK information corresponding to the second DCI format in a PUCCH resource in the slot, for example, if the PDCCH reception that includes the second DCI format is not earlier than N_3 symbols from a first symbol of the first resource for PUCCH transmission in the slot. For example, for wireless device processing capability 1 and SCS configuration μ, N_3=8 for μ=0, N_3=10 for μ=1, N_3=17 for μ=2, N_3=20 for μ=3. For example, for UE processing capability 2 and SCS configuration μ, N_3=3 for μ=0, N_3=4.5 for μ=1, N_3=9 for μ=2.

A PUCCH resource for a corresponding PUCCH transmission comprising HARQ-ACK information may be provided by an RRC parameter. A PUCCH resource for a corresponding PUCCH transmission comprising HARQ-ACK information may be provided by an RRC parameter (e.g., n1PUCCH-AN), for example, if a wireless device sends (e.g., transmits) HARQ-ACK information that corresponds only to a PDSCH reception (e.g., if the HARQ-ACK information does not correspond to a PDCCH).

DCI format 1_0 may be used for the scheduling of PDSCH in a DL cell. The DCI format 1_0 may comprise a PDSCH-to-HARQ_feedback timing indicator indicating a timing between a PDSCH and its corresponding HARQ feedback. A DCI format 1_1 may be used for the scheduling of PDSCH in a cell. The DCI format 1_1 may comprise a PDSCH-to-HARQ_feedback timing indicator that indicates a timing between a PDSCH and its corresponding HARQ feedback.

A wireless device may indicate HARQ feedback (e.g., a positive or negative acknowledgement (ACK or NACK respectively)) for a downlink reception (e.g., dynamically scheduled PDSCH and/or semi-persistently scheduled PDSCH or a DCI indicating release of downlink SPS). The wireless device may create a HARQ-ACK codebook. The codebook may comprise a plurality of acknowledgements corresponding to the plurality of downlink receptions.

A wireless device may receive a plurality of DCI messages. The plurality of DCI messages may schedule a plurality of transport blocks (TBs). For example, each DCI message of the plurality of DCI messages may schedule a respective TB of the plurality of TBs.

Each DCI message of the plurality of DCI messages may indicate a slot (e.g., each DCI may indicate the same slot) for a PUCCH transmission of an HARQ-ACK information (e.g., corresponding to the respective TB). Each DCI message of the plurality of DCI messages may indicate a respective PUCCH resource for the PUCCH transmission of the HARQ-ACK information.

The wireless device may send (e.g., transmit) a limited quantity/number of PUCCH messages (e.g., transmissions)

in a slot (e.g. per a serving cell, across all serving cells of the wireless device, etc.). For example, the wireless device may send (e.g., transmit) one PUCCH transmission per a serving cell. For example, the wireless device may send (e.g., transmit) one PUCCH transmission across all serving cells of the wireless device. The wireless device may be incapable (e.g., due to limited power, limited RF/hardware, etc.) of transmitting more than one PUCCH in a slot.

The wireless device may avoid sending (e.g., transmitting in the same slot) HARQ-ACK information corresponding to the plurality of TBs, for example, based on being unable to send (e.g., transmit) more than a limited number of PUCCH transmission (e.g., at most one PUCCH transmission) in the slot. The plurality of TBs may have been scheduled by the plurality of DCIs separately. The wireless device may multiplex the HARQ-ACK information corresponding to the plurality of TBs, for example, based on being unable to send (e.g., transmit) no more than one PUCCH transmission in the slot.

The wireless device may select a DCI message among the plurality of DCI messages to determine a PUCCH resource. The selected DCI message may indicate the PUCCH resource to use for sending (e.g., transmitting) the multiplexed HARQ-ACK information. The wireless device may determine the selected DCI message, for example, based on cell indices of serving cells in which the plurality of DCI messages is received. The wireless device may determine the selected DCI message, for example, based on PDCCH monitoring occasions in which the plurality of DCI messages is received.

The wireless device may send (e.g., transmit) the multiplexed HARQ-ACK information in the slot (e.g., the multiplexed HARQ-ACK information may be multiplexed and transmitted in the same slot) via the PUCCH resource indicated by the selected DCI message, for example, based on determining the selected DCI message. The base station may monitor the PUCCH resource, for example, to detect/receive the multiplexed HARQ-ACK information (e.g., the HARQ-ACK information may have been multiplexed in the same slot).

Figure 17:
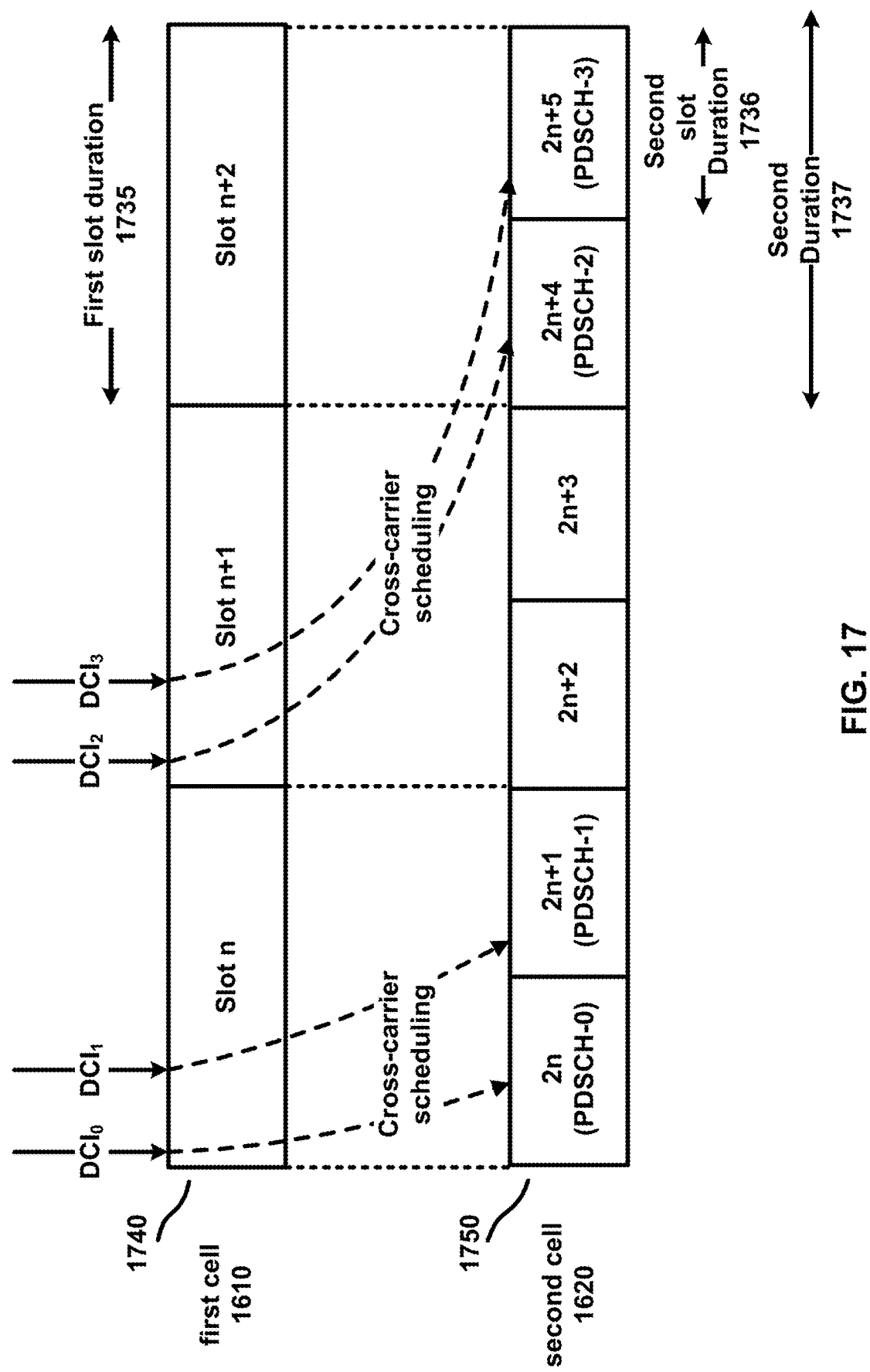
FIG. 17 shows an example of cross-carrier scheduling.
Figure 18:
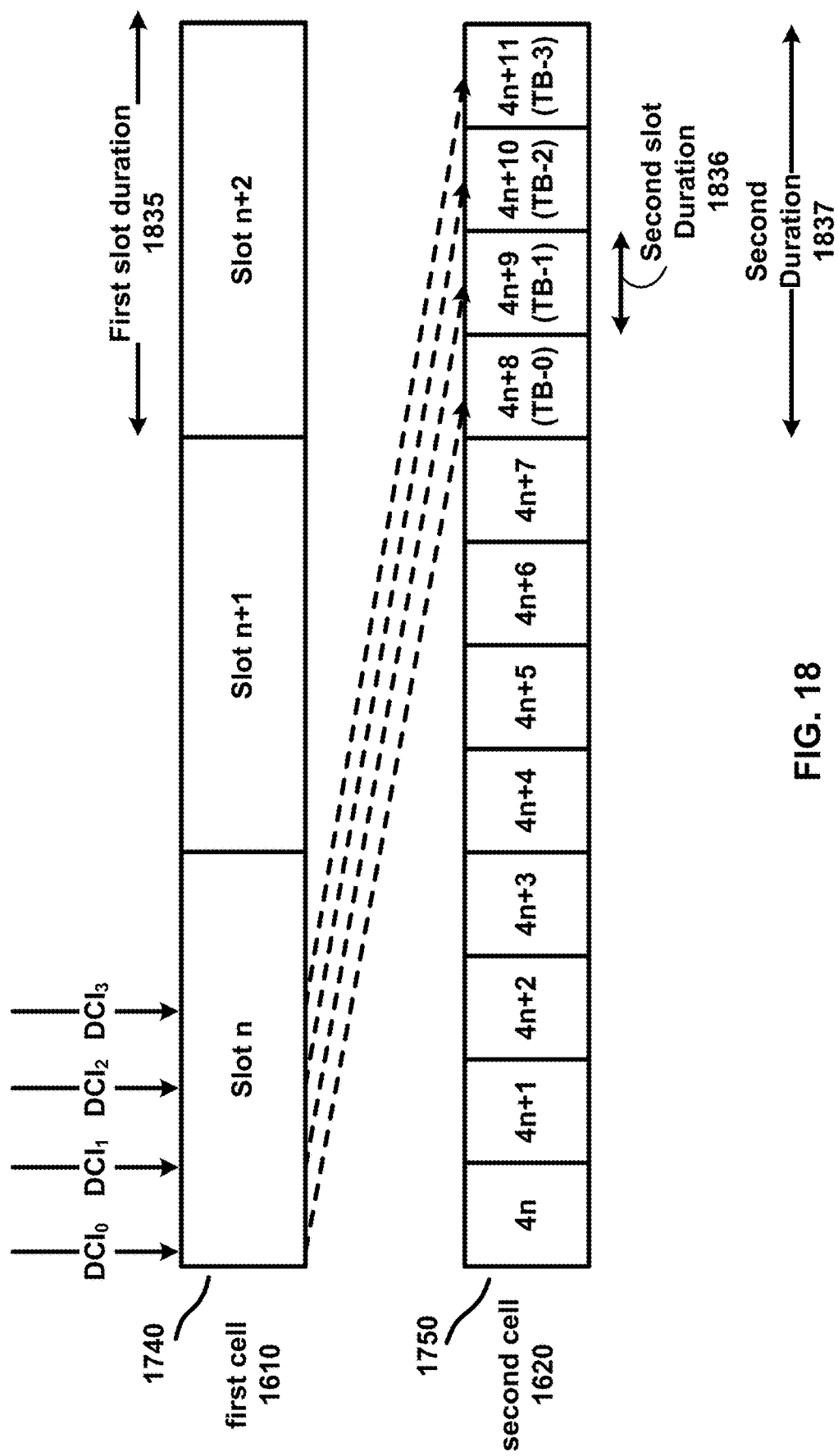
FIG. 18 shows an example of cross-carrier scheduling.

The wireless device may receive a limited number/quantity (e.g., at most one) DCI message (e.g., unicast DCI), in/via a PDCCH monitoring occasion of a scheduling cell. The DCI message may schedule a transport block. The wireless device may receive a plurality of DCI messages (e.g., unicast DCIs), in/via a PDCCH monitoring occasion of a scheduling cell. The plurality of DCI messages may schedule a plurality of TB s for a scheduled cell. As shown in FIG. 17-FIG. 18, the wireless device may receive a plurality of DCI messages (e.g., DCI 1630-DCI 1634) via a PDCCH monitoring occasion of a scheduling cell (e.g., a first cell 1610). The scheduling cell may have a first numerology (e.g., subcarrier spacing). The plurality of DCI messages may be used to schedule a scheduled cell (e.g., a second cell 1620). The scheduled cell may have a second numerology that is higher than the first numerology of the scheduling cell.

A wireless device may receive and/or detect a plurality of DCI messages in a PDCCH monitoring occasion of a cell. Each DCI message of the plurality of DCI messages may indicate a slot (e.g., the same slot) for a PUCCH transmission of HARQ-ACK information corresponding to a respective TB. Implementation of existing DCI processes may not distinguish the PUCCH resource. For example, DCI processes may include selecting a DCI message, among the plurality of DCI messages, based on cell indices of serving cells. Additionally or alternatively, DCI processes may include selecting a DCI message based on PDCCH monitoring occasions in which the plurality of DCI messages is received. DCI processes may be used to determine a PUCCH resource indicated by the selected DCI message to send (e.g., transmit) the multiplexed HARQ-ACK information. The DCI processes may use the same PUCCH resource. Receiving/detecting the plurality of DCI messages in the same PDCCH monitoring occasion of the same cell may result in a tie among the plurality of DCI messages (e.g., each DCI message of the plurality of DCI messages may use the same PUCCH resource). This may lead to a misalignment in PUCCH resource determination between the base station and the wireless device. An enhanced DCI selection process may be implemented. The DCI selection process may determine a DCI message (e.g., to identify a PUCCH resource), for example, if multiple DCI messages are received in a PDCCH monitoring occasion of the same cell.

A first DCI message of the plurality of DCIs may indicate a first PUCCH resource for a first PUCCH transmission of first HARQ-ACK information of a first TB, for example, if a wireless device receives/detects a plurality of DCI messages in a PDCCH monitoring occasion of a cell. A second DCI message of the plurality of DCI messages may indicate a second PUCCH resource for a second PUCCH transmission of second HARQ-ACK information of a second TB. The first DCI message may indicate a first slot for the first PUCCH transmission. The second DCI message may indicate a second slot, for the second PUCCH transmission, that is the same as the first slot.

Determining a DCI message (e.g., determining between first DCI and second DCI) based on serving cell indices and/or PDCCH monitoring occasions may not be enough to distinguish the PUCCH resource. The wireless device may receive the first DCI and the second DCI via the same PDCCH monitoring occasion of a same serving cell. A wireless device may process the plurality of the DCI messages (e.g., each DCI message may indicate a downlink resource assignment). The wireless device may receive TB s, for example, based on the downlink resource assignment indicated by the plurality of DCI messages. The wireless device may determine one or more ACK/NACK messages for the received TB s. The wireless device may send (e.g., transmit) a multiplexed HARQ-ACK information (e.g., the first HARQ-ACK information and the second HARQ-ACK information) via the first PUCCH resource indicated by the first DCI. The base station may monitor, for the multiplexed HARQ-ACK information, the second PUCCH resource indicated by the second DCI. This may result in missing, by the base station, the detection/reception of the multiplexed HARQ-ACK information. Additionally or alternatively, this may result in retransmission of the multiplexed HARQ-ACK information by the wireless device and/or monitoring the multiplexed HARQ-ACK information by the base station, which may increase the power consumption at the wireless device and/or the base station.

The base station may monitor, for the multiplexed HARQ-ACK information, both the first PUCCH resource indicated by the first DCI and the second PUCCH resource indicated by the second DCI. This may result in increased power consumption at the base station. An enhanced procedure for the PUCCH resource determination may be helpful, for example, if a plurality of DCI messages is received in a PDCCH monitoring occasion of a cell.

A wireless device may not be able to determine which DCI message (e.g., DCI-1, DCI-2, . . . or DCI-n) should be used for PUCCH resource selection, for example, if multiple DCI messages are received via the same PDCCH monitoring occasion and multiple DCI messages indicate the same time-slot for acknowledgement (e.g., HARQ-ACK) transmission. For example, DCI-1 may indicate PUCCH-resource 1 and DCI-2 may indicate PUCCH-resource 2. It may be unclear whether the wireless device should send (e.g., transmit) the multiplexed acknowledgements (e.g., HARQ-ACKs) via PUCCH resource 1 or PUCCH resource 2. A base station may need to monitor more than one PUCCH resource (e.g., PUCCH resource 1, PUCCH resource 2, and up to PUCCH resource n) to receive multiplexed acknowledgments (e.g., HARQ-ACKs), which may increase power consumption.

An enhanced PUCCH resource determination may be used, for example, if a plurality of DCI messages is received in the same PDCCH monitoring occasion of the same cell. A wireless device may determine a selected DCI message, from the plurality of DCI messages, for example, based on search space sets in which each DCI message of the plurality of DCI messages is received. A wireless device may determine a selected DCI message, from the plurality of DCI messages, for example, based on control resource sets (coresets) corresponding to the plurality of DCI messages that are received. A wireless device may determine a DCI message, from the plurality of DCI messages, based on time slots (e.g., of the plurality of TB s) in which the plurality of DCI messages is received. A wireless device may determine a DCI message, from the plurality of DCI messages, based on priority parameters indicated by a DCI message of the plurality of DCI messages. This enhanced process may improve uplink control signaling, may reduce uplink overhead and interference, and/or may reduce wireless device and base station battery power consumption.

Figure 16:
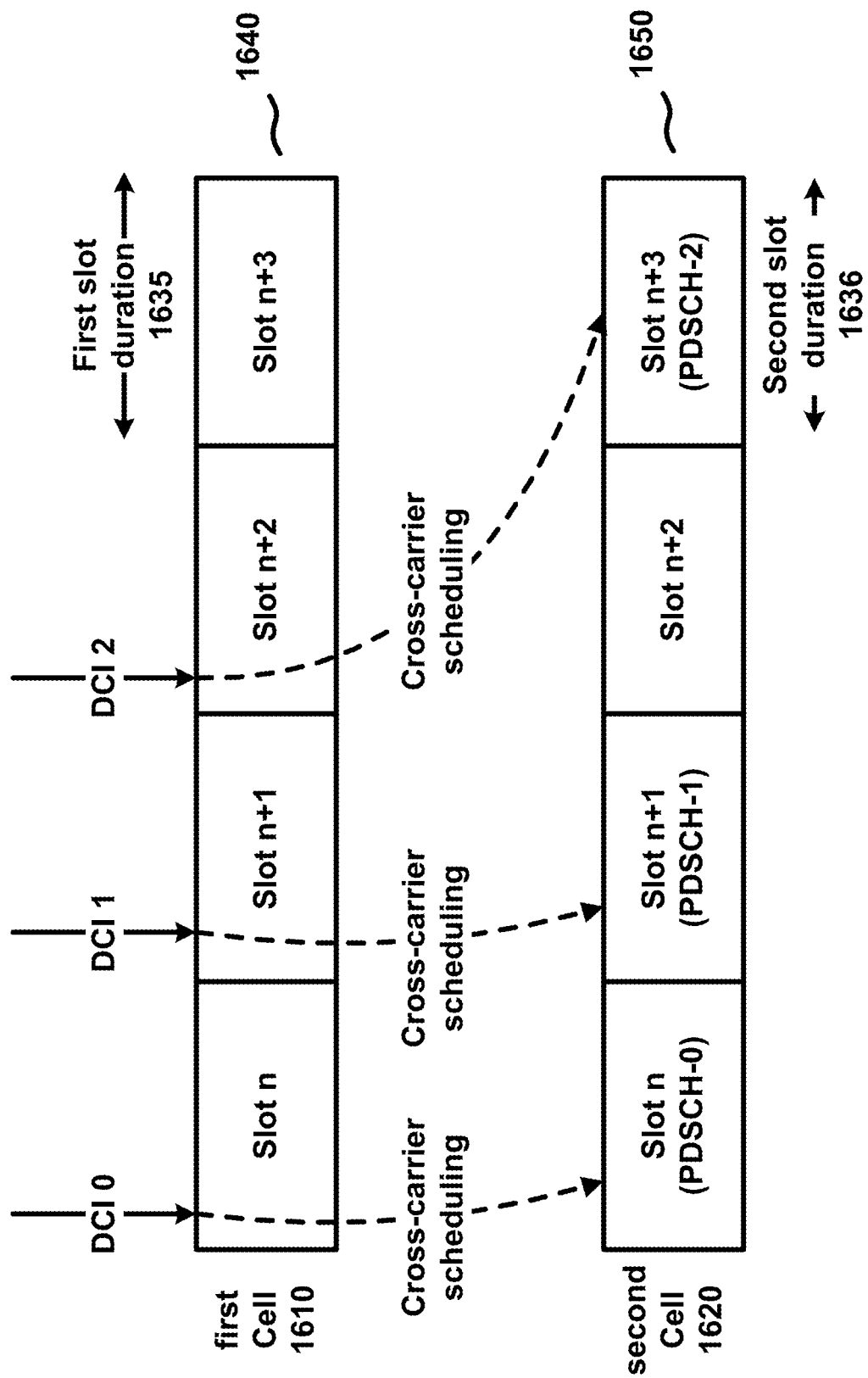
FIG. 16 shows an example of cross-carrier scheduling.

FIG. 16, FIG. 17 and FIG. 18 show examples of a cross-carrier scheduling. A wireless device may receive, from a base station, one or more messages. The one or more messages may comprise one or more configuration parameters for one or more cells. The one or more cells may comprise a first cell (e.g., a first cell 1610 in FIG. 16, FIG. 17 and/or FIG. 18). The first cell may support one or more frequency bands (e.g., 15 kHz, 30 kHz, 60 kHz, 120 kHz, etc.). The one or more cells may comprise a second cell (e.g., a second cell 1620 in FIG. 16, FIG. 17 and/or FIG. 18). The second cell may support one or more frequency bands (e.g., 15 kHz, 30 kHz, 60 kHz, 120 kHz, etc.). The one or more cells may further comprise a third cell and a fourth cell. The one or more frequency bands may comprise any quantity/number of frequency bands, and/or any value of frequencies.

The one or more configuration parameters may indicate cell-specific indices (e.g., provided by a higher layer parameter servCellIndex) for the one or more cells. Each cell of the one or more cells may be indicated (e.g., identified) by a respective cell-specific index of the cell-specific indices. The first cell (e.g., the first cell 1610 in FIG. 16, FIG. 17 and/or FIG. 18) may be indicated (e.g., identified) by a first cell-specific index of the cell-specific indices. The second cell (e.g., the second cell 1620 in FIG. 16, FIG. 17 and/or FIG. 18) may be indicated (e.g., identified) by a second cell-specific index of the cell-specific indices.

The third cell may be indicated (e.g., identified) by a third cell-specific index of the cell-specific indices. The fourth cell may be indicated (e.g., identified) by a fourth cell-specific index of the cell-specific indices. The first cell-specific index and the second cell-specific index may be different. The first cell-specific index and the second cell-specific index may be the same.

A higher layer parameter may comprise an RRC or MAC layer parameter. The one or more cells may comprise a plurality of BWPs (e.g., downlink BWPs and/or uplink BWPs). The plurality of BWPs may comprise a first plurality of BWPs of the first cell. The plurality of BWPs may comprise a second plurality of BWPs for the second cell. The first plurality of BWPs (e.g., uplink BWPs and/or downlink BWPs) may correspond to the first cell. The second plurality of BWPs (e.g., uplink BWPs and/or downlink BWPs) may correspond to the second cell.

A BWP (e.g., of the first plurality of BWPs and/or of the second plurality of BWPs) may be in an active state or an inactive state. A device may monitor a downlink channel/signal (e.g., PDCCH, DCI, CSI-RS, PDSCH) on/for the downlink BWP (e.g., of the first plurality of BWPs and/or of the second plurality of BWPs), for example, if the downlink BWP is in an active state. A device may not monitor a downlink channel/signal (e.g., PDCCH, DCI, CSI-RS, PDSCH) on/for a downlink BWP (e.g., of the first plurality of BWPs, of the second plurality of BWPs), for example, if the downlink BWP is in the inactive state. An uplink signal/channel (e.g., PUCCH, preamble, PUSCH, PRACH, SRS, etc.) may be sent (e.g., transmitted) via an uplink BWP (e.g., of the first plurality of BWPs, of the second plurality of BWPs), for example, if the uplink BWP is in an active state. A device may avoid sending (e.g., transmitting) an uplink signal/channel (e.g., PUCCH, preamble, PUSCH, PRACH, SRS, etc.) via the uplink BWP (e.g., of the first plurality of BWPs, of the second plurality of BWPs), for example, if the uplink BWP is in the inactive state.

The wireless device may activate a first BWP (e.g., a first downlink/uplink BWP) of the first plurality of BWPs of the first cell. Activating the first BWP may comprise setting (e.g., by the wireless device) the first BWP as a first active (downlink/uplink) BWP of the first cell. Activating the first BWP may comprise setting (e.g., by the wireless device) the first BWP in the active state. Activating the first BWP may comprise switching the first BWP from the inactive state to the active state.

The wireless device may activate a second BWP (e.g., a second downlink/uplink BWP) of the second plurality of BWPs of the second cell. Activating the second BWP may comprise setting (e.g., by the wireless device) the second BWP as a second active (downlink/uplink) BWP of the second cell. Activating the second BWP may comprise setting (e.g., by the wireless device) the second BWP in the active state. Activating the second BWP may comprise switching the second BWP from the inactive state to the active state.

The one or more configuration parameters may indicate BWP-specific numerologies (or subcarrier spacings) (e.g., provided by a higher layer parameter SubcarrierSpacing in information element BWP) for the plurality of BWPs. Each BWP of the plurality of BWPs may be identified by a respective BWP-specific numerology of the BWP-specific numerologies. The first BWP may have a first BWP-specific numerology (e.g., 15 kHz, 30 kHz, etc.) of the BWP-specific numerologies. The second BWP may have a second BWP-specific numerology (e.g., 15 kHz, 60 kHz, 120 kHz) of the BWP-specific numerologies. Any BWP-specific numerology may be used, for example, any quantity/number of frequencies and/or any value of frequencies may be used.

The first BWP-specific numerology and the second BWP-specific numerology may be the same. The first BWP-specific numerology and the second BWP-specific numerology may be different. The one or more configuration parameters may indicate one or more control resource sets (coresets) for the first BWP of the first cell (e.g., by a higher layer parameter ControlResourceSet). The one or more configuration parameters may indicate one or more control resource sets (coresets) for the first cell (e.g., by a higher layer parameter ControlResourceSet).

The wireless device may monitor PDCCH candidates, for DCI, in the one or more coresets, for example, if the first BWP is in the active state. The wireless device may monitor PDCCH candidates, for DCI, in PDCCH monitoring occasions of the one or more coresets, for example, if the first BWP is in the active state. The monitoring for the DCI may comprise attempting to detect the DCI in the one or more coresets.

The one or more configuration parameters may indicate coreset indices for the one or more coresets (e.g., provided by a higher layer parameter controlResourceSetId). Each coreset of the one or more coresets may be indicated (e.g., identified) by a respective coreset index of the coreset indices. A first coreset of the one or more coresets may be identified by a first coreset index (e.g., zero, one, eight, ten, etc.) of the coreset indices. A second coreset of the one or more coresets may be indicated (e.g., identified) by a second coreset index of the coreset indices. A third coreset of the one or more coresets may be indicated (e.g., identified) by a third coreset index of the coreset indices.

The one or more configuration parameters may indicate one or more search space sets for the first BWP of the first cell (e.g., indicated by a higher layer parameter SearchSpace). The one or more configuration parameters may indicate one or more search space sets for the first cell (e.g., by a higher layer parameter SearchSpace).

The one or more configuration parameters may indicate search space set indices for the one or more search space sets. The one or more search space sets may be provided by a higher layer parameter (e.g., searchSpaceId). A search space set (e.g., some or all of the search space sets) of the one or more search space sets may be indicated (e.g., identified) by a respective search space set index of the search space indices. A first search space set of the one or more search space sets may be indicated (e.g., identified) by a first search space set index of the search space indices. A second search space set of the one or more search space sets may be indicated (e.g., identified) by a second search space set index of the search space indices. A third search space set of the one or more search space sets may be indicated (e.g., identified) by a third search space set index of the search space indices. A fourth search space set of the one or more search space sets may be indicated (e.g., identified) by a fourth search space set index of the search space indices. Any quantity of search space sets (e.g., n search space sets) of the one or more search space sets may be indicated (e.g., identified) by a corresponding search space set index (e.g., $n^{th}$ search space set index) of the search space indices.

A search space set of the one or more search space sets may be associated with (e.g., linked to) a coreset of the one or more coresets. The one or more configuration parameters may indicate the coreset (and/or coreset index of the coreset) for the search space set. The search space set may be provided by a higher layer parameter (e.g., controlResourceSetId) in a higher layer parameter search space (e.g., SearchSpace). The association (e.g., the linkage) may be one-to-one, or one-to-any quantity. The search space set associated with (e.g., linked to) the coreset may not be associated (e.g., linked) with a second coreset (or any other quantity of coresets) different from the coreset, for example, if the association is one-to-one.

The one or more configuration parameters may indicate the coreset indices for the one or more search space sets (e.g., the search space sets may be provided by a higher layer parameter controlResourceSetId in the higher layer parameter SearchSpace). Each search space set of the one or more search space sets may be associated with (e.g., linked to) a coreset, of the one or more coresets, indicated (e.g., identified) by a respective coreset index of the coreset indices. The one or more configuration parameters may indicate the first coreset index of the first coreset for the first search space set. The first search space set may be associated with (e.g., linked to) the first coreset, for example, based on the one or more configuration parameters indicating the first coreset index of the first coreset for the first search space set. The one or more configuration parameters may indicate the first coreset index of the first coreset for the second search space set. The second search space set may be associated with (e.g., linked to) the first coreset, for example, based on the one or more configuration parameters indicating the first coreset index of the first coreset for the second search space set. The one or more configuration parameters may indicate the second coreset index of the second coreset for the third search space set. The third search space set may be associated with (e.g., linked to) the second coreset, for example, based on the one or more configuration parameters indicating the second coreset index of the second coreset for the third search space set, and so on. The one or more configuration parameters may indicate the third coreset index of the third coreset for the fourth search space set. The fourth search space set may be associated with (or linked to) the third coreset, for example, based on the one or more configuration parameters indicating the third coreset index of the third coreset for the fourth search space set, and so on.

The wireless device may monitor PDCCH candidates for a downlink control signal/channel (e.g., DCI, PDCCH, RS, GC-PDCCH, DMRS, etc.), for example, based on the search space set being associated with (or linked to) the coreset. The wireless device may monitor via PDCCH monitoring occasions for the search space set associated with (e.g., linked to) the coreset.

The one or more configuration parameters may indicate PDCCH monitoring periodicities for the one or more search space sets (e.g., provided by a higher layer parameter monitoringSlotPeriodicityAndOffset). Each search space set of the one or more search space sets may be associated (e.g., configured and/or monitored) with a respective PDCCH monitoring periodicity of the PDCCH monitoring periodicities. The first search space set may be associated (e.g., configured and/or monitored) with a first PDCCH monitoring periodicity. The second search space set may be associated (e.g., configured and/or monitored) with a second PDCCH monitoring periodicity. The third search space set may be associated (e.g., configured and/or monitored) with a third PDCCH monitoring periodicity. The fourth search space set may be associated (e.g., configured and/or monitored) with a fourth PDCCH monitoring periodicity.

PDCCH monitoring occasions may be associated with the one or more search space sets. The wireless device may determine PDCCH monitoring occasions for the one or more coresets, for example, based on the PDCCH monitoring periodicities of the one or more search space sets. The wireless device may monitor PDCCH candidates, for a downlink control signal/channel (e.g., DCI, PDCCH, RS, GC-PDCCH, DMRS, etc.), in the PDCCH monitoring occasions for search space sets associated with (e.g., linked to) the one or more coresets. The wireless device may monitor first PDCCH candidates, for a downlink control signal/channel, in first PDCCH monitoring occasions for the first search space set associated with (e.g., linked to) the first coreset. The first PDCCH monitoring occasions may be associated with the first search space set. The wireless device may monitor second PDCCH candidates, for a downlink control signal/channel, in second PDCCH monitoring occasions for the second search space set associated with (e.g., linked to) the first coreset. The second PDCCH monitoring occasions may be associated with the second search space set. The wireless device may monitor third PDCCH candidates, for a downlink control signal/channel, in third PDCCH monitoring occasions for the third search space set associated with (e.g., linked to) the second coreset. The third PDCCH monitoring occasions may be associated with the third search space set. The wireless device may monitor fourth PDCCH candidates, for a downlink control signal/channel, in fourth PDCCH monitoring occasions for the fourth search space set associated with (e.g., linked to) the third coreset. The fourth PDCCH monitoring occasions may be associated with the fourth search space set.

PDCCH monitoring occasions may be associated with a search space set, for example, if the wireless device monitors PDCCH candidates, for a DCI message, in the PDCCH monitoring occasions for the search space set. The wireless device may determine PDCCH monitoring occasions based on the search space set (e.g., PDCCH monitoring periodicities, etc.).

The first cell may be a scheduling cell. The second cell may be a scheduled cell. The first cell may cross-carrier schedule the second cell, for example, if the first cell is the scheduling cell and the second cell is the scheduled cell. The first cell cross-carrier scheduling the second cell may comprise monitoring (e.g., by the wireless device), for DCI and for the second cell, PDCCH candidates in PDCCH monitoring occasions for the one or more coresets of the first BWP of the first cell. The wireless device may receive/detect the DCI, for example, based on the monitoring.

The DCI may schedule a TB for the second cell. The DCI may schedule a PDSCH for the second cell. The wireless device may receive the TB (and/or the PDSCH) via the second cell, for example, based on the DCI scheduling the TB (and/or the PDSCH). The DCI may schedule a PUSCH for the second cell. The wireless device may send (e.g., transmit) the TB (and/or the PUSCH) via the second cell, for example, based on the scheduling the TB (and/or the PUSCH).

The DCI may schedule a transport block (TB) for the second BWP of the second cell. The DCI may schedule a PDSCH for the second BWP of the second cell. The wireless device may receive the TB (or the PDSCH) via the second BWP of the second cell, for example, based on the DCI scheduling the TB (or the PDSCH). The DCI may schedule a PUSCH for the second BWP of the second cell. The wireless device may send (e.g., transmit) the TB (and/or the PUSCH) via the second BWP of the second cell, based on the DCI scheduling the TB (and/or the PUSCH).

The first cell may be a scheduling cell. The second cell may be a scheduled cell. The first cell and the second cell may be the same (e.g., have the same configuration and/or may be the same cell). The first cell may self-schedule the second cell (and/or the first cell, which may be the same as the second cell), for example, based on the first cell and the second cell being the same. The first cell self-scheduling the second cell may comprise monitoring (e.g., by the wireless device), PDCCH candidates in PDCCH monitoring occasions for the one or more coresets of the first BWP of the first cell. The wireless device may perform the monitoring to determine a DCI message and/or the second cell (and/or the first cell, which may be the same as the second cell). The wireless device may receive/detect the DCI, for example, based on the monitoring.

In FIG. 16, the first BWP-specific numerology 1640 and the second BWP-specific numerology 1650 may be the same. A first slot duration 1635 (e.g., 1 ms, 5 ms, or any other duration) of a first slot of the first BWP of the first cell 1610 may be equal to a second slot duration 1636 of a second slot of the second BWP of the second cell, for example, if the first BWP-specific numerology 1640 and the second BWP-specific numerology 1650 are the same. The first slot of the first cell 1610 may correspond to the second slot of the second cell 1620, for example, if the first slot duration is equal to the second slot duration. For example, slot n of the first cell 1610 may correspond to (e.g., may be associated with) slot n of the second cell 1620. For example, slot n+1 of the first cell 1610 may correspond to slot n+1 of the second cell 1620. For example, slot n+2 of the first cell 1610 may correspond to slot n+2 of the second cell 1620 and so on. The correspondence (e.g., the association) may be one-to-one (e.g., between slots in the first cell 1610 and slots in the second cell 1620). The first slot may correspond to the second slot for example, if the first slot duration and the second slot duration are the same. Additionally or alternatively, the first slot may correspond to the second slot, for example, if the first slot and the second slot start at the same time (e.g. simultaneously). Additionally or alternatively, the first slot may correspond to the second slot, for example, if the first slot and the second slot end at the same time (e.g. simultaneously).

The wireless device may receive a single DCI message via the first cell 1610 in the first slot, for example, based on the first slot duration of the first BWP of the first cell 1610 being equal to the second slot duration of the second BWP of the second cell 1620. The single DCI message may schedule a transport block (e.g., PDSCH, PUSCH) for the second slot of the second cell 1620. The second slot may be, for example, at most one slot of the second cell 1620. In FIG. 16, DCI-0 in slot n (e.g., the first slot) of the first cell 1610 may schedule PDSCH-0 in slot n (e.g., the second slot) of the second cell 1620; DCI-1 (e.g., the first slot) in slot n+1 of the first cell 1610 may schedule PDSCH-1 in slot n+1 (e.g., the second slot) of the second cell 1620; and DCI-2 in slot n+2 (e.g., the first slot) of the first cell 1610 may schedule PDSCH-2 in slot n+3 (e.g., the second slot) of the second cell 1620.

The base station may send (e.g., transmit) a single DCI message (e.g., DCI 0 or DCI 1 or DCI 2) via the first cell 1610 (e.g., in the first slot) to schedule a transport block (e.g., PDSCH, PUSCH) for the second slot of the second cell 1620. The base station may send (e.g., transmit) the single DCI, for example, based on the first slot duration of the first BWP of the first cell 1610 being equal to the second slot duration of the second BWP of the second cell 1620.

The base station may send (e.g., transmit) a single DCI message (e.g., DCI 0 or DCI 1 or DCI 2) via the first cell 1610 (e.g., in the first slot) to schedule a single transport block (e.g., PDSCH-0 or PDSCH-1 or PDSCH-2) for the second slot of the second cell 1620. The base station may send (e.g., transmit) the single DCI message, for example, based on the first slot duration of the first BWP of the first cell 1610 being equal to the second slot duration of the second BWP of the second cell 1620.

The wireless device may receive a single DCI message in a first slot of the first BWP of the first cell 1610. The wireless device may not be capable of receiving a plurality of DCI messages in a first slot of the first BWP.

In FIG. 17 and FIG. 18, the first BWP-specific numerology 1740 (e.g., 15 kHz in FIG. 17 and/or FIG. 18) and the second BWP-specific numerology 1750 (e.g., 30 kHz in FIG. 17, 60 kHz in FIG. 18) may be different. The first BWP-specific numerology 1740 may be lower than the second BWP-specific numerology 1750. A first slot duration 1735 (e.g., 1 ms, 5 ms, or any other duration) of a first slot of the first BWP of the first cell 1610 may be equal to a second duration 1737 (e.g., Second duration in FIG. 17) of a plurality of second slot durations (e.g., comprising second slot duration 1736) of a plurality of second slots of the second BWP of the second cell 1620, for example, if the first BWP-specific numerology 1740 is lower than the second BWP-specific numerology 1750. A first slot of the first BWP of the first cell 1610 may correspond to (e.g., may be associated with) a plurality of second slots of the second BWP of the second cell 1620, for example, if the first BWP-specific numerology 1740 is lower than the second BWP-specific numerology 1750.

In FIG. 17, the first slot of the first cell 1610 may correspond to two slots of the second cell 1620. For example, slot n of the first cell 1610 may correspond to (e.g., may be associated with) slot 2n and/or slot 2n+1 of the second cell 1620. For example, slot n+1 of the first cell 1610 may correspond to slot 2n+2 and/or slot 2n+3 of the second cell 1620. For example, slot n+2 of the first cell 1610 may correspond to slot 2n+4 and/or slot 2n+5 of the second cell 1620 and so on. The correspondence (e.g., the association) may be one-to-many (e.g., one-to-two as shown in FIG. 17). For example, as shown in FIG. 17, the first slot duration 1735 of the first cell 1610 may be equal to the second duration 1737 of the two slots of the second cell 1620.

In FIG. 18, the first slot of the first cell 1610 may correspond to four slots of the second cell 1620. For example, slot n of the first cell 1610 may correspond to (e.g., may be associated with) slot 4n, slot 4n+1, slot 4n+2 and slot 4n+3 of the second cell 1620. For example, slot n+1 of the first cell 1610 may correspond to slot 4n+4, slot 4n+5, slot 4n+6 and slot 4n+7 of the second cell 1620. For example, slot n+2 of the first cell 1610 may correspond to slot 4n+8, slot 4n+9, slot 4n+10 and slot 4n+11 of the second cell 1620 and so on. The correspondence (e.g., the association) may be one-to-many, (e.g., one-to-four in FIG. 18). For example, in FIG. 18, the first slot duration 1835 of the first cell 1610 may be equal to the second duration 1837 of four slots of the second cell 1620. Four second slot durations 1836 may be equal to the second duration 1837.

The wireless device may receive a plurality of DCI messages via the first cell in the first slot based on the first slot duration of the first slot of the first BWP of the first cell being equal to the second duration of the plurality of second slots of the second BWP of the second cell 1620. A first quantity/number of the plurality of second slots and a second quantity/number of the plurality of DCI messages may be the same. For example, in FIG. 17, the second quantity/number may be two (e.g., DCI-0 and DCI-1 or DCI-2 and DCI-3). For example, in FIG. 18, the second quantity/number may be four (e.g., DCI-0, DCI-1, DCI-2 and DCI-3). The plurality of DCI messages may schedule a plurality of transport blocks (e.g., PDSCH, PUSCH) for the plurality of second slots of the second cell. For example, each DCI message of the plurality of DCI messages may schedule, in a second slot of the plurality of second slots of the second cell, a TB of the plurality of TB s. For example, in FIG. 17, DCI 0 and DCI 1 may be received/detected in slot n of the first cell 1610. DCI 0 may schedule PDSCH-0 in slot 2n of the second cell 1620. Additionally or alternatively, DCI-1 may schedule PDSCH-1 in slot 2n+1 of the second cell 1620. For example, in FIG. 17, DCI 2 and DCI 3 may be received/detected in slot n+1 of the first cell 1610, and may be used to schedule PDSCH-2 and PDSCH-3 in slot 2n+4 and slot 2n+5 of the second cell 1620, respectively. For example, in FIG. 18, DCI 0, DCI 1, DCI 2 and DCI 3 may be received/detected in slot n of the first cell 1610 and may be used to schedule PDSCH-0, PDSCH-1, PDSCH-2 and PDSCH-3 in slot 4n+8, slot 4n+9, slot 4n+10, slot 4n+11 of the second cell 1620, respectively.

FIG. 19, FIG. 20, FIG. 21 and FIG. 22 show examples of a PUCCH resource determination. A wireless device 1905 may receive (e.g., detect) a plurality of downlink control information (DCIs) (e.g., DCI-1, DCI-2, DCI-3, DCI-4 as shown in FIGS. 19-22). For example, the plurality of DCIs may be unicast DCI. For example, each DCI message of the plurality of DCI messages may be a unicast DCI message.

Figure 19:
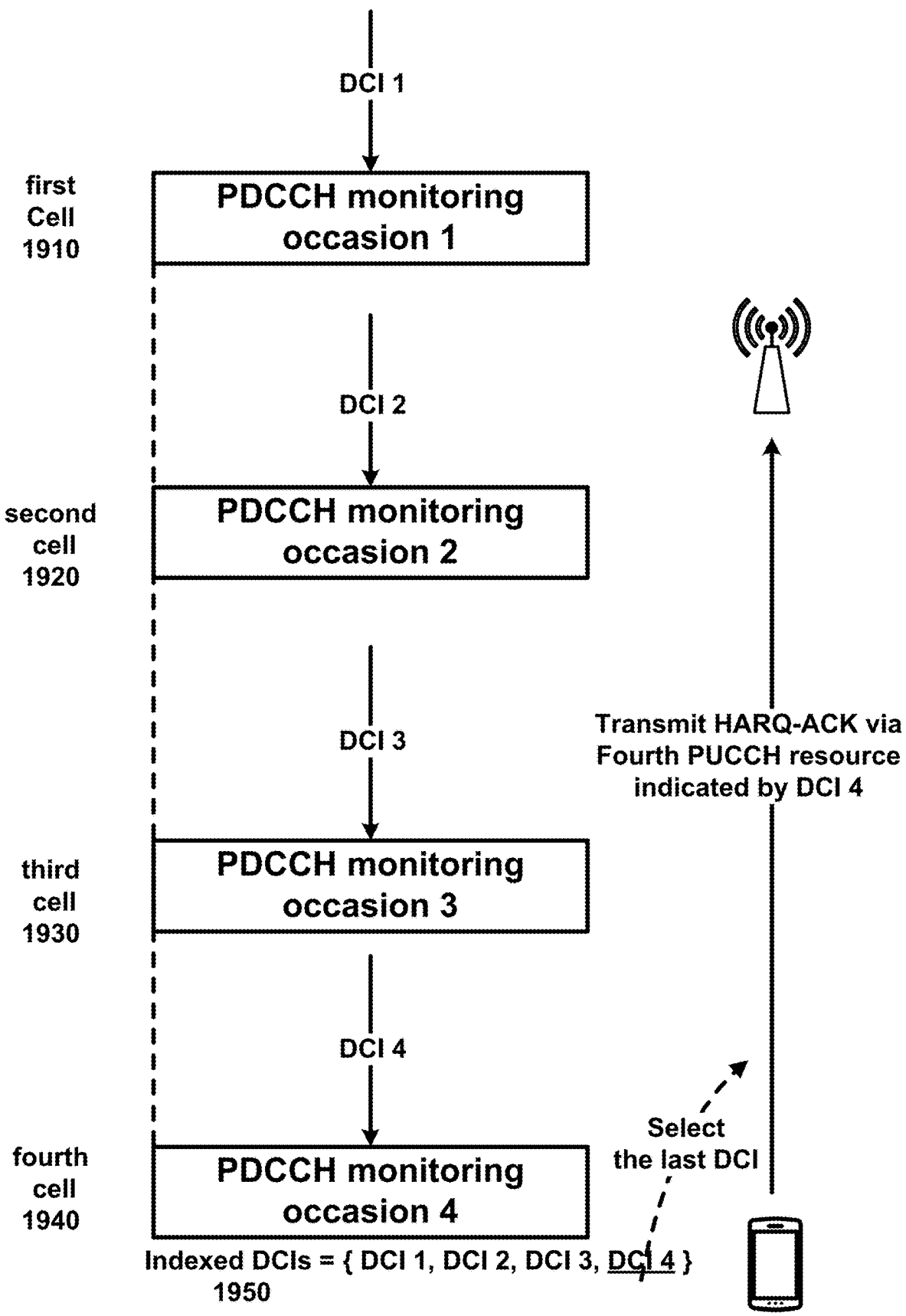
FIG. 19 shows an example of a physical uplink control channel (PUCCH) resource determination.

The wireless device 1905 may receive the plurality of DCI messages in cells (e.g., a first cell 1910, a second cell 1920, a third cell 1930, and/or a fourth cell 1940 in FIG. 19). Each cell (e.g., cells 1910-1940) may be associated with respective cell-specific indices (e.g., indicated by the one or more configuration parameters). The wireless device 1905 may receive each DCI message of the plurality of DCI messages in a respective cell (e.g., the first cell 1910, the second cell 1920, the third cell 1930, and/or the fourth cell 1940 in FIG. 19). For example, the DCI 1 may be received in the first cell 1910, the DCI 2 may be received in the second cell 1920, and so on.

Figure 20:
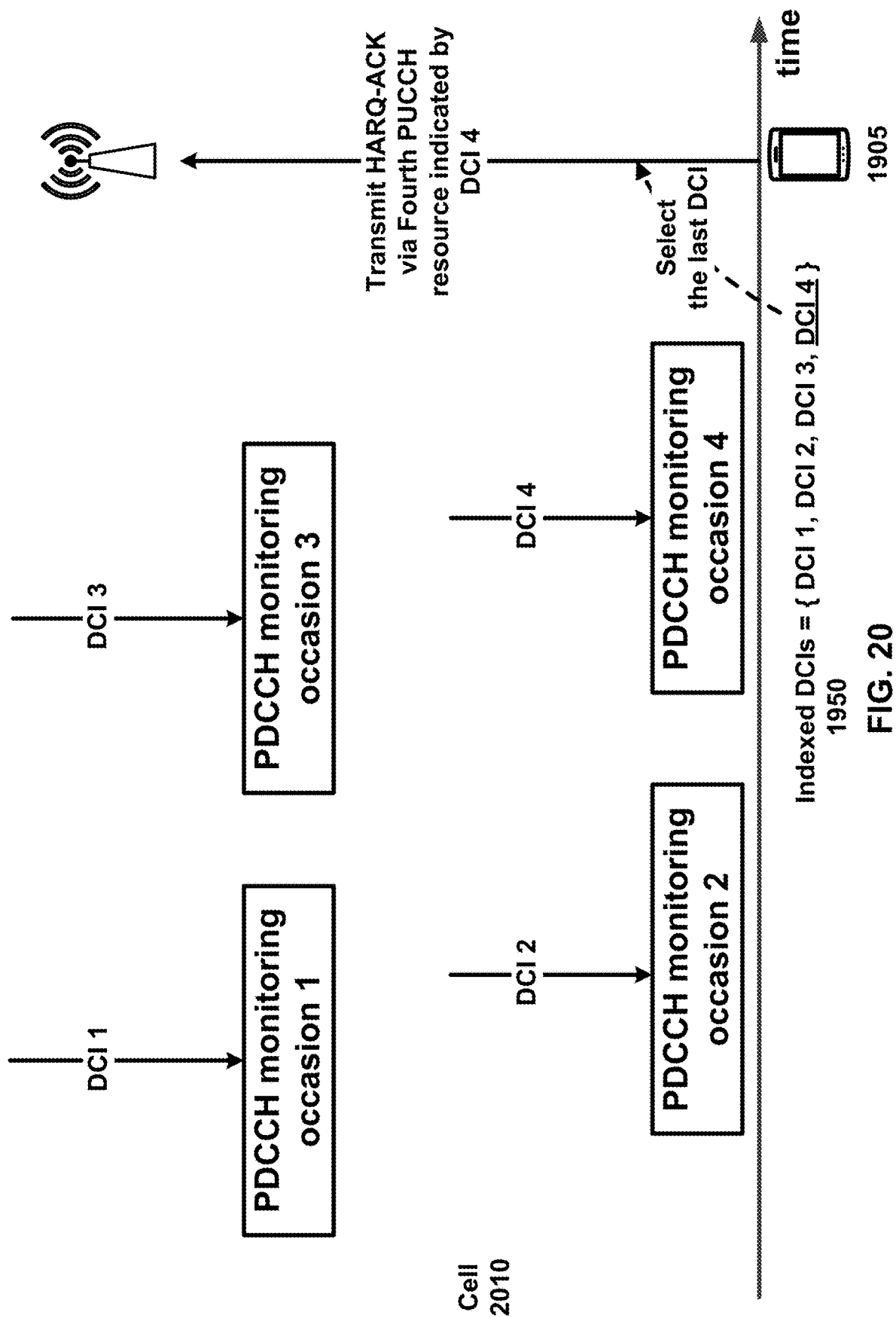
FIG. 20 shows an example of a PUCCH resource determination associated with a plurality of monitoring occasions.
Figure 21:
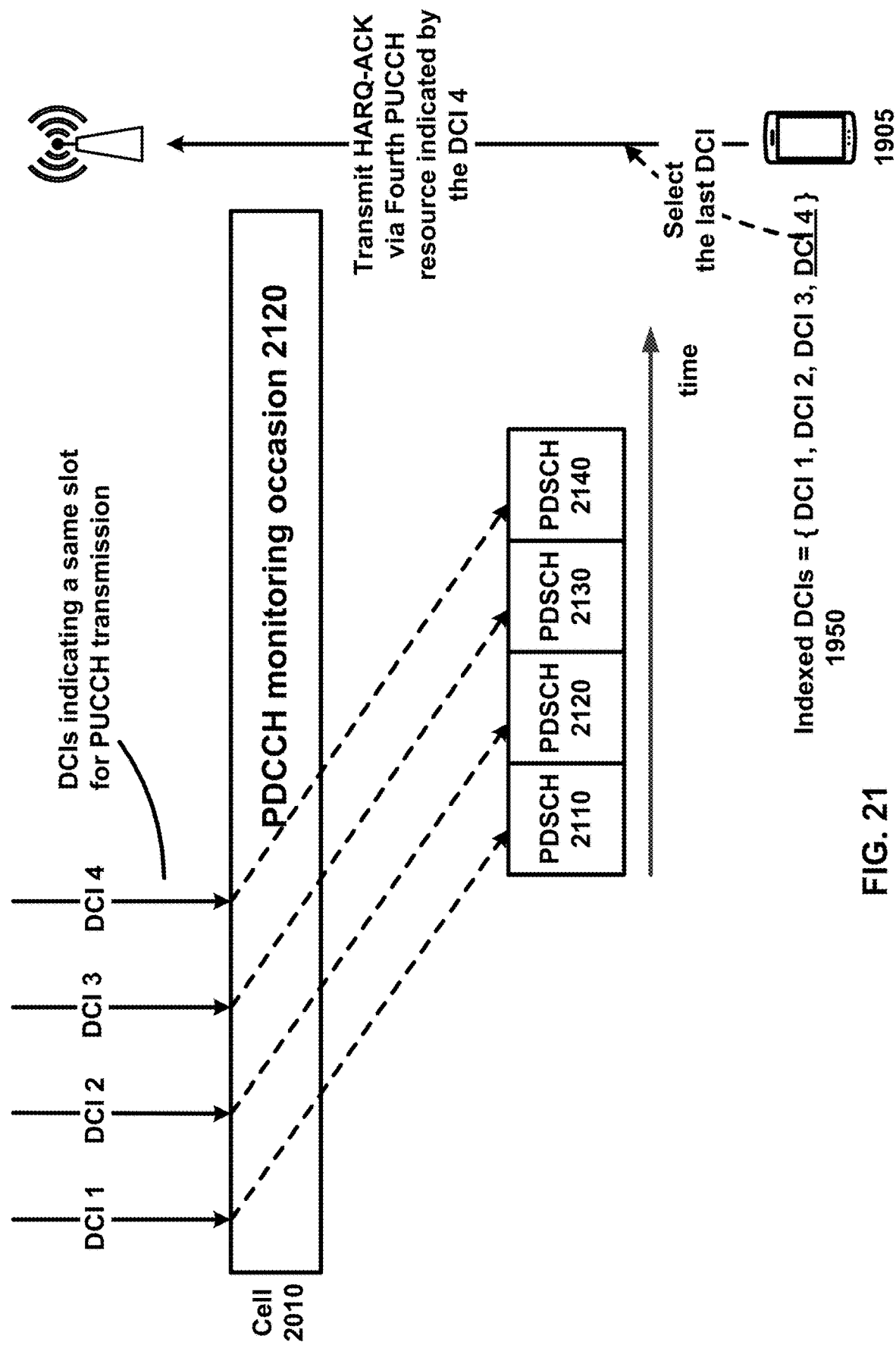
FIG. 21 shows an example of a PUCCH resource determination associated with a monitoring occasion.
Figure 22:
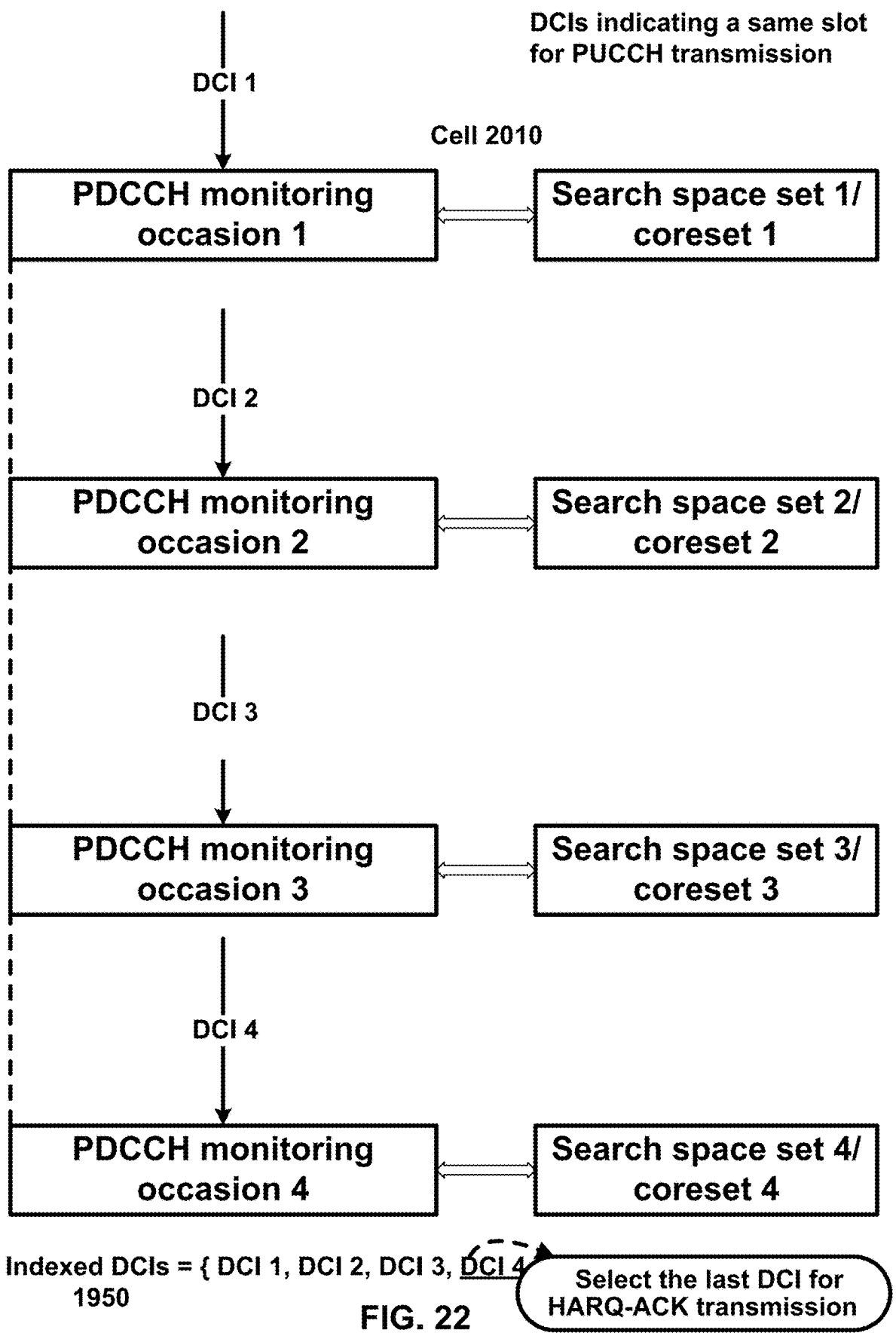
FIG. 22 shows an example of a PUCCH resource determination associated with monitoring occasions and search space sets.

The wireless device 1905 may receive each DCI message of the plurality of DCI messages in a respective PDCCH monitoring occasion (e.g., PDCCH monitoring occasions 1, 2, 3, or 4 in FIGS. 19-22). For example, as shown in FIG. 22, each PDCCH monitoring occasion 1-4 may be associated with a respective search space set. The wireless device 1905 may receive the each DCI message of the plurality of DCI messages in a corresponding PDCCH monitoring occasion (e.g., PDCCH monitoring occasion 1, 2, 3, or 4 in FIGS. 19-22). Each monitoring occasion may be associated with a respective search space set (e.g., search space sets 1, 2, 3, or 4 as shown in FIG. 22).

The respective search space set may be associated with (e.g., linked to) a respective coreset (e.g., as discussed in connection with FIGS. 16-18). The one or more configuration parameters may indicate a coreset (and/or coreset index) for the corresponding search space set (e.g., provided by a higher layer parameter controlResourceSetId in the higher layer parameter SearchSpace). The wireless device 1905 may receive each DCI message of the plurality of DCI messages in a respective PDCCH monitoring occasion (e.g., PDCCH monitoring occasion 1, 2, 3, or 4 in as shown in FIGS. 19-22). Each monitoring occasion may be associated with a respective coreset (e.g., as shown in FIG. 22). The wireless device 1905 may receive each DCI message of the plurality of DCI messages, for example, in a different PDCCH monitoring occasion (e.g., PDCCH monitoring occasion 1, 2, 3, or 4). Each PDCCH monitoring occasion may correspond to a respective search space set and/or coreset (e.g., as shown in FIG. 22). For example, PDCCH monitoring occasion 1 may correspond to the search space set 1 and the coreset 1, PDCCH monitoring occasion 1 may correspond to the search space set 2 and the coreset 2, and so on.

As shown in FIG. 21, each DCI message of the plurality of DCI messages may schedule a corresponding PDSCH in a respective time slot. The plurality of DCI messages (e.g., DCIs 1-4) may schedule corresponding PDSCHs in respective time slots (e.g., DCI 1 may schedule PDSCH 2110, DCI 2 may schedule PDSCH 2120, DCI 3 may schedule PDSCH 2130, and/or DCI 4 may schedule PDSCH 2140). Each DCI message of the plurality of DCI messages may comprise a PDSCH-to-HARQ feedback timing indicator field (e.g., a first HARQ feedback timing, a second HARQ feedback timing, a third HARQ feedback timing, a fourth HARQ feedback timing in FIG. 19, FIG. 20 and/or FIG. 22). Each timing indicator field may comprise a value indicating a slot (e.g., each value may indicate the same slot or different slots) for a PUCCH transmission. Each DCI message of the plurality of DCI messages may comprise a PUCCH resource indicator field (e.g., the first PUCCH resource, the second PUCCH resource, the third PUCCH resource, or the fourth PUCCH resource as shown in FIG. 19, FIG. 20 and FIG. 22) that indicates a corresponding PUCCH resource.

The wireless device 1905 may send (e.g., transmit), in a slot indicated by the PDSCH-to-HARQ feedback timing indicator field, HARQ-ACK information (e.g., of the PDSCH that corresponds to the timing indicator field). The HARQ-ACK information may be sent in the PUCCH transmission via the corresponding PUCCH resource indicated by the PUCCH resource indicator field.

The wireless device 1905 may receive the plurality of DCI messages in a slot (e.g., mini-slot, subframe, etc.) of a scheduling cell. The wireless device 1905 may receive the plurality of DCI messages in the same slot (or mini-slot, or subframe) of a scheduling cell. The scheduling cell may be different from the respective cells that receive each DCI message of the plurality of DCI messages (e.g., the first cell 1910, the second cell 1920, the third cell 1930, and the fourth cell 1940). The scheduling cell may be different from at least one of the respective cells (e.g., the first cell 1910, the second cell 1920, the third cell 1930, and the fourth cell 1940).

The respective cells may be scheduling cells (e.g., such as the first cell 1610 discussed in connection with FIGS. 16-18). The first cell 1910, the second cell 1920, the third cell 1930, and the fourth cell 1940 may be scheduling cells. Additionally or alternatively, the first cell 1910, the second cell 1920, the third cell 1930, and the fourth cell 1940 may be scheduled cells. The respective cells may be scheduled cells.

The wireless device 1905 may receive the respective PDSCHs in a scheduled cell (e.g., such as the second cell discussed in FIGS. 16-18). The scheduled cell may be different from the respective cells (e.g., the first cell 1910, the second cell 1920, the third cell 1930, and/or the fourth cell 1940 shown in FIG. 19). The wireless device 1905 may receive the respective PDSCHs in scheduled cells. The scheduled cells may be different from the respective cells (e.g., the first cell 1910, the second cell 1920, the third cell 1930, and/or the fourth cell 1940 shown in FIG. 19).

As shown in FIGS. 19-22, the plurality of DCI messages may comprise first DCI (e.g., DCI 1), second DCI (e.g., DCI 2), third DCI (e.g., DCI 3), and fourth DCI (e.g., DCI 4). The DCI 1 may schedule a first PDSCH (e.g., the PDSCH 2110 shown in FIG. 21) in a first time slot (e.g., slot 4n+8 in FIG. 18). The DCI 1 may comprise a first PDSCH-to-HARQ feedback timing indicator field with a first value indicating a first slot for a first PUCCH transmission. The DCI 1 may comprise a first PUCCH resource indicator field that indicates a first PUCCH resource. The wireless device 1905 may send (e.g., transmit), in the first slot (e.g., indicated by the first PDSCH-to-HARQ feedback timing indicator field), a first HARQ-ACK information (e.g., ACK, NACK). The first HARQ-ACK information may correspond to the first PDSCH in the first PUCCH transmission. The first HARQ-ACK information may be sent via the first PUCCH resource (e.g., indicated by the first PUCCH resource indicator field). The wireless device 1905 may receive the DCI 1 in a first PDCCH monitoring occasion (e.g., PDCCH monitoring occasion 1 in FIG. 19, FIG. 20 and/or FIG. 22). The first PDCCH monitoring occasion may be associated with a first search space set (e.g., search space set 1 in FIG. 22) that is identified by a first search space set index (e.g., provided by a higher layer parameter searchSpaceId that may be indicated by the one or more configuration parameters). The first search space set may be associated with (e.g., linked to) a first coreset (e.g., coreset 1 in FIG. 22). The first coreset may be indicated (e.g., identified) by a first coreset index (e.g., provided by a higher layer parameter controlResourceSetId, indicated by the one or more configuration parameters). The wireless device 1905 may receive/detect the DCI 1 in/via a first cell (e.g., the first cell 1910 in FIG. 19). The first cell may be indicated (e.g., identified) by a first cell-specific index (e.g., provided by a higher layer parameter servCellIndex that may be indicated by the one or more configuration parameters).

The DCI 2 may schedule a second PDSCH (e.g., the PDSCH 2120 shown in FIG. 21) in a second time slot (e.g., slot 4n+9 shown in FIG. 18). The DCI 2 may comprise a second PDSCH-to-HARQ feedback timing indicator field with a second value. The second value may indicate a second slot for a second PUCCH transmission. The DCI 2 may comprise a second PUCCH resource indicator field indicating a second PUCCH resource. The wireless device 1905 may send (e.g., transmit), in the second slot (e.g., indicated by the second PDSCH-to-HARQ feedback timing indicator field), a second HARQ-ACK information (e.g., ACK, NACK). The second HARQ-ACK information may correspond to the second PDSCH in the second PUCCH transmission. The second HARQ-ACK information may be sent via the second PUCCH resource (e.g., indicated by the second PUCCH resource indicator field). The wireless device 1905 may receive the DCI 2 in a second PDCCH monitoring occasion (e.g., PDCCH monitoring occasion 2 as shown in FIG. 19, FIG. 20 and FIG. 22). The second PDCCH monitoring occasion may be associated with a second search space set (e.g., search space set 2 as shown in FIG. 22). The second search space set may be indicated (e.g., identified) by a second search space set index (e.g., provided by a higher layer parameter searchSpaceId that may be indicated by the one or more configuration parameters). The second search space set may be associated with (e.g., linked to) a second coreset (e.g., coreset 2 in FIG. 22). The second coreset may be indicated (e.g., identified) by a second coreset index (e.g., provided by a higher layer parameter controlResourceSetId that may be indicated by the one or more configuration parameters). The wireless device 1905 may receive/detect the DCI 2 in/via a second cell (e.g., second cell 1920 in FIG. 19). The second cell may be indicated (e.g., identified) by a second cell-specific index (e.g., provided by a higher layer parameter servCellIndex that may be indicated by the one or more configuration parameters).

The DCI 3 may schedule a third PDSCH (e.g., the PDSCH 2130 shown in FIG. 21) in a third time slot (e.g., slot 4n+10 shown in FIG. 18). The DCI 3 may comprise a third PDSCH-to-HARQ feedback timing indicator field. The third indicator field may comprise a third value indicating a third slot for a third PUCCH transmission. The DCI 3 may comprise a third PUCCH resource indicator field that indicates a third PUCCH resource. The wireless device 1905 may send (e.g., transmit), in the third slot (e.g., indicated by the third PDSCH-to-HARQ feedback timing indicator field), a third HARQ-ACK information (e.g., ACK, NACK). The third HARQ-ACK information may correspond to the third PDSCH in the third PUCCH transmission. The third HARQ-ACK information may be sent via the third PUCCH resource (e.g., indicated by the third PUCCH resource indicator field). The wireless device 1905 may receive the DCI 3 in a third PDCCH monitoring occasion (e.g., PDCCH monitoring occasion 3 in FIG. 19, FIG. 20 and/or FIG. 22). The third PDCCH monitoring occasion may be associated with a third search space set (e.g., search space set 3 in FIG. 22). The third search space set may be indicated (e.g., identified) by a third search space set index (e.g., provided by a higher layer parameter searchSpaceId). The third search space set may be associated with (e.g., linked to) a third coreset (e.g., coreset 3 in FIG. 22) that is identified by a third coreset index. The wireless device 1905 may receive/detect the third DCI in/via a third cell (e.g., the third cell 1930 shown in FIG. 19). The third cell may be indicated (e.g., identified) by a third cell-specific index.

The DCI 4 may schedule a fourth PDSCH (e.g., the PDSCH 2140 in FIG. 21) in a fourth time slot (e.g., slot 4n+11 in FIG. 18). The DCI 4 may comprise a fourth PDSCH-to-HARQ feedback timing indicator field with a fourth value indicating a fourth slot for a fourth PUCCH transmission. The DCI 4 may comprise a fourth PUCCH resource indicator field that indicates a fourth PUCCH resource. The wireless device 1905 may send (e.g., transmit), in the fourth slot (e.g., indicated by the fourth PDSCH-to-HARQ feedback timing indicator field), a fourth HARQ-ACK information (e.g., ACK, NACK). The fourth HARQ-ACK information may correspond to the fourth PDSCH in the fourth PUCCH transmission. The fourth HARQ-ACK information may be sent via the fourth PUCCH resource (e.g., indicated by the fourth PUCCH resource indicator field). The wireless device 1905 may receive the DCI 4 in a fourth PDCCH monitoring occasion that is associated with a fourth search space set (e.g., search space set 4 in FIG. 22). The fourth search space set may be indicated (e.g., identified) by a fourth search space set index (e.g., provided by a higher layer parameter searchSpaceId). The fourth search space set may be associated with (e.g., linked to) a fourth coreset (e.g., coreset 4 in FIG. 22) that is identified by a fourth coreset index. The wireless device 1905 may receive/detect the DCI 4 in/via a fourth cell (e.g., fourth cell 1940 in FIG. 19). The fourth cell may be indicated (e.g., identified) by a fourth cell-specific index. There may be any quantity of DCI messages indicating any quantity of PUCCH resources and/or comprising any quantity of PDSCH-to-HARQ feedback timing indicator fields.

The first coreset, the second coreset, the third coreset and/or the fourth coreset may be different (e.g., as discussed in connection with FIG. 19, FIG. 20 and FIG. 22). The first coreset and the second coreset may be different, for example, if the first coreset index and the second coreset index are different. The first coreset and the second coreset may be different, for example, if a first cell configured with the first coreset and a second cell configured with the second coreset are different.

The first coreset, the second coreset, the third coreset, and/or the fourth coreset may be the same (e.g., as discussed in connection with FIG. 20 and FIG. 21). The first coreset, the second coreset, the third coreset and the fourth coreset may be the same, for example, if the first coreset index, the second coreset index, the third coreset index and the fourth coreset index are the same. The first coreset, the second coreset, the third coreset and the fourth coreset may be the same, for example, if the first coreset, the second coreset, the third coreset and the fourth coreset are configured, by the base station, for the same cell (e.g., the cell 2010 shown in FIG. 20, FIG. 21).

The search space set 1, the search space set 2, the search space set 3, and the search space set 4 may be different (e.g. as discussed in connection with FIG. 19, FIG. 20 and FIG. 22). The search space set 1 and the search space set 2 may be different, for example, if the first search space set index and the second search space set index are different. The first search space set and the second search space set may be different, for example, if a first cell configured with the first search space set and a second cell configured with the second search space set are different.

The first search space set, the second search space set, the third search space set and the fourth search space set may be the same (e.g., as discussed in connection with FIG. 20 and FIG. 21). The first search space set, the second search space set, the third search space set and the fourth search space set may be the same, for example, if the first search space set index, the second search space set index, the third search space set index, and the fourth search space set index are the same. The first search space set, the second search space set, the third search space set and the fourth search space set may be the same, for example, if the first search space set, the second search space set, the third search space set and the fourth search space set are configured, by the base station, for the same cell (e.g., the cell 2010 shown in FIG. 20, FIG. 21).

The respective value of the PDSCH-to-HARQ feedback timing indicator field of each DCI message of the plurality of DCI messages may indicate a slot (e.g., the same slot, or two or more different slots) for the respective PUCCH transmission. The PDSCH-to-HARQ feedback timing indicator field (e.g., a value in the field) of each DCI message of the plurality of DCI messages may indicate the same slot for each respective PUCCH transmission. In FIG. 19-22, the first slot for the first PUCCH transmission, the second slot for the second PUCCH transmission, the third slot for the third PUCCH transmission, and the fourth slot for the fourth PUCCH transmission may, for example, be the same (e.g., the slots may be scheduled at or otherwise correspond to the same time).

Sending (e.g., transmitting) two or more sets of HARQ-ACK information in the same slot (e.g., indicated by the PDSCH-to-HARQ feedback timing indicator field). For example, sending the first HARQ-ACK information in the first PUCCH transmission via the first PUCCH resource, the second HARQ-ACK information in the second PUCCH transmission via the second PUCCH resource, the third HARQ-ACK information in the third PUCCH transmission via the third PUCCH resource and the fourth HARQ-ACK information in the fourth PUCCH transmission via the fourth PUCCH resource may increase the power consumption of the wireless device 1905. The base station may monitor (and/or attempt to detect) the first PUCCH resource, the second PUCCH resource, the third PUCCH resource, and the fourth PUCCH resource simultaneously, for example, if multiple sets of HARQ-ACK information are sent in the same slot. This may result in increased power consumption at the base station. It may be beneficial to decrease the power consumption at the wireless device 1905 and/or the base station, for example, if each DCI message of a plurality of DCI messages indicates the same slot for each respective PUCCH transmission (e.g., HARQ-ACK). PUCCH resource determination may be enhanced, for example, for situations where the plurality of DCI messages indicates the same slot for PUCCH transmission. This may decrease the power consumption at the wireless device 1905 and/or the base station. This may increase the efficiency of resource usage and/or decrease the uplink interference to other wireless devices and/or cells.

The wireless device 1905 may index the plurality of DCI messages in an order, for example, based on the respective value of the PDSCH-to-HARQ feedback timing indicator field of each DCI message of the plurality of DCI messages that indicate the same slot for the respective PUCCH transmission. The indexing the plurality of DCI messages may comprise putting the plurality of DCI messages in an order (e.g., in a sequence). The wireless device 1905 may index the plurality of DCI messages in an order, for example, based on the PDSCH-to-HARQ feedback timing indicator field, of each DCI message of the plurality of DCI messages. In FIGS. 19-22, the wireless device 1905 may index the DCI 1, the DCI 2, the DCI 3 and the DCI 4 in an order, for example, if the first slot for the first PUCCH transmission, the second slot for the second PUCCH transmission, the third slot for the third PUCCH transmission and the fourth slot for the fourth PUCCH transmission are the same.

The wireless device 1905 may determine a selected DCI message, from the plurality of DCI messages, for example, based on the order of the plurality of DCI messages. For example, the selected DCI message may be the last DCI message (e.g., the DCI 4 in FIGS. 19-22) in the order (e.g., the indexed DCI messages 1950 shown in FIGS. 19-22). For example, the selected DCI message may be the first DCI message in the order. The last DCI message may correspond to a DCI message, of the plurality of DCI messages, with the last position in the order. The last DCI message may be the DCI 4 (e.g., shown in FIGS. 19-22), for example, based on the DCI 4 having the last position (4th position) in the order (e.g., the indexed DCI messages 1950). The first DCI message may correspond to a DCI message, of the plurality of DCI messages, with the first position in the order. The first DCI message may be the DCI 1 (e.g., shown in FIGS. 19-22), for example, based on the DCI 1 having the first position in the order (e.g., the indexed DCIs 1950).

A last occurring time slot of the plurality of time slots scheduled by the plurality of DCI messages may correspond to the last DCI message. A first occurring time slot of the plurality of time slots scheduled by the plurality of DCI messages may correspond to the first DCI message.

The wireless device 1905 may determine a PUCCH resource (e.g., the fourth PUCCH resource corresponding to the DCI 4 in FIGS. 19-21), for example, based on a PUCCH resource indicator field in the selected DCI message (e.g., the DCI 4 in FIGS. 19-22). The selected DCI message may comprise the PUCCH resource indicator field indicating the PUCCH resource. The PUCCH resource may be the first PUCCH resource (e.g., the PUCCH resource corresponding to the DCI 1), for example, if the selected DCI message is the first DCI message (e.g., DCI 1). The PUCCH resource may be the second PUCCH resource (e.g., the PUCCH resource corresponding to the DCI 2), for example, if the selected DCI message is the second DCI message (e.g., the DCI 2). The PUCCH resource may be the third PUCCH resource (e.g., the PUCCH resource corresponding to the DCI 3), for example, if the selected DCI message is the third DCI message (e.g., the DCI 3). The PUCCH resource may be the fourth PUCCH resource (e.g., the PUCCH resource corresponding to the DCI 4), for example, if the selected DCI message is the fourth DCI message (e.g., DCI 4).

The wireless device 1905 may send (e.g., transmit) a HARQ-ACK information via the PUCCH resource (e.g., the fourth PUCCH resource corresponding to the DCI 4 in FIGS. 19-21), for example, based on the PUCCH resource indicator field in the selected DCI message (e.g., DCI 4 in FIGS. 19-22). The HARQ-ACK information may comprise HARQ-ACK information corresponding to each scheduled PDSCH. For example, the HARQ-ACK information may comprise the first HARQ-ACK information of the first PDSCH, the second HARQ-ACK information of the second PDSCH, the third HARQ-ACK information of the third PDSCH, and the fourth HARQ-ACK information of the fourth PDSCH. The wireless device 1905 may multiplex the first HARQ-ACK information of the first PDSCH, the second HARQ-ACK information of the second PDSCH, the third HARQ-ACK information of the third PDSCH, and the fourth HARQ-ACK information in the HARQ-ACK information (e.g., the multiplexed HARQ-ACK information).

The wireless device 1905 may send (e.g., transmit) the HARQ-ACK information (e.g., the multiplexed HARQ-ACK information) via the PUCCH resource in the same slot (e.g., the slot indicated by the PDSCH-to-HARQ feedback timing indicator field of each DCI message). For example, the respective value of the PDSCH-to-HARQ feedback timing indicator field of each DCI message of the plurality of DCI messages may indicate the same slot for each respective PUCCH transmission.

FIG. 19 shows an example of a PUCCH resource determination. In FIG. 19, each PDCCH monitoring occasion index of the respective PDCCH monitoring occasion (e.g., in which each DCI message of the plurality of DCI messages is received) may be the same and/or equal. The indexing the plurality of DCI messages in the order may be based on a respective cell in which each DCI message of the plurality of DCI messages is received, for example, if each PDCCH monitoring occasion index of the respective PDCCH monitoring occasion (e.g., in which each DCI message of the plurality of DCI messages is received is the same and/or equal). A plurality of DCI messages may be received (e.g., the DCI 1, the DCI 2, the DCI 3, and/or the DCI 4). Each DCI message of the plurality of DCI messages may indicate the same slot for PUCCH transmission.

The order of the indexed plurality of DCI messages may be based, for example, on the one or more cells where each DCI message of the plurality of DCI messages is received. The order of the indexed plurality of DCI messages may be based, for example, on a respective cell-specific index of a respective cell in which each DCI message of the plurality of DCI messages is received. The order of the indexed plurality of DCI messages may be based, for example, on an ascending (or descending) order of respective cell-specific indices of the respective cells in which each DCI message of the plurality of DCI messages is received.

In FIG. 19 and/or FIG. 22, the PDCCH monitoring occasion index corresponding to each DCI message of the plurality of DCI messages may be the same. For example, a respective PDCCH monitoring occasion index of the respective PDCCH monitoring occasion in which a DCI message (e.g., some or all of the DCI messages) of the plurality of DCI messages is received may be the same and/or equal. The respective PDCCH monitoring occasion index of the respective PDCCH monitoring occasion may be the same and/or equal, for example, if the respective search space set associated with the respective PDCCH monitoring occasion in which each DCI message of the plurality of DCI messages is received starts at the same time. In FIG. 19 and FIG. 22, a first time (e.g., a start time of the first search space set as discussed in connection with FIG. 20), a second time (e.g., a start time of the second search space set), a third time (e.g., a start time of the third search space set) and/or a fourth time (e.g., a start time of the fourth search space set) may be the same. The wireless device 1905 may determine that a first PDCCH monitoring occasion index of the first PDCCH monitoring occasion, a second PDCCH monitoring occasion index of the second PDCCH monitoring occasion, a third PDCCH monitoring occasion index of the third PDCCH monitoring occasion; and a fourth PDCCH monitoring occasion index of the fourth PDCCH monitoring occasion may be the same and/or equal, for example, based on the first time, the second time, the third time and the fourth time being the same. Any quantity of start times (e.g., n start times) associated with one or more search space sets may be the same. The wireless device 1905 may determine that any quantity of PDCCH monitoring occasion indices are the same, for example, based on any quantity of corresponding start times being the same.

In FIG. 19, the wireless device 1905 may determine that the first cell-specific index of the first cell in which the DCI 1 is received is different (e.g., lower or higher) than the second cell-specific index of the second cell in which the DCI 2 is received. The wireless device 1905 may include and/or index the DCI 1 before (e.g., prior to, earlier than) the DCI 2 in the order, for example, based on the determining that the first cell-specific index of the first cell is different (e.g., lower or higher) from the second cell-specific index of the second cell.

The including/indexing the DCI 1 before (e.g., prior to, earlier than) the DCI 2 in the order may result in a first position of the DCI 1 in the order being earlier than (e.g., before, lower than, etc.) a second position of the DCI 2 in the order. For example, in FIG. 19, the position of the first DCI (e.g., DCI 1) in the order (e.g., the indexed DCI messages 1950 in FIG. 19) may be earlier (e.g., lower) than the position of the second DCI (e.g., DCI 2) in the order (e.g., the indexed DCI messages 1950 in FIG. 19).

In FIG. 19, the wireless device 1905 may determine that the first cell-specific index of the first cell in which the DCI 1 is received is different (e.g., lower or higher) than each of the following: the second cell-specific index of the second cell in which the DCI 2 is received, the third cell-specific index of the third cell in which the DCI 3 is received, and the fourth cell-specific index of the fourth cell in which the DCI 4 is received. The wireless device 1905 may index/include the first DCI message before each of the second DCI message, the third DCI message, and the fourth DCI message in the order, for example, based on the determining that the DCI 1 is different (e.g., lower or higher than the other DCI messages).

The wireless device 1905 may determine that the second cell-specific index is different (e.g., lower or higher) than the third cell-specific index and the fourth cell-specific index. The wireless device 1905 may index/include the DCI 2 before the DCI 3 and the DCI 4 in the order, for example, based on the determining. The wireless device 1905 may determine that the third cell-specific index is different (e.g., lower or higher) than the fourth cell-specific index. The wireless device 1905 may index/include the DCI 3 before the DCI 4 in the order, for example, based on the determining.

The wireless device 1905 may index/include the plurality of DCI messages, in an order based on an ascending (or descending) order of cell-specific indices of the respective cells in which each DCI message of the plurality of DCI messages is received. For example, the order of the DCI messages may be as follows: the DCI 1, the DCI 2, the DCI 3, and the DCI 4 (e.g., the order shown by the indexed DCI messages 1950 in FIG. 19). Any ordering of DCI messages may be used. For example, the DCI messages may be ordered in ascending order based on the time at which each DCI message is received. For example, the DCI messages may be ordered in descending order based on the time at which each DCI message is received.

FIG. 20 shows an example of a PUCCH resource determination. A first PDCCH monitoring occasion associated with a first search space set may start at a first time (e.g., symbol, mini-slot, etc.) in a first slot (e.g., or subframe, or frame, or mini-slot) of a first cell. A second PDCCH monitoring occasion associated with a second search space set may start at a second time in a second slot of a second cell. The first slot and the second slot may be the same. The first slot and the second slot may be different. The first cell and the second cell may be the same. The first cell and the second cell may be different. A plurality of DCI messages may be received (e.g., the DCI 1, the DCI 2, the DCI 3, and/or the DCI 4). Each DCI message of the plurality of DCI messages may indicate the same slot for PUCCH transmission.

The first time and the second time may be the same. The first PDCCH monitoring occasion and the second PDCCH monitoring occasion may have a same PDCCH monitoring occasion index, for example, if the first time and the second time are within a threshold time of each other (e.g., they are the same time). A first PDCCH monitoring occasion index of the first PDCCH monitoring occasion and a second PDCCH monitoring occasion index of the second PDCCH monitoring occasion may be the same, for example, if the first time and the second time are within a threshold time of each other (e.g., they are the same time).

The first time and the second time may be different. The first PDCCH monitoring occasion and the second PDCCH monitoring occasion may have different PDCCH monitoring occasion indices, for example, based on the first time and the second time being different. A first PDCCH monitoring occasion index of the first PDCCH monitoring occasion and a second PDCCH monitoring occasion index of the second PDCCH monitoring occasion may be different, for example, based on the first time and the second time being different. Any number of PDCCH monitoring occasions may be different, for example, based on the start time of each PDCCH monitoring occasion's associated search space set.

The first time (e.g., time T1) may be lower (e.g., earlier) in time (e.g., T1<T2) than the second time (e.g., time T2). The first PDCCH monitoring occasion index may be lower than (e.g., placed before) the second PDCCH monitoring occasion index, for example, based on the first time being lower (or earlier) in time than the second time. The first time (e.g., time T1) may be higher (e.g., later) in time (e.g., T1>T2) than the second time (at time T2). The first PDCCH monitoring occasion index may be higher than (e.g., placed after) the second PDCCH monitoring occasion index, for example, based on the first time being higher (e.g., later) in time than the second time.

Indexing the plurality of DCI messages in the order may be, for example, based on a respective PDCCH monitoring occasion index in which each DCI message of the plurality of DCI messages is received. The indexing the plurality of DCI messages in the order may be, for example, based on an ascending (or descending) order of respective PDCCH monitoring occasion indices of the respective PDCCH monitoring occasions during which each DCI message of the plurality of DCI messages is received.

The respective cells in which each DCI message of the plurality of DCI messages is received may be the same (e.g., cell 2010 in FIG. 20 and/or the first cell discussed in connection with FIGS. 16-18). The respective cell in which the wireless device 1905 receives/detects each DCI message of the plurality of DCI messages may be the same. For example, the first cell, the second cell, the third cell and the fourth cell may be the same. The first cell, the second cell, the third cell and the fourth cell may be the same, for example, if the first cell-specific index, the second cell-specific index, the third cell-specific index, and the fourth cell-specific index are the same and/or equal. Any quantity/number of DCI messages may be received by the wireless device 1905 in any quantity/number of cells. Any quantity/number of cells may be the same.

The first PDCCH monitoring occasion associated with the first search space set may start at a first time. The second PDCCH monitoring occasion associated with the second search space set may start at a second time. The third PDCCH monitoring occasion associated with the third search space set may start at a third time. The fourth PDCCH monitoring occasion associated with the fourth search space set may start at a fourth time.

A PDCCH monitoring occasion may start at a time, for example, if the search space set associated with the PDCCH monitoring occasion starts at the time. The wireless device 1905 may monitor (e.g., start monitoring), for a DCI message, PDCCH candidates in the PDCCH monitoring occasion of the search space set at the time.

The wireless device 1905 may determine that PDCCH monitoring occasions may be different. The wireless device 1905 may determine that a first PDCCH monitoring occasion index of the first PDCCH monitoring occasion during which the DCI 1 is received is different (e.g., lower or higher) than each of a second PDCCH monitoring occasion index of the second PDCCH monitoring occasion during which the DCI 2 is received, a third PDCCH monitoring occasion index of the third PDCCH monitoring occasion during which the DCI 3 is received and a fourth PDCCH monitoring occasion index of the fourth PDCCH monitoring occasion during which the DCI 4 is received. The wireless device 1905 may index/include the DCI 1 before the DCI 2, the DCI 3, and/or the DCI 4 in the order, for example, based on the determining. The first PDCCH monitoring occasion index may be different (e.g., lower or higher) than the second PDCCH monitoring occasion index, the third PDCCH monitoring occasion index, and the fourth PDCCH monitoring occasion index, for example, if the first time is different (e.g., earlier or later) in time than the second time, the third time, and the fourth time. Any quantity/number of PDCCH monitoring occasion indices may be different from each other. Any quantity/number of DCI messages may be ordered based on PDCCH monitoring occasion indices associated with each DCI message.

The wireless device 1905 may determine that the second PDCCH monitoring occasion index is different (e.g., lower or higher) than the third PDCCH monitoring occasion index and the fourth PDCCH monitoring occasion index. The wireless device 1905 may index/include the DCI 2 before the DCI 3 and the DCI 4 in the order, for example, based on the determining. The second PDCCH monitoring occasion index may be different (e.g., lower or higher) than the third PDCCH monitoring occasion index and the fourth PDCCH monitoring occasion index, for example, if the second time is different (e.g., earlier or later in time) than the third time and the fourth time.

The wireless device 1905 may determine that the third PDCCH monitoring occasion index is lower than the fourth PDCCH monitoring occasion index. The wireless device 1905 may index/include the DCI 3 before the DCI 4 in the order, for example, based on the determining. The third PDCCH monitoring occasion index may be different (e.g., lower or higher) than the fourth PDCCH monitoring occasion index, for example, if the third time is different (e.g., earlier or later in time) than the fourth time.

The wireless device 1905 may index the plurality of DCI messages in an order, for example, that is based on an ascending (or descending) order of respective PDCCH monitoring occasion indices of the respective PDCCH monitoring occasions that the plurality of DCI messages is received. For example, the wireless device 1905 may index the plurality of DCI messages in an order comprising the DCI 1 in the first position, the DCI 2 in the second position, the DCI 3 in the third position, and the DCI 4 in the fourth position (e.g., as shown in the indexed DCI messages 1950 in FIG. 20).

FIG. 21 shows an example of a PUCCH resource determination. Each DCI of a plurality of DCIs (e.g., the DCI 1, the DCI 2, the DCI 3, and the DCI 4) may be received in the PDCCH monitoring occasion 2120. A respective PDCCH monitoring occasion index of the respective PDCCH monitoring occasion 2120 in which each DCI message of the plurality of DCI messages is received may be the same/equal. The respective PDCCH monitoring occasion index of the respective PDCCH monitoring occasion 2120 may be the same/equal, for example, if the respective search space set associated with the respective PDCCH monitoring occasion 2120 starts within a threshold time (e.g., at the same time) for each DCI message of the plurality of DCI messages.

The respective PDCCH monitoring occasion in which the wireless device 1905 receives/detects each DCI message of the plurality of DCI messages may be the same. The respective PDCCH monitoring occasion in which the wireless device 1905 receives/detects each DCI message of the plurality of DCI messages may be determined to be the same, for example, if the respective search space set associated with the respective PDCCH monitoring occasion in which each DCI message of the plurality of DCI messages is received is the same. In FIG. 21, the wireless device 1905 may determine that the first PDCCH monitoring occasion (e.g., in which the DCI 1 is received), the second PDCCH monitoring occasion (e.g., in which the DCI 2 is received), the third PDCCH monitoring occasion (e.g., in which the DCI 3 is received); and the fourth PDCCH monitoring occasion (e.g., in which the DCI 4 is received) may be the same. The wireless device 1905 may detect/receive the DCI 1, the DCI 2, the DCI 3 and the DCI 4 via/in the same PDCCH monitoring occasion (e.g., the PDCCH monitoring occasion 2120 shown in FIG. 21).

In FIG. 21, the respective cells in which the plurality of DCI messages is received may be the same (e.g., cell 2010 in FIG. 21 and FIG. 22, the first cell 1610 discussed in connection with FIGS. 16-18. etc.). The respective cell in which the wireless device 1905 receives/detects each DCI message of the plurality of DCI messages may be the same. For example, the first cell, the second cell, the third cell, and the fourth cell may be the same. The first cell, the second cell, the third cell, and the fourth cell may be determined to be the same, for example, if the first cell-specific index, the second cell-specific index, the third cell-specific index, and the fourth cell-specific index are the same/equal. Any number of DCI messages may be received in any number of cells. Any number of cells may be determined to be the same, for example, based on the cell-specific index of each cell.

The wireless device 1905 may detect/receive the DCI 2, the DCI 2, the DCI 3 and the DCI 4 via/in a same PDCCH monitoring occasion (e.g., PDCCH monitoring occasion in FIG. 21) of a same cell (e.g., the cell 2010 shown in FIG. 21 and FIG. 22). The wireless device 1905 may receive/detect the plurality of DCI messages in a same PDCCH monitoring occasion (e.g., the PDCCH monitoring occasion 2120 in FIG. 21) of a same cell (e.g., the cell 2010 in FIG. 21). The first PDCCH monitoring occasion of the DCI 1, the second monitoring occasion of the DCI 2, the third PDCCH monitoring occasion of the DCI 3, and the fourth monitoring occasion of the DCI 4 may be the same. The first cell, the second cell, the third cell and the fourth cell may be the same. Any number of PDCCH monitoring occasions (e.g., associated with any number of DCI messages) may be the same.

The indexing the plurality of DCI messages in the order may be based on the respective time slot (of a respective PDSCH) that each DCI message of the plurality of DCI messages schedules. The indexing the plurality of DCI messages in the order may be, for example, based on an ascending/descending order of the respective time slots (e.g., of the respective PDSCHs) that the plurality of DCI messages schedule.

The wireless device 1905 may determine that the first time slot of the first PDSCH is earlier (or lower) in time than the second time slot of the second PDSCH. The wireless device 1905 may index/include the DCI 1 (e.g., that schedules the first PDSCH) before (e.g., prior to, or earlier than) the DCI 2 (e.g., that schedules the second PDSCH) in the order, for example, based on determining that the first time slot is earlier than the second time slot.

The wireless device 1905 may determine that the first time slot of the first PDSCH is later (or higher) in time than the second time slot of the second PDSCH. The wireless device 1905 may include/index the DCI 1 (e.g., that schedules the first PDSCH) before (or prior to, or earlier than) the DCI 2 (e.g., that schedules the second PDSCH) in the order, for example based on the determining.

The DCI 1 may be included/indexed before (or prior to, or earlier than) the DCI 2 in the order, for example, if a first position of the DCI 1 in the order is earlier than (or before) a second position of the DCI 2 in the order. For example, in FIG. 21, the first position (1st position) of the first DCI message (e.g., DCI 1) in the order is earlier than the second position (2nd position) of the second DCI message (e.g., DCI 2) in the order (e.g., as shown in the indexed DCI messages 1950 in FIG. 21).

The wireless device 1905 may determine an ordering of time slots associated with PDSCH receptions/transmissions. The wireless device 1905 may determine that the first time slot of the first PDSCH (e.g., the PDSCH 2110 in FIG. 21) is earlier (or later) in time than the second time slot of the second PDSCH (e.g., the PDSCH 2120 in FIG. 21), the third time slot of the third PDSCH (e.g., the PDSCH 2130 in FIG. 21) and the fourth time slot of the fourth PDSCH (e.g., the PDSCH 2140 in FIG. 21). The wireless device 1905 may determine an order (e.g., index/include in the order) that comprises the DCI 1 (e.g., that schedules the first PDSCH) before the DCI 2 (e.g., that schedules the second PDSCH), the DCI 3 (e.g., that schedules the third PDSCH) and the DCI 4 (e.g., that schedules the fourth PDSCH), for example, based on the determining the ordering of time slots. The wireless device 1905 may determine an order for a plurality (e.g., any quantity) of DCI messages, for example, based on a time slot of a PDSCH associated with each DCI message of the plurality of DCI messages.

The wireless device 1905 may determine that the second time slot is earlier (or later) in time than the third time slot and the fourth time slot. The wireless device 1905 may determine an order (e.g., index/include in the order) in which the DCI 2 (e.g., that schedules the second PDSCH) is before the DCI 3 (e.g., that schedules the third PDSCH) and the DCI 4 (e.g., that schedules the fourth PDSCH), for example, based on the determining the ordering of time slots.

The wireless device 1905 may determine that the third time slot is earlier (or later) in time than the fourth time slot. The wireless device 1905 may determine an order (e.g., index/include) in which the DCI 3 (e.g., that schedules the third PDSCH) is before the DCI 4 (e.g., that schedules the fourth PDSCH) in the order, for example, based on the determining that the third time slot is earlier than the fourth time slot.

The wireless device 1905 may determine an order of the plurality of DCI messages, for example, based on an ascending (or descending) order of the respective time slots (of the respective PDSCHs) scheduled by the plurality of DCI messages. For example, the wireless device 1905 may index the plurality of DCI messages in an order comprising the DCI 1 in the first position, the DCI 2 in the second position, the DCI 3 in the third position, and the DCI 4 in the fourth position (e.g., as shown in the indexed DCI messages 1950 shown in FIG. 21). The wireless device 1905 may determine an order for any quantity/number of DCI messages.

The plurality of DCI messages may comprise a field with respective values indicating respective priority parameters. Each DCI message of the plurality of DCI messages may comprise a field with a respective value indicating a respective priority parameter. The DCI 1 may comprise the field with a first value indicating a first priority parameter. The DCI 2 may comprise the field with a second value indicating a second priority parameter. The DCI 3 may comprise the field with a third value indicating a third priority parameter. The DCI 4 may comprise the field with a fourth value indicating a fourth priority parameter. There may be any quantity/number of DCI messages comprising any quantity/number of priority parameters (e.g., values indicating priority parameters).

Each respective PDCCH monitoring occasion index of each respective PDCCH monitoring occasion in which each DCI message of the plurality of DCI messages is received may be the same/equal. Each respective PDCCH monitoring occasion index of each respective PDCCH monitoring occasion in which each DCI message of the plurality of DCI messages is received may be different. Each respective PDCCH monitoring occasion in which the wireless device 1905 receives/detects each DCI message of the plurality of DCI messages may be the same (e.g., as shown in FIG. 21). Each respective PDCCH monitoring occasion in which the wireless device 1905 receives/detects each DCI message of the plurality of DCI messages may be different (e.g., FIG. 22).

In FIG. 21 and FIG. 22, the respective cells in which each DCI message of the plurality of DCI messages is received may be the same (e.g., the cell 2010 in FIG. 21 and FIG. 22). Each respective cell in which the wireless device 1905 receives/detects each DCI message of the plurality of DCI messages may be the same.

In FIG. 19, each respective cell in which each DCI message of the plurality of DCI messages is received may be different (e.g., the first cell 1910, the second cell 1920, the third cell 1930, the fourth cell 1940). The respective cell in which the wireless device 1905 receives/detects each DCI message of the plurality of DCI messages may be different.

The indexing the plurality of DCI messages in the order may be, for example, based on a respective priority parameter that each DCI message of the plurality of DCI messages indicates. For example, the determining an order of the plurality of DCI messages (e.g., indexing the plurality of DCI messages in the order) may be based on an ascending (or descending) order of one or more respective priority parameters that each DCI message of the plurality of DCI messages indicate.

The wireless device 1905 may determine priorities for DCI in the plurality of DCI messages. The wireless device 1905 may determine that the first priority parameter indicated by the DCI 1 is higher (or lower) than the second priority parameter indicated by the DCI 2, the third priority parameter indicated by the DCI 3, and the fourth priority parameter indicated by the DCI 4. The wireless device 1905 may index/include the DCI 1 before the DCI 2, the DCI 3, and the DCI 4 in the order, for example, based on the determining.

The wireless device 1905 may determine that the second priority parameter indicated by the DCI 2 is higher (or lower) than the third priority parameter indicated by the DCI 3, and the fourth priority parameter indicated by the DCI 4. The wireless device 1905 may index/include the DCI 2 before the DCI 3 and the DCI 4 in the order, for example, based on the determining.

The wireless device 1905 may determine that the third priority parameter indicated by the DCI 3 is higher (or lower) than the fourth priority parameter indicated by the DCI 4. The wireless device 1905 may index/include the DCI 3 before and the DCI 4 in the order, for example, based on the determining.

The wireless device 1905 may determine an order of the plurality of DCI messages, for example, based on an ascending (or descending) order of the respective priority parameters indicated by the plurality of DCI messages. For example, the wireless device 1905 may index the plurality of DCI messages in an order comprising the DCI 1 in the first position, the DCI 2 in the second position, the DCI 3 in the third position, and the DCI 4 in the fourth position (e.g., Indexed DCI messages shown in FIG. 21). The wireless device 1905 may determine an order for any number of DCI messages based on any number of priority parameters associated with the plurality of DCI messages.

The plurality of DCI messages may indicate respective service types. For example, each DCI message of the plurality of DCI messages may indicate a respective service type. The respective service types may be indicated by a field (in each DCI message of the plurality of DCI messages) that comprises a value indicating the respective service type of a corresponding DCI message. Each DCI message of the plurality of DCI messages (e.g., that indicate the respective service type) may comprise a field with a respective value indicating the respective service type. For example, the DCI 1 may comprise the field with a first value indicating a first service type. For example, the DCI 2 may comprise (or have) the field with a second value indicating a second service type. For example, the DCI 3 may comprise the field with a third value indicating a third service type. For example, the DCI 3 may comprise the field with a fourth value indicating a fourth service type. Any quantity/number of DCI messages may indicate any quantity/number of service types (e.g., by a field in each DCI message that comprises one or more values).

The plurality of DCI messages indicating the respective service types may comprise that the plurality of DCI messages being scrambled with respective RNTIs associated with the respective service types. Each DCI message of the plurality of DCI messages indicating the respective service type may comprise that each DCI message of the plurality of DCI messages is scrambled with a respective RNTI (e.g., CS-RNTI, C-RNTI, RA-RNTI, MCS-C-RNTI, etc.) associated with the respective service type. The DCI 1 may be scrambled with a first RNTI indicating a first service type. The DCI 2 may be scrambled with a second RNTI indicating a second service type. The DCI 3 may be scrambled with a third RNTI indicating a third service type. The DCI 4 may be scrambled with a fourth RNTI indicating a fourth service type.

The respective service type may be one of a plurality of service types. The plurality of service types may comprise, for example, uRLLC, eMBB, and/or mMTC. Determining the order of the plurality of DCI messages (e.g., the indexing the plurality of DCI messages in the order) may be, for example, based on a respective priority of a respective service type that each DCI message of the plurality of DCI messages indicates. Determining the order of the plurality of DCI messages (e.g., the indexing the plurality of DCI messages in the order) may be based on an ascending (or descending) order of respective priorities of the respective service types that the plurality of DCI messages indicate.

The first RNTI (e.g., CS-RNTI, MCS-C-RNTI, RA-RNTI) may have a higher priority than the second RNTI. The first RNTI may be used for an uRLLC service. The first RNTI (e.g., RA-RNTI, TC-RNTI, etc.) may be used for a random-access procedure. The first service type (e.g., uRLLC) may have a higher priority than the second service type (e.g., eMBB, mMTC).

The wireless device 1905 may determine priorities for various service types and/or DCI messages. The wireless device 1905 may determine that a first priority of the first service type indicated by the DCI 1 is higher (or lower) than a second priority of the second service type indicated by the DCI 2, a third priority of the third service type indicated by the DCI 3 and a fourth priority of the fourth service type indicated by the DCI 4. The wireless device 1905 may index/include the DCI 1 before the DCI 2, the DCI 3, and the DCI 4 in the order, for example, based on determining priorities for various service types and/or DCI messages. The wireless device 1905 may determine that the second priority of the second service type indicated by the DCI 2 is higher (or lower) than the third priority of the third service type indicated by the DCI 3, and the fourth priority of the fourth service type indicated by the DCI 4. The wireless device 1905 may index/include the DCI 2 before the DCI 3 and the DCI 4 in the order, for example, based on determining priorities for various service types and/or DCI messages. The wireless device 1905 may determine that the third priority of the third service type indicated by the DCI 3 is higher (or lower) than the fourth priority of the fourth service type indicated by the DCI 4. The wireless device 1905 may index/include the DCI 3 before the DCI 4 in the order, for example, based on determining priorities for various service types and/or DCI messages.

The wireless device 1905 may determine (e.g., index) an order of the plurality of DCI messages, for example, based on an ascending (or descending) order of the respective priorities of the respective service types indicated by each DCI message of the plurality of DCI messages. The wireless device 1905 may index the plurality of DCI messages in an order comprising the DCI 1 in the first position, the DCI 2 in the second position, the DCI 3 in the third position, and the DCI 4 in the fourth position (e.g., as shown in the indexed DCI messages 1950 in FIG. 21).

FIG. 22 shows an example of a PUCCH resource determination. Determining an order of the plurality of DCI messages (e.g., the indexing the plurality of DCI messages in the order) may be, for example, based on the respective search space set (e.g., associated with the respective PDCCH monitoring occasion) in which each DCI messages of the plurality of DCI messages is received. Determining an order of the plurality of DCI messages (e.g., the indexing the plurality of DCI messages in the order) may be based on a respective search space set index of the respective search space set (e.g., associated with the respective PDCCH monitoring occasion) in which each DCI message of the plurality of DCI messages is received. Determining an order of the plurality of DCI messages (e.g., the indexing the plurality of DCI messages in the order) may be based on an ascending (or descending) order of respective search space set indices of the respective search space sets in which the plurality of DCI messages is received. Compared with using coresets, using search space sets may allow a wireless device to determine a DCI message from a greater number of DCI messages. For example, using search space sets may allow the wireless device to determine a DCI message from a first plurality of DCI messages (e.g., 10 or any other quantity of DCI messages), while using coresets may allow the wireless device to determine a DCI message from a second plurality of DCI messages (e.g., 5 or any other quantity of DCI messages). A quantity of the second plurality of DCI messages may be less than a quantity of the first plurality of DCI messages.

The wireless device 1905 may determine an ordering based on search space indexes. The wireless device 1905 may determine that the first search space set index of the first search space set associated with the first PDCCH monitoring occasion in which the DCI 1 is received is lower (or higher) than each of 1) the second search space set index of the second search space set associated with the second PDCCH monitoring occasion in which the DCI 2 is received; 2) the third search space set index of the third search space set associated with the third PDCCH monitoring occasion that the DCI 3 is received; and 3) the fourth search space set index of the fourth search space set associated with the fourth PDCCH monitoring occasion in which the DCI 4 is received. The wireless device 1905 may determine an order (e.g., index/include, in the order) comprising the DCI 1 at a position that is before the positions of the DCI 2, the DCI 3, and the DCI 4, for example, based on the determining. The wireless device 1905 may determine the order of any quantity/number of DCI messages based on any number of search space set indices corresponding to any of the DCI messages.

The wireless device 1905 may determine that the second search space set index of the second search space set associated with the second PDCCH monitoring occasion is lower (or higher) than each of 1) the third search space set index of the third search space set associated with the third PDCCH monitoring occasion; and 2) the fourth search space set index of the fourth search space set associated with the fourth PDCCH monitoring occasion. The wireless device 1905 may determine an order (e.g., index/include, in the order), comprising the DCI 2 (e.g., that is received in the second PDCCH monitoring occasion) in a position that is before the DCI 3 (e.g., that is received in the third PDCCH monitoring occasion) and the DCI 4 (e.g., that is received in the fourth PDCCH monitoring occasion), for example, based on the determining.

The wireless device 1905 may determine that the third search space set index of the third search space set associated with the third PDCCH monitoring occasion is lower (or higher) than the fourth search space set index of the fourth search space set associated with the fourth PDCCH monitoring occasion. The wireless device 1905 may determine an order (e.g., index/include in the order) comprising the DCI 3 (e.g., that is received in the third PDCCH monitoring occasion) in a position that is before the DCI 4 (e.g., that is received in the fourth PDCCH monitoring occasion).

The wireless device 1905 may determine an order of the plurality of DCI messages, for example, based on an ascending (or descending) order of respective search space set indices of the respective search space sets in which the plurality of DCI messages is received. For example, the wireless device 1905 may determine an order (e.g., index, in the order) comprising the DCI 1, the DCI 2, the DCI 3, and the DCI 4 (e.g., as shown in the indexed DCIs 1950={DCI 1, DCI 2, DCI 3, DCI 4} in FIG. 22). The order of any quantity/number of DCI messages may be determined based on an ascending (or descending) order of search space indices associated with the DCI messages Determining an order of the plurality of DCI messages (e.g., the indexing the plurality of DCI messages in the order) may be, for example, based on the respective coreset associated with the respective PDCCH monitoring occasion in which each DCI message of the plurality of DCI messages is received. Determining an order of the plurality of DCI messages (e.g., the indexing the plurality of DCI messages in the order) may be, for example, based on the respective coreset index of the respective coreset (associated with the respective PDCCH monitoring occasion) corresponding to each DCI message of the plurality of DCI messages. Determining the order of the plurality of DCI messages (e.g., the indexing the plurality of DCI messages in the order) may be, for example, based on an ascending (or descending) order of respective coreset indices of the respective coresets corresponding to the plurality of DCI messages.

The wireless device 1905 may determine an ordering based on coresets. The wireless device 1905 may determine that the first coreset index of the first coreset associated with the first PDCCH monitoring occasion in which the DCI 1 is received is lower (or higher) than each of 1) the second coreset index of the second coreset associated with the second PDCCH monitoring occasion in which the DCI 2 is received, 2) the third coreset index of the third coreset associated with the third PDCCH monitoring occasion in which the DCI 3 is received; and 4) the fourth coreset index of the fourth coreset associated with the fourth PDCCH monitoring occasion that the DCI 4 is received. The wireless device 1905 may determine an order (e.g., index/include, in the order) comprising the DCI 1 in a position that is before the DCI 2, the DCI 3, and the DCI 4, for example, based on determining an ordering using coresets.

The wireless device 1905 may determine that the second coreset index of the second coreset associated with the second PDCCH monitoring occasion is lower (or higher) than the third coreset index of the third coreset associated with the third PDCCH monitoring occasion and the fourth coreset index of the fourth coreset associated with the fourth PDCCH monitoring occasion. The wireless device 1905 may determine an order (e.g., index/include, in the order) comprising the DCI 2 (e.g., that is received in the second PDCCH monitoring occasion) in a position before the DCI 3 (e.g., that is received in the third PDCCH monitoring occasion), and the DCI 4 (e.g., that is received in the fourth PDCCH monitoring occasion), for example, based on the determining.

The wireless device 1905 may determine that the third coreset index of the third coreset associated with the third PDCCH monitoring occasion is lower (or higher) than the fourth coreset index of the fourth coreset associated with the fourth PDCCH monitoring occasion. The wireless device 1905 may determine an order (e.g., index/include in the order) the DCI 3 (e.g., that is received in the third PDCCH monitoring occasion) in a position that is before the DCI 4 (e.g., that is received in the fourth PDCCH monitoring occasion), for example, based on the determining.

The wireless device 1905 may determine an order for the plurality of DCIs, for example, based on an ascending (or descending) order of respective coreset indices of the respective coresets corresponding to the plurality of DCI messages. For example, the wireless device 1905 may determine an order (e.g., index in the order) of the plurality of DCI messages comprising the DCI 1 in the first position, the DCI 2 in the second position, the DCI 3 in the third position, and the DCI 4 in the fourth position (e.g., as shown in the indexed DCIs 1950={DCI 1, DCI 2, DCI 3, DCI 4} in FIG. 22).

Figure 23:
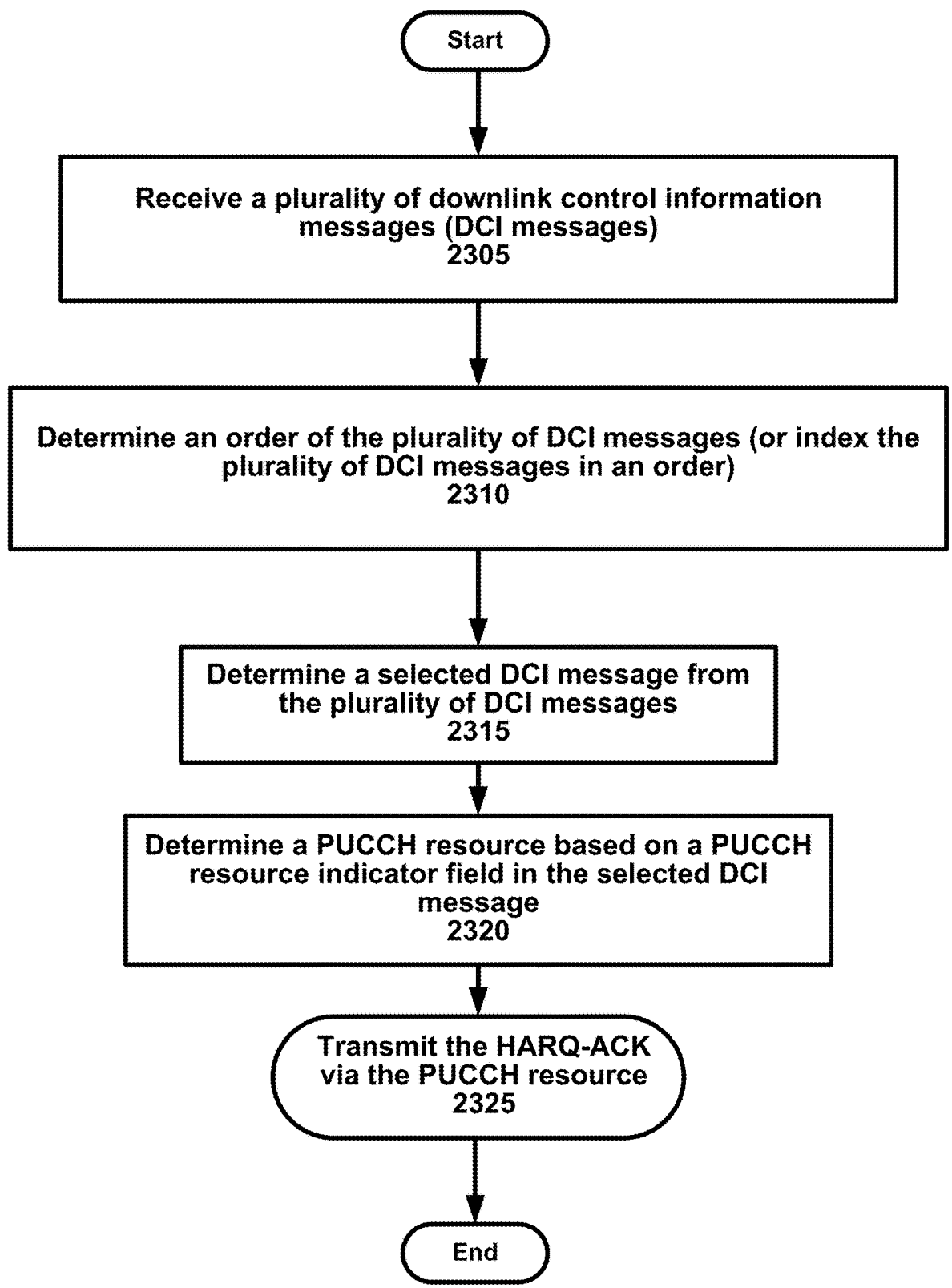
FIG. 23 shows an example method for reception/transmission based on PUCCH resource determination.

FIG. 23 shows an example flow diagram of a PUCCH resource determination. At step 2305, a wireless device 1905 may receive/detect a plurality of DCI messages. The wireless device 1905 may receive/detect the plurality of DCI messages in a physical downlink control channel (PDCCH) monitoring occasion of a cell. The wireless device 1905 may receive/detect the plurality of DCI messages in PDCCH monitoring occasions, of a cell, where each PDCCH monitoring occasion has the same PDCCH monitoring occasion index (e.g., as discussed in connection with FIG. 22). The wireless device 1905 may determine that each DCI message of the plurality of DCI messages has a value in a field (e.g., PDSCH-to-HARQ feedback timing indicator field) indicating the same slot for a physical uplink control channel (PUCCH) transmission.

At step 2310, an order of the plurality of DCI messages may be determined (e.g., indexed in an order). An order of the plurality of DCI messages may be determined based on search space sets (e.g., in which the plurality of DCI messages is received), coresets where the plurality of DCI messages is received, and/or time slots for reception of PDSCHs scheduled by the plurality of DCI messages. The wireless device 1905 may determine an order of the plurality of DCI messages (e.g., index the plurality of DCI messages in an order), for example, based on the respective value of the field of each DCI message of the plurality of DCI messages indicating the same slot. Additionally or alternatively, the wireless device 1905 may determine an order of the plurality of DCI messages (e.g., index the plurality of DCI messages in an order), for example, based on an ascending (or descending) order of search space set indices of search space sets in which the wireless device 1905 receives/detects the plurality of DCI messages (e.g., as discussed in connection with FIG. 22).

The wireless device 1905 may determine an order of the plurality of DCI messages (e.g., index the plurality of DCI messages in an order), for example, based on the respective value of the field of each DCI message of the plurality of DCI messages indicating the same slot. Additionally or alternatively, the wireless device 1905 may determine an order of the plurality of DCI messages (e.g., index the plurality of DCI messages in an order), for example, based on an ascending (or descending) order of coreset indices of coresets where the wireless device 1905 receives/detects the plurality of DCI messages (e.g., as discussed in connection with FIG. 22).

The wireless device 1905 may determine an order of the plurality of DCI messages (e.g., index the plurality of DCI messages in an order), for example, based on the respective value of the field of each DCI message of the plurality of DCI messages indicating the same slot. Additionally or alternatively, the wireless device 1905 may determine an order of the plurality of DCI messages (e.g., index the plurality of DCI messages in an order) based on an ascending (or descending) order of time slots (for reception) of PDSCHs that the plurality of DCI messages schedule (e.g., as discussed in connection with FIG. 22)

At step 2315, the wireless device 1905 may determine a selected DCI message, from the plurality of DCI messages, in the order. For example, the selected DCI message may be a last DCI message in the order. The selected DCI message may be the last DCI message in the order or any other DCI message in the order. At step 2320, the wireless device 1905 may determine a PUCCH resource based on a PUCCH resource indicator field in the selected DCI message. At step 2325, the wireless device 1905 may send (e.g., transmit) a HARQ-ACK acknowledgement/information via the PUCCH resource, for example, based on the determining. The wireless device 1905 may send (e.g., transmit) the HARQ-ACK acknowledgement/information in the same slot (e.g., the same slot that is indicated by the field of each DCI message of the plurality of DCI messages) for the PUCCH transmission.

Figure 24:
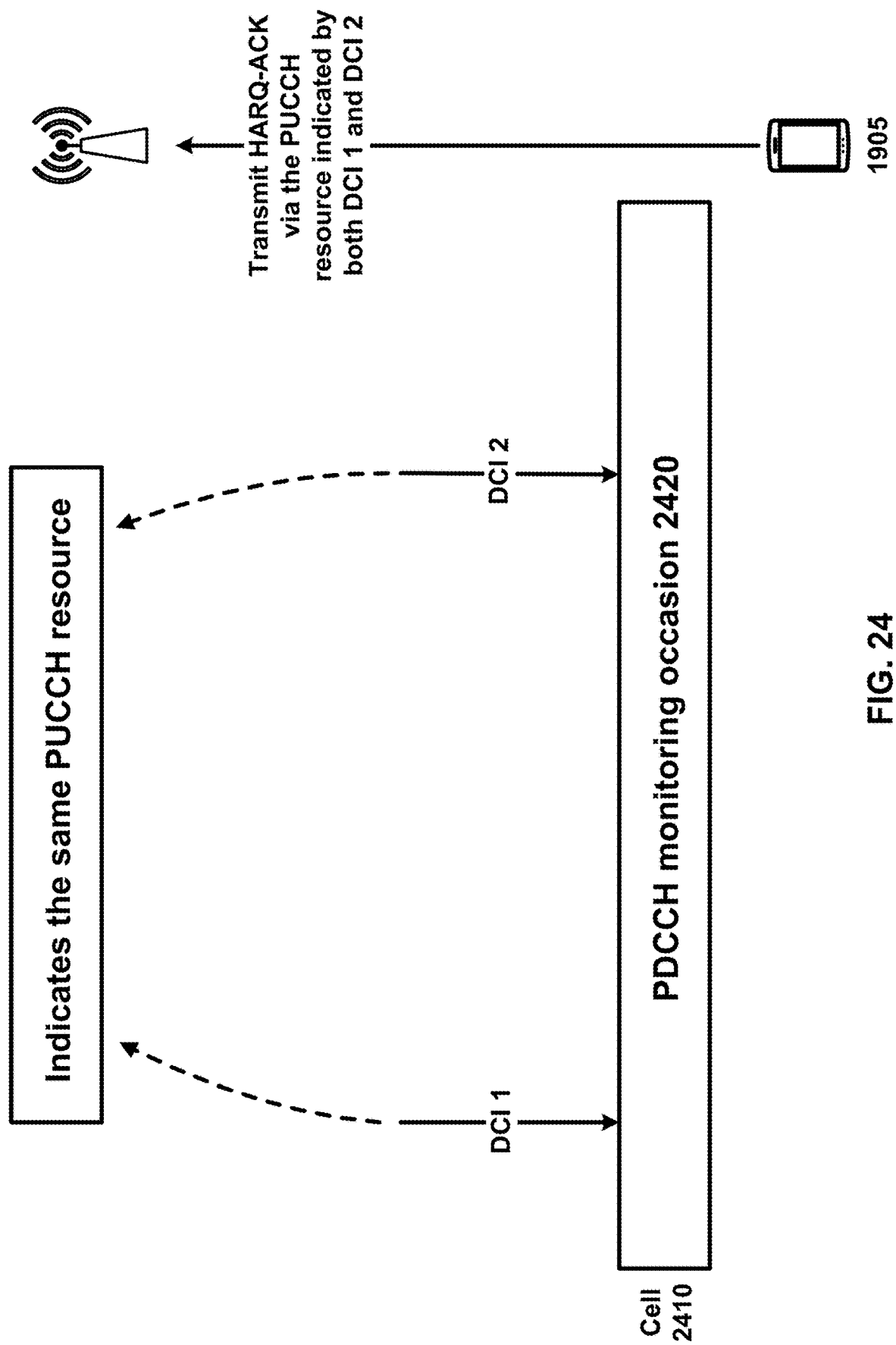
FIG. 24 shows an example of a PUCCH resource determination associated with a monitoring occasion.
Figure 25:
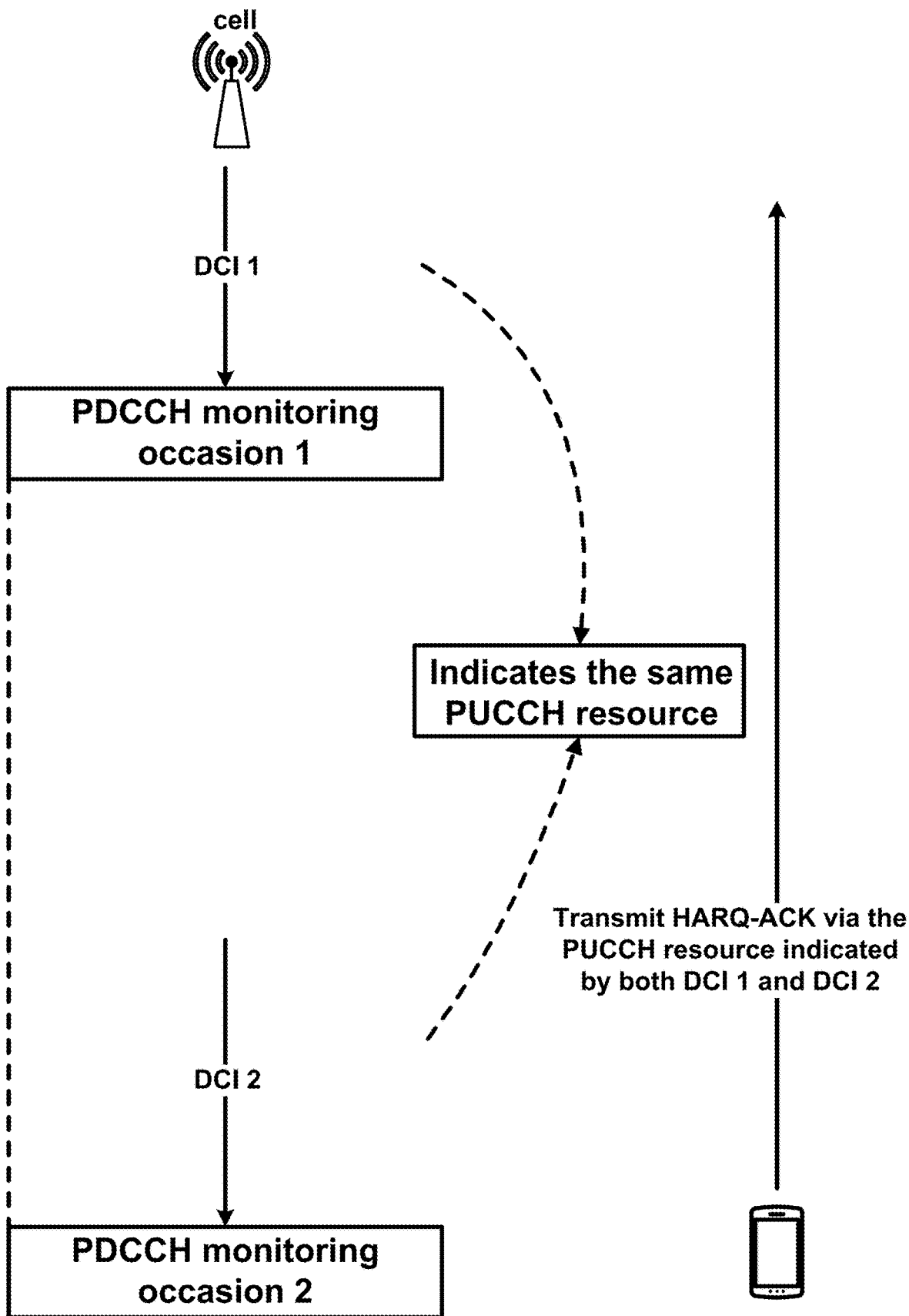
FIG. 25 shows an example of a PUCCH resource determination corresponding to DCIs received in different monitoring occasions.
Figure 26:
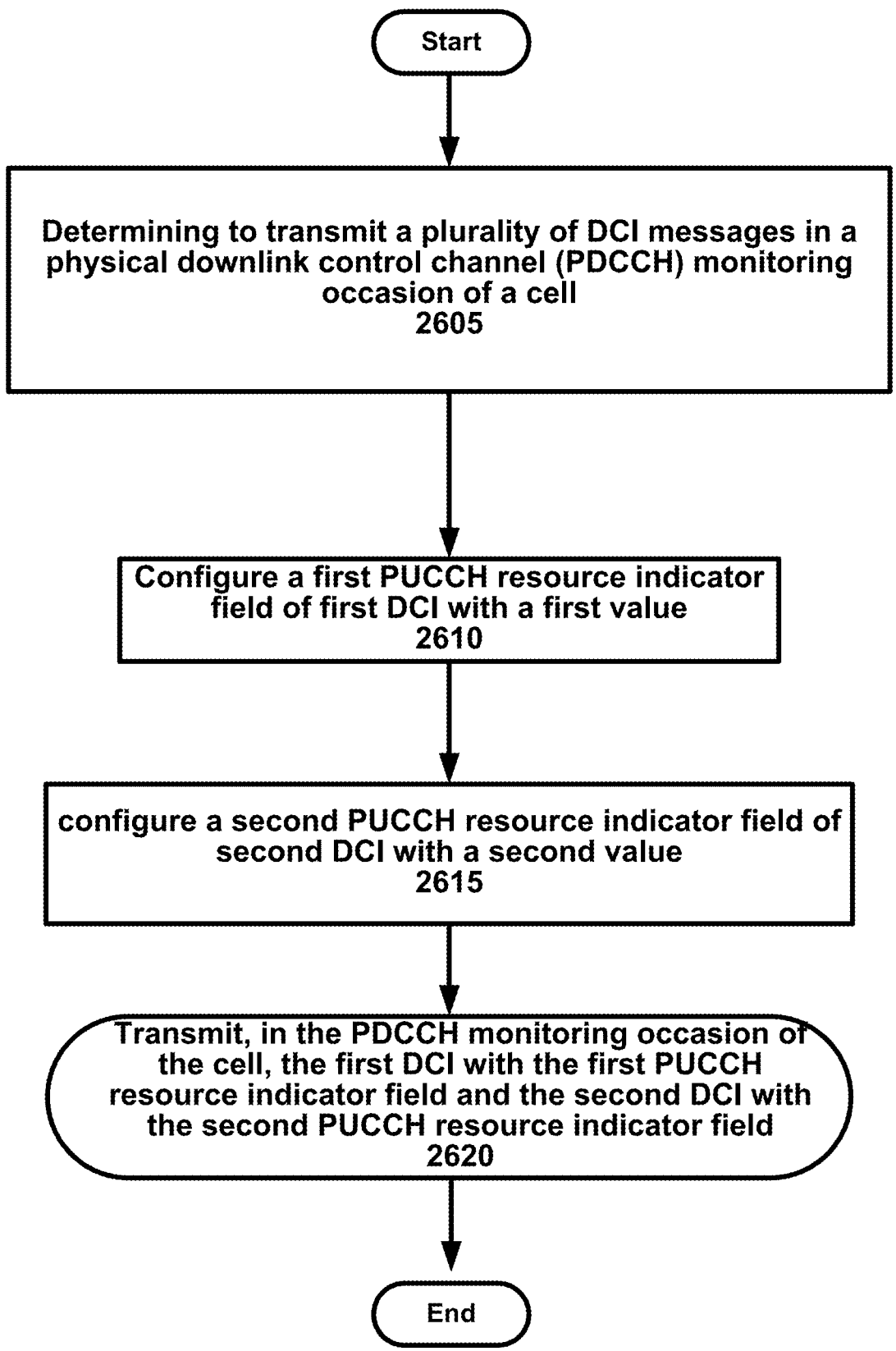
FIG. 26 shows an example method for transmission/reception based on PUCCH resource determination.

FIG. 24 and FIG. 25 show examples of a PUCCH resource determination. FIG. 26 shows an example flow diagram of a PUCCH resource determination discussed in connection with FIG. 24 and FIG. 25. At step 2605, it may be determined to send (e.g., transmit) a plurality of DCI messages (e.g., first DCI and second DCI) in a PDCCH monitoring occasion of a cell. A base station may determine to send (e.g., transmit), to a wireless device 1905, a plurality of DCI messages (e.g., DCI 1 and/or DCI 2 in FIG. 24 and FIG. 25) via a cell 2410. The plurality of DCI messages may comprise first DCI (e.g., the DCI 1) and second DCI (e.g., the DCI 2). The sending (e.g., transmitting) the plurality of DCI messages via the cell may comprise transmitting the plurality of DCI messages via a PDCCH monitoring occasion of the cell (e.g., the PDCCH monitoring occasion 2420 in FIG. 24). The base station may send (e.g., transmit) the DCI 1 and the DCI 2 in the PDCCH monitoring occasion of the cell 2410. The wireless device 1905 may receive the DCI 1 and the DCI 2 in the PDCCH monitoring occasion 2420 of the cell 2410.

Figure 29:
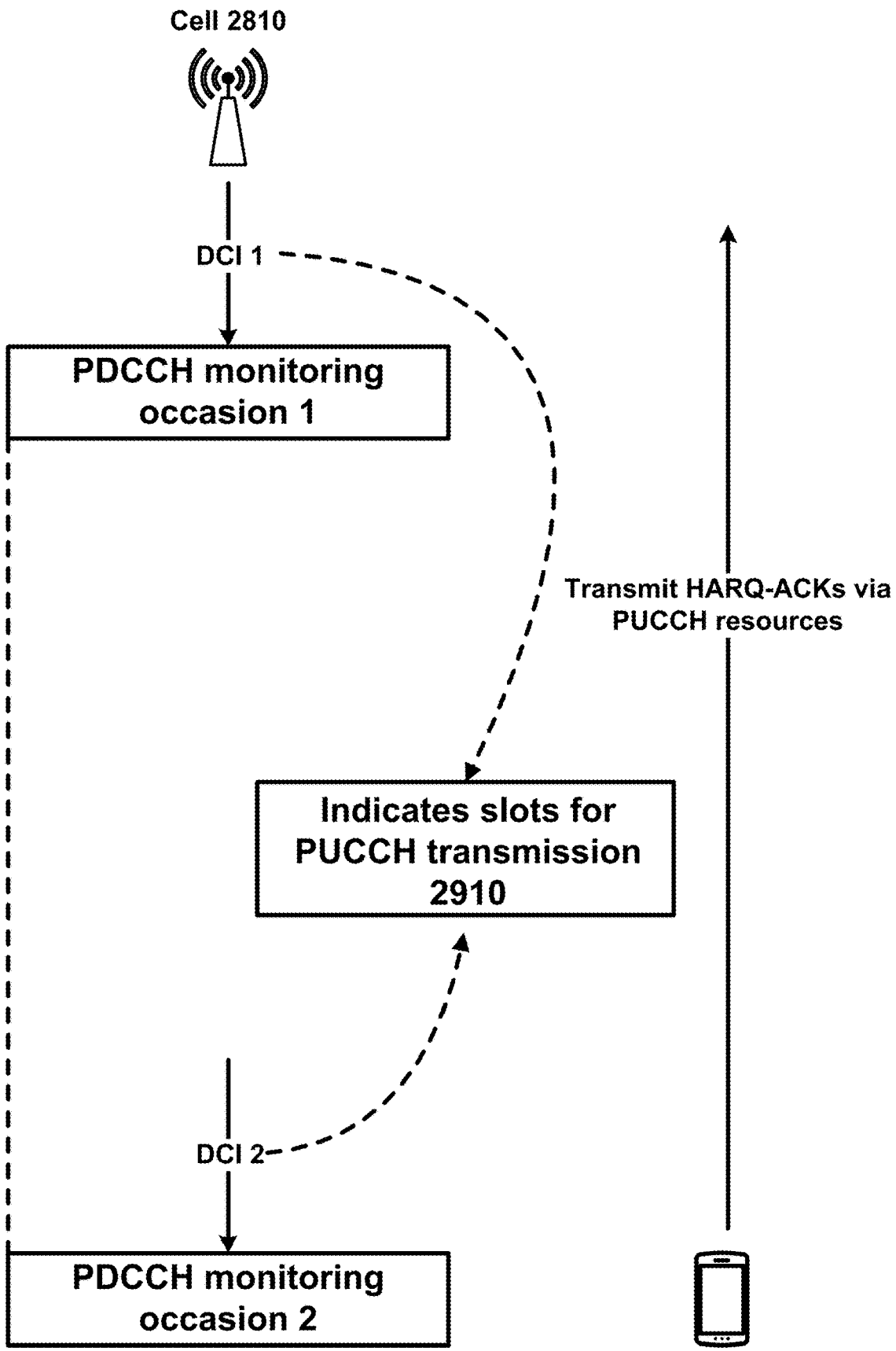
FIG. 29 shows an example of a PUCCH resource determination.

The sending (e.g., transmitting) the plurality of DCI messages via the cell 2410 may comprise transmitting each DCI message of the plurality of DCI messages in a respective PDCCH monitoring occasion (e.g., PDCCH monitoring occasion n, where n=1 and/or 2 as shown in FIG. 25 and FIG. 29) of the cell 2410. The respective PDCCH monitoring occasion may be associated with a respective search space set of the cell 2410 and/or the cell 2010 (e.g., as discussed in connection with FIG. 22). The base station may send (e.g., transmit) the plurality of DCI messages in respective PDCCH monitoring occasions (e.g., PDCCH monitoring occasion n, where n=1 and/or 2 as shown in FIG. 25 and FIG. 29) of the cell 2410. The base station may send (e.g., transmit) the DCI 1 in a first PDCCH monitoring occasion (e.g., PDCCH monitoring occasion 1) of the cell 2410. The base station may send (e.g., transmit) the second DCI in a second PDCCH monitoring occasion (e.g., PDCCH monitoring occasion 2) of the cell 2410. The wireless device 1905 may receive the DCI 1 in the first PDCCH monitoring occasion (e.g., PDCCH monitoring occasion 1) of the cell 2410. The wireless device 1905 may receive the DCI 2 in the second PDCCH monitoring occasion (e.g., PDCCH monitoring occasion 2) of the cell 2410. The first PDCCH monitoring occasion and the second PDCCH monitoring occasion may have a same PDCCH monitoring occasion index. A first PDCCH monitoring occasion index of the first PDCCH monitoring occasion and a second PDCCH monitoring occasion index of the second PDCCH monitoring occasion may be the same/equal. Any number of PDCCH monitoring occasion indices of PDCCH monitoring occasions may be the same.

Each DCI message of the plurality of DCI messages may comprise a PDSCH-to-HARQ feedback timing indicator field (e.g., DCI 1 may comprise a first HARQ feedback timing, DCI 2 may comprise a second HARQ feedback timing) with a respective value indicating a respective slot (for example, same slot) for a PUCCH transmission. Each DCI message of the plurality of DCI messages may comprise a PUCCH resource indicator field (e.g., DCI 1 may comprise a first PUCCH resource, DCI 2 may comprise a second PUCCH resource) indicating a respective PUCCH resource. The DCI 1 may comprise a first PDSCH-to-HARQ feedback timing indicator field (e.g., DCI 1 may comprise a first HARQ feedback timing) with a first value indicating a first slot for a first PUCCH transmission. The DCI 1 may comprise a first PUCCH resource indicator field indicating a first PUCCH resource. The wireless device 1905 may send (e.g., transmit), in the first slot (indicated by the first PDSCH-to-HARQ feedback timing indicator field), first HARQ-ACK information (e.g., ACK, NACK) of (or corresponding to) a first PDSCH scheduled by the DCI 1 in the first PUCCH transmission via the first PUCCH resource (e.g., indicated by the first PUCCH resource indicator field).

The DCI 2 may comprise a second PDSCH-to-HARQ feedback timing indicator field (e.g., a second HARQ feedback timing) with a second value indicating a second slot for a second PUCCH transmission. The DCI 2 may comprise a second PUCCH resource indicator field indicating a second PUCCH resource (e.g., a second PUCCH resource). The wireless device 1905 may send (e.g., transmit), in the second slot (e.g., indicated by the second PDSCH-to-HARQ feedback timing indicator field), second HARQ-ACK information (e.g., ACK, NACK) of (or corresponding to) a second PDSCH scheduled by the DCI 2 in the second PUCCH transmission. The second HARQ-ACK information may be sent via the second PUCCH resource (e.g., indicated by the second PUCCH resource indicator field).

The respective value of the PDSCH-to-HARQ feedback timing indicator field of each DCI message of the plurality of DCI messages may indicate a same slot for a respective PUCCH transmission. Each PDSCH-to-HARQ feedback timing indicator field (e.g., of each DCI message of the plurality of DCI messages) with each respective value may indicate the same slot for the PUCCH transmission. In FIG. 24-FIG. 25, the first slot for the first PUCCH transmission and the second slot for the second PUCCH transmission may be the same. Any quantity/number of PUCCH transmission slots may be the same. The first value of the first PDSCH-to-HARQ feedback timing indicator field and the second value of the second PDSCH-to-HARQ feedback timing indicator field may indicate the same slot. Any quantity/number of PDSCH-to-HARQ feedback timing indicator fields may indicate the same slot.

The base station may configure/set the PUCCH resource indicator field of each DCI message of the plurality of DCI messages with a respective value indicating a same PUCCH resource, for example, based on the determining to send (e.g., transmit) the plurality of DCI messages via the cell (e.g., the cell 2410). The base station may configure/set the PUCCH resource indicator field of each DCI message of the plurality of DCI messages with a value indicating a same PUCCH resource, for example, based on the determining to send (e.g., transmit) the plurality of DCI messages via the cell 2410. The base station may make sure that the respective PUCCH resource indicated by the PUCCH resource indicator field of each DCI message of the plurality of DCI messages is the same, for example, based on the determining to send (e.g., transmit) the plurality of DCI messages via the cell 2410.

At step 2610, the base station may configure/set the first PUCCH resource indicator field of the DCI 1 with a first value. At step 2615, the base station may configure/set the second PUCCH resource indicator field of the DCI 2 with a second value that is the same as the first value, for example, based on the determining to send (e.g., transmit) the DCI 1 and the DCI 2 via the cell 2410. The first PUCCH resource and the second PUCCH resource may be the same, for example, if the first value and the second value are the same.

The base station may configure/set the first PUCCH resource indicator field of the DCI 1 with a first value indicating the first PUCCH resource. The base station may configure/set the second PUCCH resource indicator field of the DCI 2 with a second value indicating the second PUCH resource that is the same as the first PUCCH resource, for example, based on the determining to send (e.g., transmit) the DCI 1 and the DCI 2 via the cell 2410.

At step 2620, the DCI 1 with the first PUCCH resource indicator field and the DCI 2 with the second PUCCH resource indicator field may be sent (e.g., transmitted) in the PDCCH monitoring occasion of the cell. The base station may send (e.g., transmit) the DCI 1 and the DCI 2 via the cell 2410, for example, based on the configuring the second PUCCH resource indicator field of the DCI 2 with the second value. The wireless device 1905 may receive/detect the DCI 1 and the DCI 2 via the cell 2410. The wireless device 1905 may send (e.g., transmit) HARQ-ACK information via the first PUCCH resource (or the second PUCCH resource, which may be the same as the first PUCH resource) indicated by the DCI 1 in the same slot (e.g., indicated by the PDSCH-to-HARQ feedback timing indicator field of each DCI).

The base station may determine that a first PDCCH monitoring occasion index of the first PDCCH monitoring occasion and a second PDCCH monitoring occasion index of the second PDCCH monitoring occasion are different. The base station may configure/set the first PUCCH resource indicator field of the DCI 1 with a first value indicating the first PUCCH resource. The base station may configure/set the second PUCCH resource indicator field of the DCI 2 with a second value indicating the second PUCCH resource that is different from the first PUCCH resource, for example, based on the determining. The base station may configure/set the second PUCCH resource indicator field of the DCI 2 with a second value indicating the second PUCCH resource (e.g., that may be the same as the first PUCCH resource), for example, based on the determining.

The base station may determine that a first PDCCH monitoring occasion is configured on a first cell and that a second PDCCH monitoring occasion is configured on a second cell (e.g., that is different from the first cell). The wireless device 1905 may monitor the first PDCCH monitoring occasion of the first cell for the DCI 1. The wireless device 1905 may monitor the second PDCCH monitoring occasion of the second cell for the DCI 2. The base station may configure/set the first PUCCH resource indicator field of the DCI 1 with a first value indicating the first PUCCH resource. The base station may configure/set the second PUCCH resource indicator field of the DCI 2 with a second value indicating the second PUCH resource, for example, based on the determining (e.g., that a first PDCCH monitoring occasion is configured on a first cell and/or that a second PDCCH monitoring occasion is configured on a second cell). The second PUCCH resource may be different from the first PUCCH resource. The second PUCCH resource may be the same as the first PUCCH resource.

Figure 27:
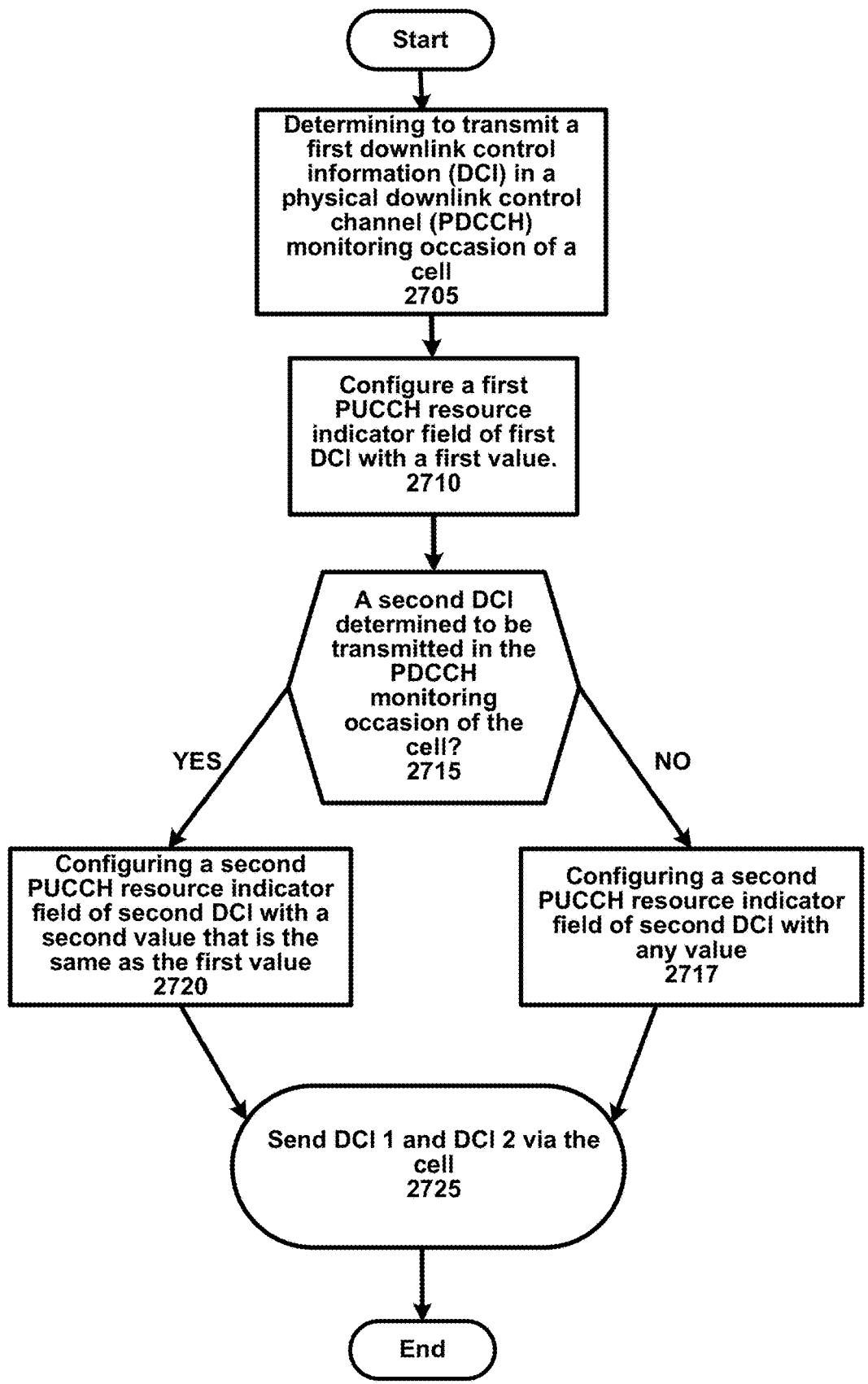
FIG. 27 shows an example method for PUCCH resource determination.

FIG. 27 shows an example flow diagram of a PUCCH resource determination. At step 2705, a base station may determine to send (e.g., transmit), to a wireless device 1905, first DCI (e.g., DCI 1) via a cell. The sending (e.g., transmitting) the DCI 1 via the cell may comprise transmitting the DCI 1 via a first PDCCH monitoring occasion of the cell. The wireless device 1905 may receive the DCI 1 in the first PDCCH monitoring occasion of the cell.

The DCI 1 may comprise a first PUCCH resource indicator field indicating a first PUCCH resource (e.g., the first PUCCH resource). At step 2710, the base station may configure/set a first PUCCH resource indicator field of the DCI 1 with a first value indicating a first PUCCH resource. The DCI 1 may comprise a first PDSCH-to-HARQ feedback timing indicator field (e.g., a first HARQ feedback timing). The field may comprise a first value indicating a first slot for a first PUCCH transmission. The base station may configure/set a first PDSCH-to-HARQ feedback timing indicator field of the DCI 1 with a first value indicating a first slot for a first PUCCH transmission.

At step 2715, the base station may determine whether to send (e.g., transmit), to the wireless device 1905, a second DCI (e.g., the DCI 2) via the cell. The sending (e.g., transmitting) the DCI 2 via the cell may comprise transmitting the DCI 2 via a second PDCCH monitoring occasion of the cell. The second PDCCH monitoring occasion and the first PDCCH monitoring occasion may be the same. The wireless device 1905 may receive the DCI 2 in the second PDCCH monitoring occasion of the cell. The first PDCCH monitoring occasion and the second PDCCH monitoring occasion may have a same PDCCH monitoring occasion index. A first PDCCH monitoring occasion index of the first PDCCH monitoring occasion and a second PDCCH monitoring occasion index of the second PDCCH monitoring occasion may be the same/equal.

The DCI 2 may comprise a second PDSCH-to-HARQ feedback timing indicator field (e.g., a second HARQ feedback timing) with a second value indicating a second slot for a second PUCCH transmission. The base station may configure/set a second PDSCH-to-HARQ feedback timing indicator field of the DCI 2 with a second value indicating a second slot for a second PUCCH transmission. The first slot for the first PUCCH transmission and the second slot for the second PUCCH transmission may be the same. The first value of the first PDSCH-to-HARQ feedback timing indicator field and the second value of the second PDSCH-to-HARQ feedback timing indicator field may indicate a same slot. Any quantity/number of PUCCH transmissions may indicate the same slot. Any quantity/number of values of PDSCH-to-HARQ feedback timing indicator fields may indicate the same slot.

Step 2717 may be performed, for example, if the base station determines to not send (e.g., transmit) the second DCI in the PDCCH monitoring occasion of the cell. At step 2717, a second PUCCH resource indicator field of second DCI may be configured with any value. For example, the base station may set the PUCCH resource indicators in the first DCI and the second DCI to any value (e.g., the same value or different values).

Step 2720 may be performed, for example, if the base station determines to send (e.g., transmit) the second DCI in the PDCCH monitoring occasion of the cell. At step 2720, the base station may configure/set a second PUCCH resource indicator field of the DCI 2 with a second value indicating a second PUCCH resource that is the same as the first PUCCH resource, for example, based on the determining to send (e.g., transmit) the DCI 2 via the cell.

The base station may configure/set a second PUCCH resource indicator field of the DCI 2. The base station may configure/set a second PUCCH resource indicator field of the DCI 2 with a second value that is the same as the first value of the first PUCCH resource indicator field, for example, based on the determining to send (e.g., transmit) the DCI 2 via the cell. The first PUCCH resource and the second PUCCH resource may be the same, for example, if the first value and the second value are the same.

At step 2725, the base station may send (e.g., transmit) the DCI 1 and the DCI 2 via the cell. The base station may send (e.g., transmit) the DCI 1 and the DCI 2 via the cell, for example, based on the configuring the second PUCCH resource indicator field of the DCI 2. For example, the base station may send (e.g., transmit), during/in the PDCCH monitoring occasion of the cell, the DCI 1 with the first PUCCH resource indicator field and the DCI 2 with the second PUCCH resource indicator field.

Figure 28:
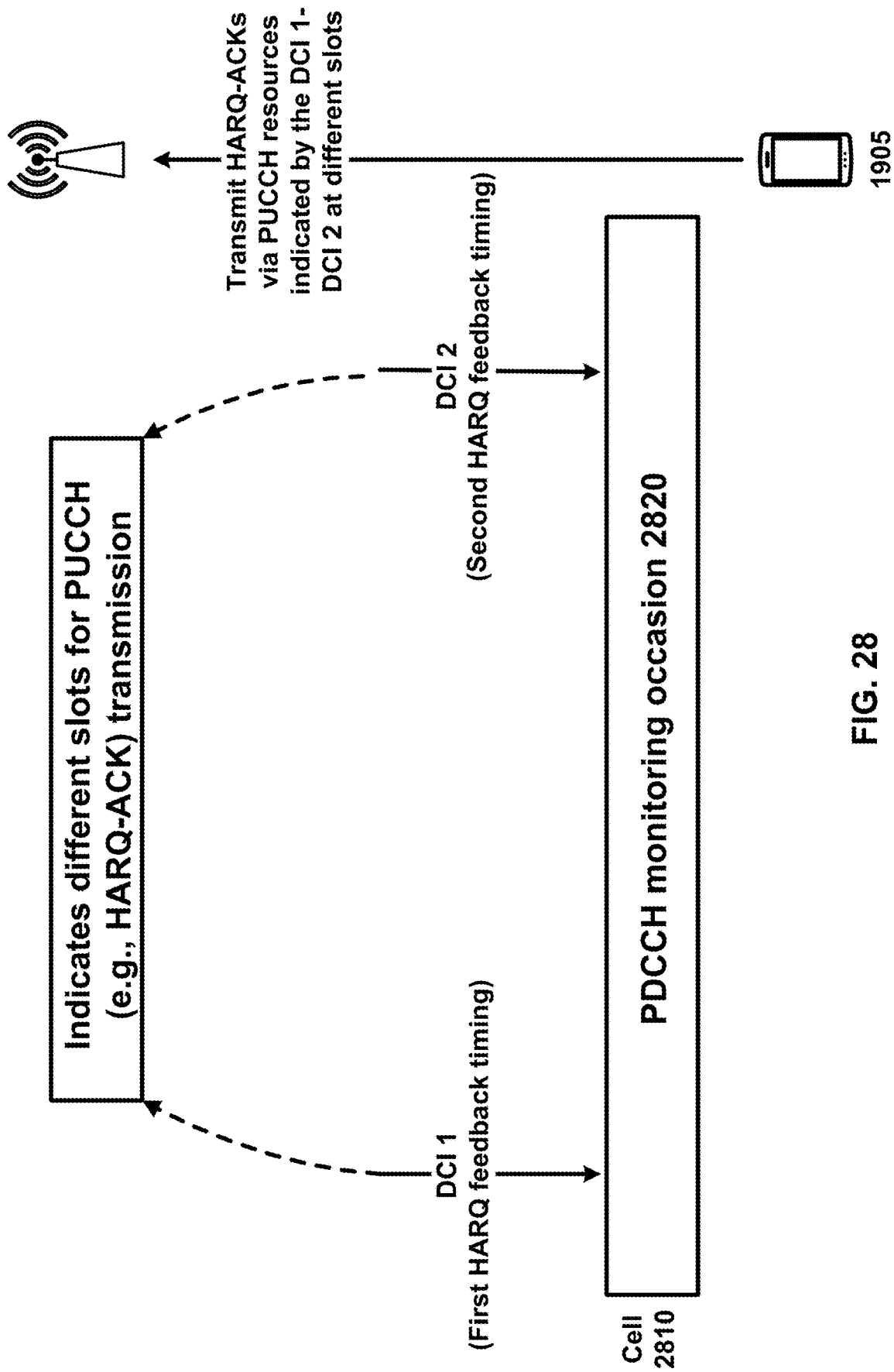
FIG. 28 shows an example method for PUCCH resource determination.
Figure 30:
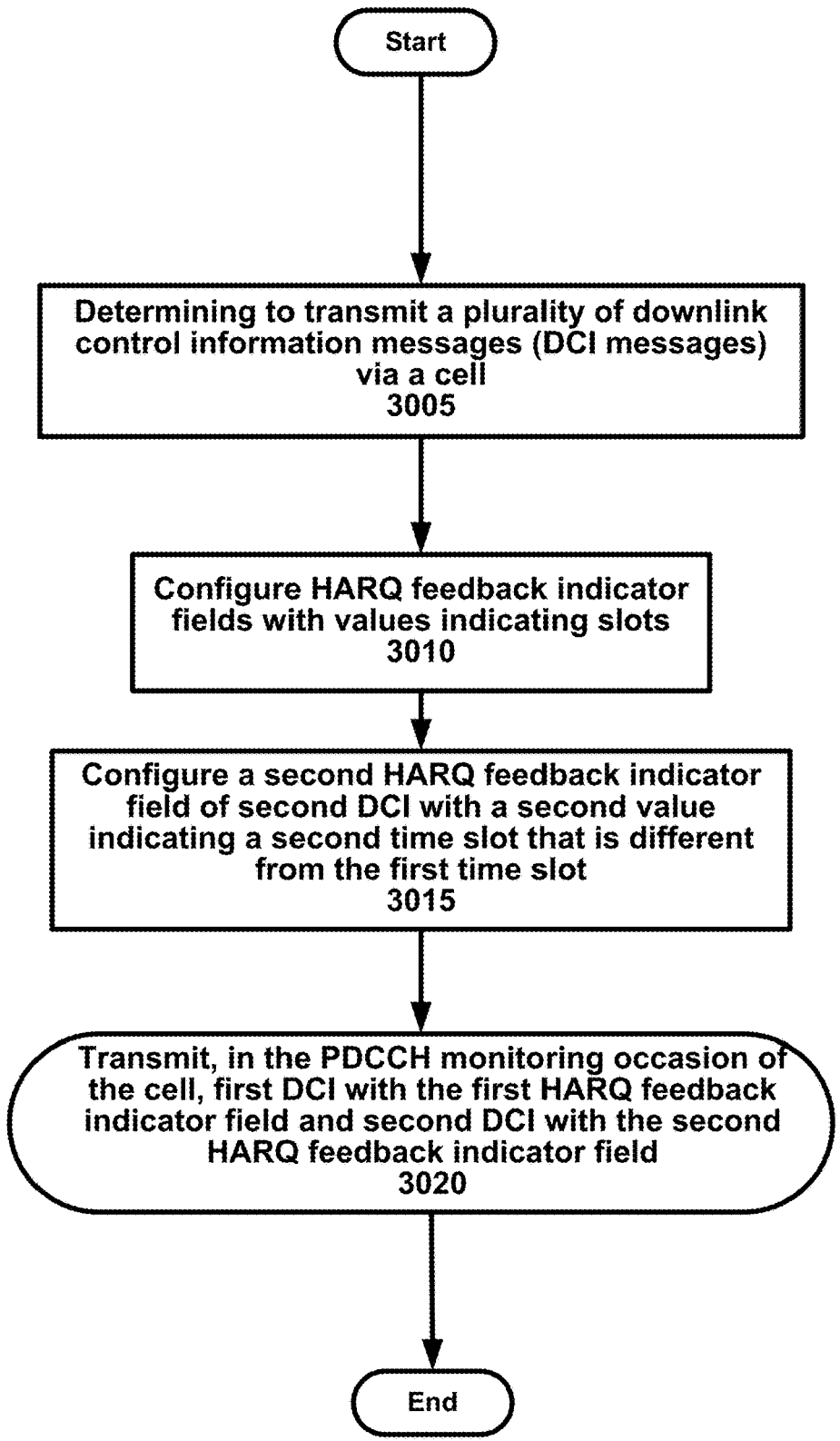
FIG. 30 shows an example method for PUCCH resource determination.

FIG. 28 and FIG. 29 show examples of a PUCCH resource determination. FIG. 30 shows an example method of a PUCCH resource determination (e.g., that is also discussed in connection with FIG. 28 and FIG. 29). At step 3005, a base station may determine to send (e.g., transmit), to a wireless device 1905, a plurality of DCI messages (e.g., DCI 1, DCI 2 in FIG. 28 and FIG. 29) via a cell 2810. The plurality of DCI messages may be received via the same PDCCH monitoring occasion of the cell. The PDCCH monitoring occasions may be the same, for example, if they have the same monitoring occasion index. The plurality of DCI messages may comprise first DCI (e.g., DCI 1) and second DCI (e.g., DCI 2). The plurality of DCI messages may comprise any quantity of DCI messages. The sending (e.g., transmitting) the plurality of DCI messages via the cell may comprise transmitting the plurality of DCI messages via a PDCCH monitoring occasion of the cell 2810 (e.g., the PDCCH monitoring occasion 2820 in FIG. 28). The base station may send (e.g., transmit) the first DCI and the second DCI in the PDCCH monitoring occasion 2820 of the cell 2810. The wireless device 1905 may receive the first DCI and the second DCI in the PDCCH monitoring occasion 2820 of the cell 2810.

The sending (e.g., transmitting) the plurality of DCI messages via the cell 2810 may comprise transmitting each DCI message of the plurality of DCI messages in a respective PDCCH monitoring occasion (e.g., PDCCH monitoring occasion n, where n=1, 2 in FIG. 29 and/or as discussed in connection with FIG. 25) of the cell 2810.

Each DCI message of the plurality of DCI messages may comprise a PDSCH-to-HARQ feedback timing indicator field (e.g., the DCI 1 may comprise a first HARQ feedback timing, the DCI 2 may comprise a second HARQ feedback timing) with a respective value indicating a respective slot for a PUCCH transmission 2910. Each DCI message of the plurality of DCI messages may comprise a PUCCH resource indicator field (e.g., the DCI 1 may comprise a first PUCCH resource, the DCI 2 may comprise a second PUCCH resource) indicating a respective PUCCH resource. The first DCI may comprise a first PDSCH-to-HARQ feedback timing indicator field (e.g., the DCI 1 may comprise a first HARQ feedback timing indicator field) with a first value indicating a first slot for a first PUCCH transmission. The first DCI may comprise a first PUCCH resource indicator field indicating a first PUCCH resource.

At step 3010, the base station may configure/set the PDSCH-to-HARQ feedback timing indicator field of each DCI message of the plurality of DCI messages. The base station may configure/set the PDSCH-to-HARQ feedback timing indicator field of each DCI message of the plurality of DCI messages with a respective value indicating a different slot for a PUCCH transmission, for example, based on the determining to send (e.g., transmit) the plurality of DCI messages via the cell 2810. For example, the base station may configure a first HARQ feedback indicator field of the DCI 1 with a first value indicating a first time slot. At step 3010, the base station may configure a first HARQ feedback indicator field of the DCI 1 with a first value indicating a first time slot. The base station may cause the respective slot, for the PUCCH transmission, indicated by the PDSCH-to-HARQ feedback timing indicator field of each DCI message of the plurality of DCI messages to be different, for example, based on the determining to send (e.g., transmit) the plurality of DCI messages via the cell 2810.

At step 3015, the base station may configure/set a second PDSCH-to-HARQ feedback timing indicator field (e.g., the second HARQ feedback timing of the DCI 2). The base station may configure/set a second PDSCH-to-HARQ feedback timing indicator field (e.g., the second HARQ feedback timing of the DCI 2) with a second value indicating a second slot that is different from the first slot (e.g., indicated by the first PDSCH-to-HARQ feedback timing indicator field). The base station may configure the indicator field for example, based on the determining to send (e.g., transmit) the plurality of DCIs (e.g., the DCI 1 and the DCI 2) via the cell 2810. The base station may send (e.g., transmit) the DCI 1 and the DCI 2 via the cell, for example, based on the configuring the second PDSCH-to-HARQ feedback timing indicator field of the DCI 2 with the second value. Any number of DCI messages may be sent via the cell, for example, based on the configuring. The wireless device 1905 may receive/detect the DCI 1 via the cell 2810. The wireless device 1905 may receive/detect the DCI 2 via the cell 2810.

At step 3020, the DCI 1 with the first HARQ feedback indicator field and the DCI 2 with the second HARQ feedback indicator field may be sent (e.g., transmitted). The wireless device 1905 may send (e.g., transmit), in the first slot (indicated by the first PDSCH-to-HARQ feedback timing indicator field), first HARQ-ACK information (e.g., ACK, NACK) of (or corresponding to) a first PDSCH, for example, based on the receiving/detecting the DCI 1 via the cell 2810. The first PDSCH may be scheduled by the DCI 1 in the first PUCCH transmission. The HARQ-ACK information may be sent via the first PUCCH resource (e.g., indicated by the first PUCCH resource indicator field).

The DCI 2 may comprise a second PUCCH resource indicator field indicating a second PUCCH resource. The wireless device 1905 may send (e.g., transmit), in the second slot (indicated by the second PDSCH-to-HARQ feedback timing indicator field), second HARQ-ACK information (e.g., ACK, NACK) of (or corresponding to) a second PDSCH, for example, based on the receiving/detecting the DCI 2 via the cell 2810. The second PDSCH may be scheduled by the DCI 2 in a second PUCCH transmission. The second HARQ-ACK information may be sent via the second PUCCH resource (indicated by the second PUCCH resource indicator field).

The wireless device may send (e.g., transmit) the first HARQ-ACK information in the first slot and/or the second HARQ-ACK information in the second slot. The second slot may be different from the first slot. The base station may determine that a first PDCCH monitoring occasion index of the first PDCCH monitoring occasion and a second PDCCH monitoring occasion index of the second PDCCH monitoring occasion are different. The base station may determine that any quantity/number of PDCCH monitoring occasion indices of any number of PDCCH monitoring occasions are different. The base station may configure/set the first PDSCH-to-HARQ feedback timing indicator field of the DCI 1 with a first value indicating the first slot. The base station may configure/set the second PDSCH-to-HARQ feedback timing indicator field of the DCI 2 with a second value indicating the second slot that is the same as the first slot, for example, based on the determining (e.g., that the monitoring occasion indices are the same or different). The base station may configure/set the second PDSCH-to-HARQ feedback timing indicator field of the DCI 2 with a second value indicating the second slot that is different from the first slot, for example, based on determining PDCCH monitoring occasions.

The base station may determine that a first PDCCH monitoring occasion is configured on a first cell and a second PDCCH monitoring occasion is configured on a second cell that is different from the first cell. The wireless device 1905 may monitor the first PDCCH monitoring occasion of the first cell for the DCI 1. The wireless device 1905 may monitor the second PDCCH monitoring occasion of the second cell for the DCI 2. The base station may configure/set the first PDSCH-to-HARQ feedback timing indicator field of the DCI 1 with a first value indicating the first slot. The base station may configure/set the second PDSCH-to-HARQ feedback timing indicator field of the DCI 2 with a second value indicating the second slot that is same as the first slot, for example, based on the determining. The base station may configure/set the second PDSCH-to-HARQ feedback timing indicator field of the DCI 2 with a second value indicating the second slot that is different from the first slot, for example, based on the determining.

System, methods, apparatuses, and/or computer readable media may be configured to operate as needed. The features described in connection with FIGS. 1-29 may be performed, for example, by one or more wireless devices, one or more base stations, one or more radio environments, and/or one or more networks, or combination of the above, and/or other devices/components. The features described in connection with FIGS. 1-29 may be performed, for example, based on wireless device or network node configurations, traffic load, initial system set up, packet sizes, traffic characteristics, a combination of the above, and/or the like.

A base station may communicate with a plurality of wireless devices. Wireless devices and/or base stations may support multiple technologies, and/or multiple releases of the same technology. Wireless devices may have one or more capabilities depending on wireless device category and/or capabilities. A base station may comprise multiple sectors. Features described herein may refer to a subset of the total wireless devices in a coverage area, for example, if the features refer to a base station communicating with a plurality of wireless devices. Features described herein may refer to, for example, a plurality of wireless devices of a given LTE, 5G, or any other technology, with a given capability and/or in a given sector of a base station. The plurality of wireless devices in this disclosure may refer to a selected plurality of wireless devices, and/or a subset of total wireless devices in a coverage area, which perform according to disclosed methods, and/or the like. There may be a plurality of base stations or a plurality of wireless devices in a coverage area that may not comply with the disclosed methods, for example, because those wireless devices or base stations perform based on older releases of LTE, 5G, or any other technology.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics Clause 1. A method comprising receiving, by a wireless device during a physical downlink control channel (PDCCH) monitoring occasion of a cell, downlink control information (DCI) indicating: scheduling information for a plurality of transport blocks (TB s) for reception in a plurality of downlink time slots; and a plurality of uplink time slots, for transmission of hybrid automatic repeat request acknowledgement (HARQ-ACK) information associated with each of the plurality of TB s, wherein each of the plurality of uplink time slots is the same.

Clause 2. The method of clause 1, further comprising determining a physical uplink control channel (PUCCH) resource associated with a latest starting time of the downlink time slots.

Clause 3. The method of any one of clauses 1-2, further comprising transmitting, via the PUCCH resource, the HARQ-ACK information.

Clause 4. The method of any one of clauses 1-3, wherein the DCI comprises a plurality of DCI messages, and wherein each DCI message of the plurality of DCI messages comprises an indication of a same uplink time slot for transmission of the HARQ-ACK information.

Clause 5. The method of any one of clauses 1-4, further comprising ordering the DCI based on starting times of the downlink time slots.

Clause 6. The method of any one of clauses 1-5, further comprising determining, based on the ordering, the latest starting time of the downlink time slots, wherein the PUCCH resource is indicated by the DCI having the latest starting time of the downlink time slots.

Clause 7. The method of any one of clauses 1-6, wherein the determining the PUCCH resource is further based on at least one of a priority parameter or a service type.

Clause 8. The method of any one of clauses 1-7, wherein the scheduling information for the plurality of TBs is for cross-carrier scheduling, via the cell, the plurality of TBs for transmission via a scheduled cell, and wherein a subcarrier spacing of the cell is lower than a subcarrier spacing of the scheduled cell.

Clause 9. The method of any one of clauses 1-8, wherein the transmitting the HARQ-ACK information comprises transmitting the HARQ-ACK information in the same uplink time slot indicated by the DCI.

Clause 10. The method of any one of clauses 1-9, wherein the receiving the DCI during the PDCCH monitoring occasion of the cell comprises receiving a plurality of DCI messages during a PDCCH monitoring occasion of at least one of a same slot, a same subframe, or a same time interval.

Clause 11. The method of any one of clauses 1-10, further comprising: ordering the DCI based on starting times of the downlink time slots; and determining, based on the ordering, the earliest starting time of the downlink time slots.

Clause 12. The method of any one of clauses 1-11, further comprising: ordering the DCI based on a priority parameter associated with the downlink time slots.

Clause 13. The method of any one of clauses 1-12, further comprising determining, based on the ordering, the starting time, associated with a highest priority parameter, of the downlink time slots.

Clause 14. The method of any one of clauses 1-13, further comprising ordering the DCI based on a priority parameter associated with the downlink time slots.

Clause 15. The method of any one of clauses 1-14, further comprising determining, based on the ordering, the starting time, associated with a lowest priority parameter, of the downlink time slots.

Clause 16. The method of any one of clauses 1-14, further comprising ordering the DCI based on coreset indices associated with the downlink time slots.

Clause 17. The method of any one of clauses 1-16, further comprising determining, based on the ordering, the starting time, associated with a highest coreset index of the coreset indices, of the downlink time slots.

Clause 18. The method of any one of clauses 1-17, further comprising ordering the DCI based on coreset indices associated with the downlink time slots.

Clause 19. The method of any one of clauses 1-18, further comprising determining, based on the ordering, the starting time, associated with a lowest coreset index of the coreset indices, of the downlink time slots.

Clause 20. A computing device comprising: one or more processors; and memory storing instructions that, when executed, cause the computing device to perform the method of any one of clauses 1-19.

Clause 21. A system comprising: a wireless device configured to perform the method of any one of clauses 1-19; and a base station configured to receive the HARQ-ACK information.

Clause 22. A computer-readable medium storing instructions that, when executed, cause performance of the method of any one of clauses 1-19.

Clause 23. A method comprising receiving, by a wireless device during a physical downlink control channel (PDCCH) monitoring occasion of a cell, a plurality of downlink control information (DCI) messages, wherein each DCI message indicates: scheduling information for a transport block (TB) to be transmitted in a downlink time slot of a plurality of downlink time slots; and an uplink time slot for transmission of hybrid automatic repeat request acknowledgment (HARQ-ACK) information of the TB, wherein a same uplink time slot is indicated as the uplink time slot in each DCI message.

Clause 24. The method of clause 23, further comprising determining a physical uplink control channel (PUCCH) resource associated with a latest starting time of the plurality of downlink time slots.

Clause 25. The method of any one of clauses 23-24 further comprising transmitting, via the PUCCH resource, the HARQ-ACK information.

Clause 26. The method of any one of clauses 23-25, further comprising: ordering the DCI messages based on starting times of the downlink time slots.

Clause 27. The method of any one of clauses 23-27, further comprising determining, based on the ordering, the latest starting time of the downlink time slots, wherein the PUCCH resource is indicated by the DCI having the latest starting time of the downlink time slots.

Clause 28. The method of any one of clauses 23-27, wherein the determining the PUCCH resource is further based on at least one of: a priority parameter; or a service type.

Clause 29. The method of any one of clauses 23-28, wherein the scheduling information for the TB is for cross-carrier scheduling, via the cell, the TB for transmission via a scheduled cell.

Clause 30. The method of any one of clauses 23-30, wherein a subcarrier spacing of the cell is lower than a subcarrier spacing of the scheduled cell.

Clause 31. The method of any one of clauses 23-31, wherein the transmitting the HARQ-ACK information comprises transmitting the HARQ-ACK information in the indicated as the uplink time slot in each DCI message of the plurality of DCI messages same uplink time slot indicated by the DCI.

Clause 32. The method of any one of clauses 23-31, wherein the receiving the plurality of DCI messages during the PDCCH monitoring occasion of the cell comprises receiving the plurality of DCI messages during a PDCCH monitoring occasion of at least one of a same slot; a same subframe; or a same time interval.

Clause 33. A computing device comprising: one or more processors; and memory storing instructions that, when executed, cause the computing device to perform the method of any one of clauses 23-32.

Clause 34. A system comprising: a wireless device configured to perform the method of any one of clauses 23-32; and a base station configured to receive the first HARQ-ACK information.

Clause 35. A computer-readable medium storing instructions that, when executed, cause performance of the method of any one of clauses 23-32.

Clause 36. A method comprising receiving, by a wireless device during a physical downlink control channel (PDCCH) monitoring occasion of a cell: first downlink control information (DCI), wherein the first DCI is for: scheduling a first transport block (TB) in a first downlink time slot; and indicating a first uplink time slot for transmission of first hybrid automatic repeat request acknowledgement (HARQ-ACK) information associated with the first TB.

Clause 37. The method of clause 36, further comprising receiving a second DCI, wherein the second DCI is for: scheduling a second TB in a second downlink time slot; and indicating a second uplink time slot for transmission of second HARQ-ACK information associated with the second TB.

Clause 38. The method of any one of clauses 36-37, further comprising determining, based on the first uplink time slot and the second uplink time slot being the same, a physical uplink control channel (PUCCH) resource associated with a latest starting time of the first downlink time slot and the second downlink time slot.

Clause 39. The method of any one of clauses 36-38, further comprising transmitting, via the PUCCH resource, the first HARQ-ACK information and the second HARQ-ACK information.

Clause 40. The method of any one of clauses 36-39, further comprising ordering, based on starting times of the first downlink time slots and the second downlink time slots, the first DCI and the second DCI.

Clause 41. The method of any one of clauses 36-40, further comprising determining, based on the ordering, the latest starting time of the first downlink time slots and the second downlink time slots.

Clause 42. The method of any one of clauses 36-41, wherein the determining the PUCCH resource is further based on at least one of: a priority parameter; or a service type.

Clause 43. The method of any one of clauses 36-42, wherein the scheduling the first TB in the first downlink time slot is via cross-carrier scheduling.

Clause 44. The method of any one of clauses 36-43, wherein the first TB is for transmission via a scheduled cell.

Clause 45. The method of any one of clauses 36-44, wherein a subcarrier spacing of the cell is lower than a subcarrier spacing of the scheduled cell.

Clause 46. The method of any one of clauses 36-45, wherein the transmitting the first HARQ-ACK information and the second HARQ-ACK information comprises: transmitting, in the same uplink time slot, the first HARQ-ACK information and the second HARQ-ACK information.

Clause 47. The method of any one of clauses 36-46, wherein the receiving the first DCI and the second DCI during the PDCCH monitoring occasion of the cell comprises receiving the first DCI and the second DCI during a PDCCH monitoring occasion of at least one of: a same slot; a same subframe; or a same time interval.

Clause 48. The method of any one of clauses 36-47, further comprising: receiving, by the wireless device during the PDCCH monitoring occasion of the cell: one or more third DCI.

Clause 49. The method of any one of clauses 36-48, wherein the one or more third DCI is for: scheduling one or more third TB s in a third downlink time slot that is the same as both the first downlink time slot and the second downlink time slot and indicating one or more third uplink time slots for transmission of third HARQ-ACK information associated with the one or more third TB s.

Clause 50. The method of any one of clauses 36-49, further comprising transmitting, via the PUCCH resource, the third HARQ-ACK information.

Clause 51. The method of any one of clauses 36-49 wherein the determining the PUCCH resource is further based on an ordering of the one or more third DCI according to at least one of: a priority parameter, or a service type.

Clause 52. A wireless device comprising: one or more processors; and memory storing instructions that, when executed, cause the wireless device to perform the method of any one of clauses 36-51.

Clause 53. A system comprising: a wireless device configured to perform the method of any one of clauses 36-51; and a base station configured to receive the first HARQ-ACK information.

Clause 54. A computer-readable medium storing instructions that, when executed, cause performance of the method of any one of clauses 36-53.

Clause 55. A method comprising: receiving, by a wireless device, a plurality of downlink control information (DCIs), in a physical downlink control channel (PDCCH) monitoring occasion of a cell, scheduling transport blocks (TBs) in downlink time slots, wherein each DCI of the plurality of DCIs schedules a respective TB, of the TBs, in a downlink time slot of the downlink time slots.

Clause 56. The method of clause 55, wherein each DCI of the plurality of DCIs indicates a same uplink time slot for transmission of hybrid automatic repeat request acknowledgement (HARQ-ACK) information of the respective TB.

Clause 57. The method of any one of clauses 55-56, further comprising indexing the plurality of DCIs in an order based on starting times of the downlink time slots Clause 58. The method of any one of clauses 55-57, further comprising selecting a last DCI of the plurality of DCIs in the order.

Clause 59. The method of any one of clauses 55-58, further comprising transmitting HARQ-ACK information of the TBs via a physical uplink control channel (PUCCH) resource indicated by the last DCI.

Clause 60. The method of any one of clauses 55-59, wherein the last DCI comprises a PUCCH resource indicator field with a value indicating the PUCCH resource.

Clause 61. The method of any one of clauses 55-60, wherein the indexing the plurality of DCIs in the order is based on an ascending or a descending order of the downlink time slots.

Clause 62. The method of any one of clauses 55-61, wherein a last occurring one of the downlink time slots that the plurality of DCIs schedule corresponds to the last DCI.

Clause 63. The method of any one of clauses 55-62, wherein each DCI of the plurality of DCIs comprises a second field with a respective value indicating a priority parameter.

Clause 64. The method of any one of clauses 55-63, wherein the indexing the plurality of DCIs based on the priority parameters comprises indexing the plurality of DCIs in an ascending or descending order of the priority parameters that the plurality of DCIs indicate.

Clause 65. The method of any one of clauses 55-64, wherein each DCI of the plurality of DCIs indicates a respective service type.

Clause 66. The method of any one of clauses 55-66, wherein the indexing the plurality of DCIs in the order is further based on service types that the plurality of DCIs indicate.

Clause 67. The method of any one of clauses 55-66, wherein the indexing the plurality of DCIs based on the service types comprises indexing the plurality of DCIs in an ascending or descending order of the service types that the plurality of DCIs indicate.

Clause 68. The method of any one of clauses 55-67, wherein a DCI indicating a service type comprises a cyclic redundancy check (CRC) of the DCI being scrambled with a radio network temporary identifier (RNTI) associated with the service type.

Clause 69. The method of any one of clauses 55-68, wherein the service type is one of plurality of service types comprising Ultra-reliable low latency communication (uRLLC), Enhanced Mobile Broadband (eMBB) and Massive machine type communications (mMTC).

Clause 70. The method of any one of clauses 55-69, wherein the cell is cross-carrier scheduling the scheduled cell.

Clause 71. The method of any one of clauses 55-70, wherein a subcarrier spacing of the cell is lower than a subcarrier spacing of the scheduled cell.

Clause 72. The method of any one of clauses 55-71, wherein the indexing the plurality of DCIs comprises determining positions of the plurality of DCIs in an order.

Clause 73. The method of any one of clauses 55-72, wherein the indexing the plurality of DCIs is based on each DCI of the plurality of DCIs indicating the same uplink time slot.

Clause 74. A wireless device comprising: one or more processors; and memory storing instructions that, when executed, cause the wireless device to perform the method of any one of clauses 55-73.

Clause 75. A system comprising: a wireless device configured to perform the method of any one of clauses 55-73; and a base station configured to receive the HARQ-ACK information.

Clause 76. A computer-readable medium storing instructions that, when executed, cause performance of the method of any one of clauses 55-75.

Clause 77. A method comprising: receiving, by a wireless device, one or more messages comprising one or more configuration parameters, for a cell, indicating: a first search space set: identified by a first search space set index; and indicating a first physical downlink control channel (PDCCH) monitoring occasion with a first start time; and a second search space set: identified by a second search space set index; and indicating a second PDCCH monitoring occasion with a second start time;

Clause 78. The method of clause 77, further comprising receiving: a first downlink control information (DCI), in the first PDCCH monitoring occasion, scheduling a first transport block (TB); and a second DCI, in the second PDCCH monitoring occasion, scheduling a second TB.

Clause 79. The method of any one of clauses 76-77, further comprising: in response to determining that the first start time and the second start time are the same, indexing the first DCI and the second DCI in an order based on the first search space set index and the second search space set index.

Clause 80. The method of any one of clauses 76-79, further comprising selecting a last DCI, among the first DCI and the second DCI, in the order.

Clause 81. The method of any one of clauses 76-80, further comprising transmitting, via a physical uplink control channel (PUCCH) resource indicated by the last DCI, a first hybrid automatic repeat request acknowledgement (HARQ-ACK) information of the first TB and a second HARQ-ACK information of the second TB.

Clause 82. The method of any one of clauses 76-81, wherein the first search space set is associated with a first control resource set (coreset) identified by a first coreset index.

Clause 83. The method of any one of clauses 76-82, wherein the one or more configuration parameters indicate the first coreset index for the first coreset.

Clause 84. The method of any one of clauses 76-83, wherein the first search space set being associated with the first coreset comprises that the one or more configuration parameters indicate the first coreset index for the first search space set.

Clause 85. The method of any one of clauses 76-84, wherein the second search space set is associated with a second coreset identified by a second coreset index.

Clause 86. The method of any one of clauses 76-85, wherein the one or more configuration parameters indicate the second coreset index for the second coreset.

Clause 87. The method of any one of clauses 76-86, wherein the second search space set being associated with the second coreset comprises that the one or more configuration parameters indicate the second coreset index for the second search space set.

Clause 88. The method of any one of clauses 76-87, wherein the indexing the first DCI and the second DCI in the order is further based on the first coreset index and the second coreset index.

Clause 89. The method of any one of clauses 76-88, wherein the indexing the first DCI and the second DCI in the order based on the first coreset index and the second coreset index comprises indexing the first DCI and the second DCI in an ascending or descending order of the first coreset index and the second coreset index in an order.

Clause 90. A wireless device comprising: one or more processors; and memory storing instructions that, when executed, cause the wireless device to perform the method of any one of clauses 76-89.

Clause 91. A system comprising: a wireless device configured to perform the method of any one of clauses 76-89; and a base station configured to receive the first HARQ-ACK information.

Clause 92. A computer-readable medium storing instructions that, when executed, cause performance of the method of any one of clauses 76-89.

Clause 93. A method comprising: determining, by a base station, to transmit a first downlink control information (DCI) and a second DCI in a physical downlink control channel (PDCCH) monitoring occasion of a cell.

Clause 94. The method of clause 93, further comprising: based on the determining, configuring/setting a first physical uplink control channel (PUCCH) resource indicator field of the first DCI with a first value indicating a first PUCCH resource and a second PUCCH resource indicator field of the second DCI with a second value indicating a second PUCCH resource.

Clause 95. The method of any one of clauses 93-94, wherein the first PUCCH resource and the second PUCCH resource are the same.

Clause 96. The method of any one of clauses 93-95, further comprising transmitting, in the PDCCH monitoring occasion, the first DCI and the second DCI.

Clause 97. The method of any one of clauses 93-96, further comprising monitoring, for hybrid automatic repeat request acknowledgement (HARQ-ACK) information, in the first PUCCH resource.

Clause 98. A wireless device comprising: one or more processors; and memory storing instructions that, when executed, cause the wireless device to perform the method of any one of clauses 93-96.

Clause 99. A system comprising: a base station configured to perform the method of any one of clauses 93-96; and a wireless device configured to receive the informationDCI message.

Clause 100. A computer-readable medium storing instructions that, when executed, cause performance of the method of any one of clauses 93-96.

Clause 101. A method comprising: determining, by a base station, to transmit, in a physical downlink control channel (PDCCH) monitoring occasion of a cell, a first downlink control information (DCI) message scheduling a first transport block (TB) and a second DCI message scheduling a second TB.

Clause 102. The method of clause 101, further comprising based on the determining, configuring/setting: a field of the first DCI message with a first value indicating a first uplink time slot for transmission of hybrid automatic repeat request acknowledgement (HARQ-ACK) information of the first TB; and a second field of the second DCI message with a second value indicating a second uplink time slot for transmission of HARQ-ACK information of the second TB.

Clause 103. The method of any one of clauses 101-102, wherein the first uplink time slot and the second uplink time slot are different.

Clause 104. The method of any one of clauses 101-103, further comprising transmitting, in the PDCCH monitoring occasion, the first DCI message and the second DCI message.

Clause 105. A wireless device comprising: one or more processors; and memory storing instructions that, when executed, cause the wireless device to perform the method of any one of clauses 101-104.

Clause 106. A system comprising: a base station configured to perform the method of any one of clauses 101-104; and a wireless device configured to receive the first DCI message.

Clause 107. A computer-readable medium storing instructions that, when executed, cause performance of the method of any one of clauses 101-104.

A wireless device and/or a base station may perform a method comprising multiple operations. The operations may comprise receiving, by a wireless device during a physical downlink control channel (PDCCH) monitoring occasion of a cell, downlink control information (DCI) indicating: scheduling information for a plurality of transport blocks (TBs) for reception in a plurality of downlink time slots; and a plurality of uplink time slots, for transmission of hybrid automatic repeat request acknowledgement (HARQ-ACK) information associated with each of the plurality of TBs, wherein each of the plurality of uplink time slots is the same; determining a physical uplink control channel (PUCCH) resource associated with a latest starting time of the downlink time slots; and transmitting, via the PUCCH resource, the HARQ-ACK information. The DCI may comprise a plurality of DCI messages. Each DCI message of the plurality of DCI messages may comprise an indication of a same uplink time slot for transmission of the HARQ-ACK information. The operations may further comprise ordering the DCI based on starting times of the downlink time slots; and determining, based on the ordering, the latest starting time of the downlink time slots, wherein the PUCCH resource is indicated by the DCI having the latest starting time of the downlink time slots. The determining the PUCCH resource may be based on at least one of: a priority parameter; or a service type. The scheduling information for the plurality of TBs may be for cross-carrier scheduling, via the cell, the plurality of TBs for transmission via a scheduled cell. A subcarrier spacing of the cell may be lower than a subcarrier spacing of the scheduled cell. The transmitting the HARQ-ACK information may comprise transmitting the HARQ-ACK information in the same uplink time slot indicated by the DCI. The receiving the DCI during the PDCCH monitoring occasion of the cell may comprise receiving a plurality of DCI messages during a PDCCH monitoring occasion of at least one of: a same slot; a same subframe; or a same time interval. The operations may further comprise ordering the DCI based on starting times of the downlink time slots; and determining, based on the ordering, the earliest starting time of the downlink time slots. The operations may further comprise ordering the DCI based on a priority parameter associated with the downlink time slots; and determining, based on the ordering, the starting time, associated with a highest priority parameter, of the downlink time slots. The operations may further comprise ordering the DCI based on a priority parameter associated with the downlink time slots; and determining, based on the ordering, the starting time, associated with a lowest priority parameter, of the downlink time slots. The operations may further comprise ordering the DCI based on coreset indices associated with the downlink time slots; and determining, based on the ordering, the starting time, associated with a highest coreset index of the coreset indices, of the downlink time slots. The operations may further comprise ordering the DCI based on coreset indices associated with the downlink time slots; and determining, based on the ordering, the starting time, associated with a lowest coreset index of the coreset indices, of the downlink time slots.

Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to receive the HARQ-ACK information. A computer-readable medium may store instructions that, when executed, cause performance of the described method, additional operations and/or include the additional elements A wireless device and/or base station may perform a method comprising multiple operations. The operations may comprise receiving, by a wireless device during a physical downlink control channel (PDCCH) monitoring occasion of a cell, a plurality of downlink control information (DCI) messages, wherein each DCI message indicates: scheduling information for a transport block (TB) to be transmitted in a downlink time slot of a plurality of downlink time slots; and an uplink time slot for transmission of hybrid automatic repeat request acknowledgment (HARQ-ACK) information of the TB, wherein a same uplink time slot is indicated as the uplink time slot in each DCI message; determining a physical uplink control channel (PUCCH) resource associated with a latest starting time of the plurality of downlink time slots; and transmitting, via the PUCCH resource, the HARQ-ACK information. The operations may further comprise ordering the DCI messages based on starting times of the downlink time slots; and determining, based on the ordering, the latest starting time of the downlink time slots. The determining the PUCCH resource may be based on at least one of: a priority parameter; or a service type. The scheduling information for the TB may be for cross-carrier scheduling, via the cell, the TB for transmission via a scheduled cell. A subcarrier spacing of the cell may be lower than a subcarrier spacing of the scheduled cell. The transmitting the HARQ-ACK information may comprise transmitting the HARQ-ACK information in the indicated as the uplink time slot in each DCI message of the plurality of DCI messages. The receiving the plurality of DCI messages during the PDCCH monitoring occasion of the cell may comprise receiving the plurality of DCI messages during a PDCCH monitoring occasion of at least one of: a same slot; a same subframe; or a same time interval.

Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to receive the first HARQ-ACK information. A computer-readable medium may store instructions that, when executed, cause performance of the described method, additional operations and/or include the additional elements.

A wireless device may perform a method comprising multiple operations. The operations may comprise receiving, by a wireless device during a physical downlink control channel (PDCCH) monitoring occasion of a cell: first downlink control information (DCI), wherein the first DCI is for: scheduling a first transport block (TB) in a first downlink time slot; and indicating a first uplink time slot for transmission of first hybrid automatic repeat request acknowledgement (HARQ-ACK) information associated with the first TB; and second DCI, wherein the second DCI is for: scheduling a second TB in a second downlink time slot; and indicating a second uplink time slot for transmission of second HARQ-ACK information associated with the second TB; determining, based on the first uplink time slot and the second uplink time slot being the same, a physical uplink control channel (PUCCH) resource associated with a latest starting time of the first downlink time slot and the second downlink time slot; and transmitting, via the PUCCH resource, the first HARQ-ACK information and the second HARQ-ACK information. The operations may further comprise ordering, based on starting times of the first downlink time slot and the second downlink time slot, the first DCI and the second DCI; and determining, based on the ordering, the latest starting time of the first downlink time slot and the second downlink time slot. The determining the PUCCH resource may be based on at least one of: a priority parameter; or a service type. The scheduling the first TB in the first downlink time slot may be via cross-carrier scheduling. The first TB may be for transmission via a scheduled cell. A subcarrier spacing of the cell may be lower than a subcarrier spacing of the scheduled cell. The transmitting the first HARQ-ACK information and the second HARQ-ACK information may comprise transmitting, in the same uplink time slot, the first HARQ-ACK information and the second HARQ-ACK information. The receiving the first DCI and the second DCI during the PDCCH monitoring occasion of the cell comprises receiving the first DCI and the second DCI during a PDCCH monitoring occasion of at least one of: a same slot; a same subframe; or a same time interval. The operations may further comprise receiving, by the wireless device during the PDCCH monitoring occasion of the cell: one or more third DCI, wherein the one or more third DCI is for: scheduling one or more third TBs in a third downlink time slot that is the same as both the first downlink time slot and the second downlink time slot; and indicating one or more third uplink time slots for transmission of third HARQ-ACK information associated with the one or more third TBs; and transmitting, via the PUCCH resource, the third HARQ-ACK information, wherein the determining the PUCCH resource is further based on an ordering of the one or more third DCI according to at least one of: a priority parameter, or a service type.

Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to receive the first HARQ-ACK information. A computer-readable medium may store instructions that, when executed, cause performance of the described method, additional operations and/or include the additional elements.

A wireless device may perform a method comprising multiple operations. The operations may comprise receiving, by a wireless device, a plurality of downlink control information (DCIs), in a physical downlink control channel (PDCCH) monitoring occasion of a cell, scheduling transport blocks (TBs) in downlink time slots, wherein each DCI of the plurality of DCIs: schedules a respective TB, of the TBs, in a downlink time slot of the downlink time slots; and indicates a same uplink time slot for transmission of hybrid automatic repeat request acknowledgement (HARQ-ACK) information of the respective TB; indexing the plurality of DCIs in an order based on starting times of the downlink time slots; selecting a last DCI of the plurality of DCIs in the order; and transmitting HARQ-ACK information of the TB s via a physical uplink control channel (PUCCH) resource indicated by the last DCI. The last DCI may comprise a PUCCH resource indicator field with a value indicating the PUCCH resource. The indexing the plurality of DCIs in the order may be based on an ascending or a descending order of the downlink time slots. A last occurring one of the downlink time slots that the plurality of DCIs schedule may correspond to the last DCI. Each DCI of the plurality of DCIs may comprise a second field with a respective value indicating a priority parameter. The indexing the plurality of DCIs based on the priority parameters may comprise indexing the plurality of DCIs in an ascending or descending order of the priority parameters that the plurality of DCIs indicate. Each DCI of the plurality of DCIs may indicate a respective service type. The indexing the plurality of DCIs in the order may be further based on service types that the plurality of DCIs indicate. The indexing the plurality of DCIs based on the service types may comprise indexing the plurality of DCIs in an ascending or descending order of the service types that the plurality of DCIs indicate. A DCI indicating a service type may comprise a cyclic redundancy check (CRC) of the DCI being scrambled with a radio network temporary identifier (RNTI) associated with the service type. The service type may be one of plurality of service types comprising Ultra-reliable low latency communication (uRLLC), Enhanced Mobile Broadband (eMBB) and Massive machine type communications (mMTC). The cell may be cross-carrier scheduling the scheduled cell. A subcarrier spacing of the cell may be lower than a subcarrier spacing of the scheduled cell. The indexing the plurality of DCIs may comprise determining positions of the plurality of DCIs in an order. The indexing the plurality of DCIs may be based on each DCI of the plurality of DCIs indicating the same uplink time slot.

Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to receive the HARQ-ACK information. A computer-readable medium may store instructions that, when executed, cause performance of the described method, additional operations and/or include the additional elements.

A wireless device may perform a method comprising multiple operations. The operations may comprise receiving, by a wireless device, one or more messages comprising one or more configuration parameters, for a cell, indicating: a first search space set: identified by a first search space set index; and indicating a first physical downlink control channel (PDCCH) monitoring occasion with a first start time; and a second search space set: identified by a second search space set index; and indicating a second PDCCH monitoring occasion with a second start time; receiving: a first downlink control information (DCI), in the first PDCCH monitoring occasion, scheduling a first transport block (TB); and a second DCI, in the second PDCCH monitoring occasion, scheduling a second TB; in response to determining that the first start time and the second start time are the same, indexing the first DCI and the second DCI in an order based on the first search space set index and the second search space set index; selecting a last DCI, among the first DCI and the second DCI, in the order; and transmitting, via a physical uplink control channel (PUCCH) resource indicated by the last DCI, a first hybrid automatic repeat request acknowledgement (HARQ-ACK) information of the first TB and a second HARQ-ACK information of the second TB. The first search space set may be associated with a first control resource set (coreset) identified by a first coreset index. The one or more configuration parameters may indicate the first coreset index for the first coreset. The first search space set being associated with the first coreset may comprise that the one or more configuration parameters indicate the first coreset index for the first search space set. The second search space set may be associated with a second coreset identified by a second coreset index. The one or more configuration parameters may indicate the second coreset index for the second coreset. The second search space set being associated with the second coreset may comprise that the one or more configuration parameters indicate the second coreset index for the second search space set. The indexing the first DCI and the second DCI in the order may be further based on the first coreset index and the second coreset index. The indexing the first DCI and the second DCI in the order based on the first coreset index and the second coreset index may comprise indexing the first DCI and the second DCI in an ascending or descending order of the first coreset index and the second coreset index in an order.

Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to receive the first HARQ-ACK information. A computer-readable medium may store instructions that, when executed, cause performance of the described method, additional operations and/or include the additional elements.

A base station may perform a method comprising multiple operations. The operations may comprise determining, by a base station, to transmit a first downlink control information (DCI) and a second DCI in a physical downlink control channel (PDCCH) monitoring occasion of a cell; based on the determining, configuring/setting a first physical uplink control channel (PUCCH) resource indicator field of the first DCI with a first value indicating a first PUCCH resource and a second PUCCH resource indicator field of the second DCI with a second value indicating a second PUCCH resource, wherein the first PUCCH resource and the second PUCCH resource are the same; transmitting, in the PDCCH monitoring occasion, the first DCI and the second DCI; and monitoring, for hybrid automatic repeat request acknowledgement (HARQ-ACK) information, in the first PUCCH resource.

Systems, devices, and media may be configured with the method. A base station may comprise one or more processors; and memory storing instructions that, when executed, cause the base station to perform the described method, additional operations and/or include the additional elements. A system may comprise a base station configured to perform the described method, additional operations and/or include the additional elements; and a wireless device configured to receive the first DCI message. A computer-readable medium may store instructions that, when executed, cause performance of the described method, additional operations and/or include the additional elements.

A base station may perform a method comprising multiple operations. The operations may comprise determining, by a base station, to transmit, in a physical downlink control channel (PDCCH) monitoring occasion of a cell, a first downlink control information (DCI) message scheduling a first transport block (TB) and a second DCI message scheduling a second TB; based on the determining, configuring: a field of the first DCI message with a first value indicating a first uplink time slot for transmission of hybrid automatic repeat request acknowledgement (HARQ-ACK) information of the first TB; and a second field of the second DCI message with a second value indicating a second uplink time slot for transmission of HARQ-ACK information of the second TB, wherein the first uplink time slot and the second uplink time slot are different; and transmitting, in the PDCCH monitoring occasion, the first DCI message and the second DCI message.

Systems, devices, and media may be configured with the method. A base station may comprise one or more processors; and memory storing instructions that, when executed, cause the base station to perform the described method, additional operations and/or include the additional elements. A system may comprise a base station configured to perform the described method, additional operations and/or include the additional elements; and a wireless device configured to receive the first DCI message. A computer-readable medium may store instructions that, when executed, cause performance of the described method, additional operations and/or include the additional elements.

Figure 31:
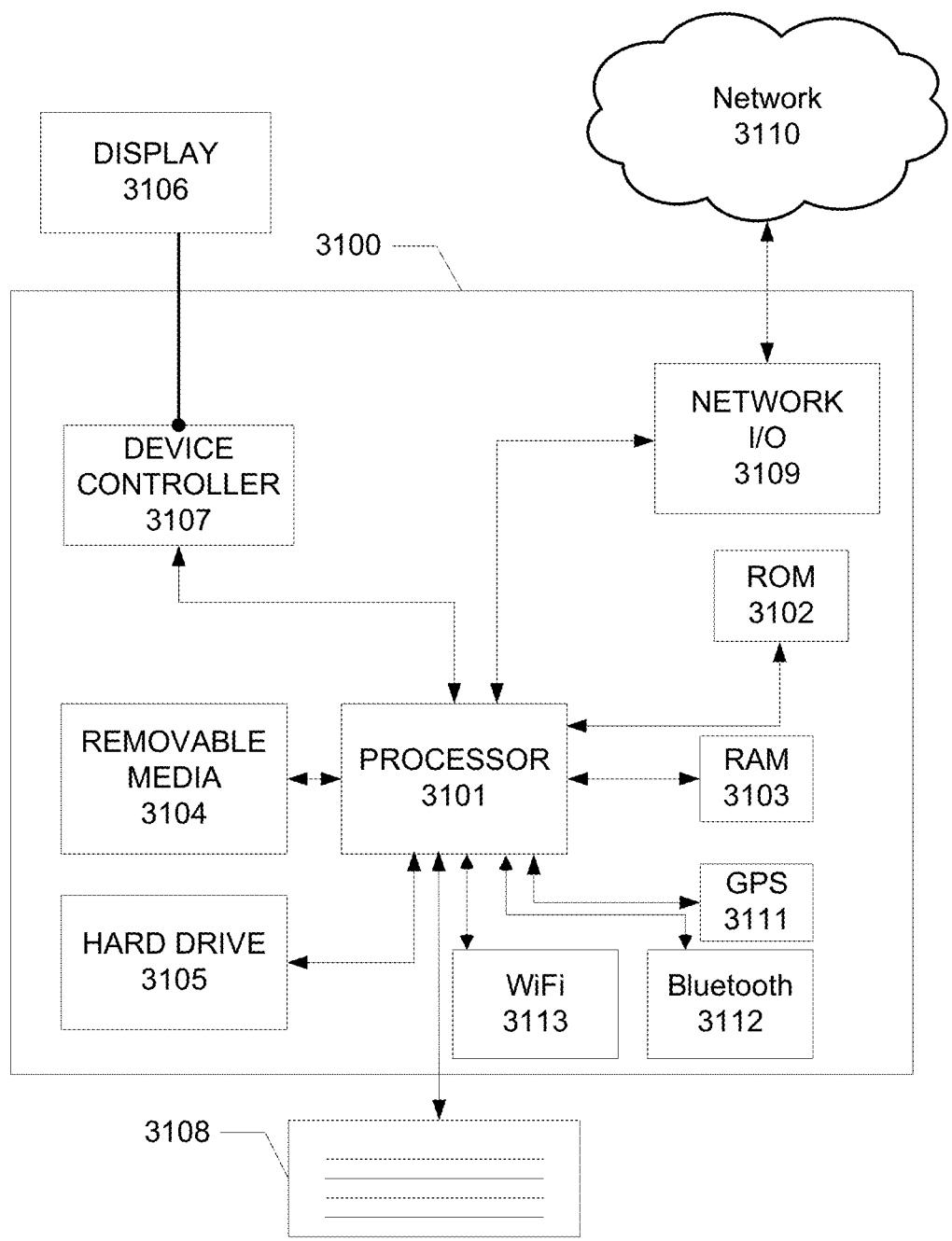
FIG. 31 shows example elements of a computing device that may be used to implement any of the various devices described herein.

FIG. 31 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3100 may include one or more processors 3101, which may execute instructions stored in the random-access memory (RAM) 3103, the removable media 3104 (such as a Universal Serial Bus (USB) drive, compact disk (CD) or digital versatile disk (DVD), or floppy disk drive), or any other desired storage medium. Instructions may also be stored in an attached (or internal) hard drive 3105. The computing device 3100 may also include a security processor (not shown), which may execute instructions of one or more computer programs to monitor the processes executing on the processor 3101 and any process that requests access to any hardware and/or software components of the computing device 3100 (e.g., ROM 3102, RAM 3103, the removable media 3104, the hard drive 3105, the device controller 3107, a network interface 3109, a GPS 3111, a Bluetooth interface 3112, a WiFi interface 3113, etc.). The computing device 3100 may include one or more output devices, such as the display 3106 (e.g., a screen, a display device, a monitor, a television, etc.), and may include one or more output device controllers 3107, such as a video processor. There may also be one or more user input devices 3108, such as a remote control, keyboard, mouse, touch screen, microphone, etc. The computing device 3100 may also include one or more network interfaces, such as a network interface 3109, which may be a wired interface, a wireless interface, or a combination of the two. The network interface 3109 may provide an interface for the computing device 3100 to communicate with a network 3110 (e.g., a RAN, or any other network).

The network interface 3109 may include a modem (e.g., a cable modem), and the external network 3110 may include communication links, an external network, an in-home network, a provider's wireless, coaxial, fiber, or hybrid fiber/coaxial distribution system (e.g., a DOCSIS network), or any other desired network. Additionally, the computing device 3100 may include a location-detecting device, such as a global positioning system (GPS) microprocessor 3111, which may be configured to receive and process global positioning signals and determine, with possible assistance from an external server and antenna, a geographic position of the computing device 3100.

The example in FIG. 31 may be a hardware configuration, although the components shown may be implemented as software as well. Modifications may be made to add, remove, combine, divide, etc. components of the computing device 3100 as desired. Additionally, the components may be implemented using basic computing devices and components, and the same components (e.g., processor 3101, ROM storage 3102, display 3106, etc.) may be used to implement any of the other computing devices and components described herein. For example, the various components described herein may be implemented using computing devices having components such as a processor executing computer-executable instructions stored on a computer-readable medium, as shown in FIG. 31. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
  receiving, by a wireless device:
    via a first control resource set (CORESET) associated with a first search space set identified by a first search space set index, first downlink control information (DCI); and
    via a second CORESET associated with a second search space set identified by a second search space set index, second DCI;
  determining a physical uplink control channel (PUCCH) resource based on the first DCI, wherein the first DCI is selected based on the first search space set index being lower than the second search space set index; and
  transmitting, via the PUCCH resource, hybrid automatic repeat request acknowledgement (HARQ-ACK) information corresponding to downlink reception scheduled by the first DCI.

2. The method of claim 1, wherein the HARQ-ACK information further corresponds to downlink reception scheduled by the second DCI.

3. The method of claim 1, wherein the determining the PUCCH resource based on the first DCI comprises determining the PUCCH resource based on a PUCCH resource indicator field in the first DCI.

4. The method of claim 1, wherein the first DCI or the second DCI indicates scheduling information for reception of a transport block (TB).

5. The method of claim 1, wherein:
  the receiving the first DCI comprises receiving the first DCI during a first PDCCH monitoring occasion; and
  the receiving the second DCI comprises receiving the second DCI during a second PDCCH monitoring occasion.

6. The method of claim 1, wherein the first DCI and the second DCI indicate an uplink time slot for transmission of the HARQ-ACK information.

7. The method of claim 1, wherein the first DCI is further selected based on at least one of:
  a priority parameter of the first DCI; or
  a service type of the first DCI.

8. A wireless device comprising:
  one or more processors; and
  memory storing instructions that, when executed by the one or more processors, cause the wireless device to:
    receive:

via a first control resource set (CORESET) associated with a first search space set identified by a first search space set index, first downlink control information (DCI); and via a second CORESET associated with a second search space set identified by a second search space set index, second DCI;

determine a physical uplink control channel (PUCCH) resource based on the first DCI, wherein the first DCI is selected based on the first search space set index being lower than the second search space set index; and transmit, via the PUCCH resource, hybrid automatic repeat request acknowledgement (HARQ-ACK) information corresponding to downlink reception scheduled by the first DCI.

9. The wireless device of claim 8, wherein the HARQ-ACK information further corresponds to downlink reception scheduled by the second DCI.

10. The wireless device of claim 8, wherein the instructions, when executed by the one or more processors, cause the wireless device to determine the PUCCH resource based on the first DCI by causing determining the PUCCH resource based on a PUCCH resource indicator field in the first DCI.

11. The wireless device of claim 8, wherein the first DCI or the second DCI indicates scheduling information for reception of a transport block (TB).

12. The wireless device of claim 8, wherein the instructions, when executed by the one or more processors, cause the wireless device to:

receive the first DCI by causing receiving the first DCI during a first PDCCH monitoring occasion; and receive the second DCI by causing receiving the second DCI during a second PDCCH monitoring occasion.

13. The wireless device of claim 8, wherein the first DCI and the second DCI indicate an uplink time slot for transmission of the HARQ-ACK information.

14. The wireless device of claim 8, wherein the first DCI is further selected based on at least one of:

a priority parameter of the first DCI; or a service type of the first DCI.

15. A non-transitory computer readable medium storing instructions that, when executed, cause:

receiving, by a wireless device:

via a first control resource set (CORESET) associated with a first search space set identified by a first search space set index, first downlink control information (DCI); and via a second CORESET associated with a second search space set identified by a second search space set index, second DCI;

determining a physical uplink control channel (PUCCH) resource based on the first DCI, wherein the first DCI is selected based on the first search space set index being lower than the second search space set index; and transmitting, via the PUCCH resource, hybrid automatic repeat request acknowledgement (HARQ-ACK) information corresponding to downlink reception scheduled by the first DCI.

16. The non-transitory computer readable medium of claim 15, wherein the HARQ-ACK information further corresponds to downlink reception scheduled by the second DCI.

17. The non-transitory computer readable medium of claim 15, wherein the instructions, when executed, cause determining the PUCCH resource based on the first DCI by causing determining the PUCCH resource based on a PUCCH resource indicator field in the first DCI.

18. The non-transitory computer readable medium of claim 15, wherein the first DCI or the second DCI indicates scheduling information for reception of a transport block (TB).

19. The non-transitory computer readable medium of claim 15, wherein the instructions, when executed, cause:

receiving the first DCI by causing receiving the first DCI during a first PDCCH monitoring occasion; and receiving the second DCI by causing receiving the second DCI during a second PDCCH monitoring occasion.

20. The non-transitory computer readable medium of claim 15, wherein the first DCI and the second DCI indicate an uplink time slot for transmission of the HARQ-ACK information.

21. The non-transitory computer readable medium of claim 15, wherein the first DCI is further selected based on at least one of:

a priority parameter of the first DCI; or a service type of the first DCI.

22. The method of claim 1, wherein the determining the PUCCH resource based on the first DCI comprises comparing the first search space set index with the second search space set index.

23. The wireless device of claim 8, wherein the instructions, when executed by the one or more processors, cause the wireless device to determine the PUCCH resource based on the first DCI by causing comparing the first search space set index with the second search space set index.

24. The non-transitory computer readable medium of claim 15, wherein the instructions, when executed, cause determining the PUCCH resource based on the first DCI by causing comparing the first search space set index with the second search space set index.

* * * * *